(12) United States Patent
Bowes

(10) Patent No.: US 8,081,570 B2
(45) Date of Patent: *Dec. 20, 2011

(54) HIGH SPEED FLOW CONTROL METHODOLOGY

(75) Inventor: Michael J. Bowes, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 47 days.

This patent is subject to a terminal disclaimer.

(21) Appl. No.: 12/470,454

(22) Filed: May 21, 2009

(65) Prior Publication Data

US 2010/0135289 A1 Jun. 3, 2010

Related U.S. Application Data

(63) Continuation of application No. 09/709,532, filed on Nov. 13, 2000, now Pat. No. 7,539,134, which is a continuation-in-part of application No. 09/528,434, filed on Mar. 17, 2000, now Pat. No. 6,850,521.

(60) Provisional application No. 60/165,670, filed on Nov. 16, 1999.

(51) Int. Cl.
H04L 12/26 (2006.01)

(52) U.S. Cl. .................................. 370/230; 370/392

(58) Field of Classification Search .................. None
See application file for complete search history.

(56) References Cited

U.S. PATENT DOCUMENTS

| | | |
|---|---|---|
| 5,278,789 A | 1/1994 | Inoue et al. |
| 5,390,173 A | 2/1995 | Spinney et al. |
| 5,414,704 A | 5/1995 | Spinney |
| 5,423,015 A | 6/1995 | Chung |
| 5,459,717 A | 10/1995 | Mullan et al. |
| 5,473,607 A | 12/1995 | Hausman et al. |
| 5,499,295 A | 3/1996 | Cooper |
| 5,524,254 A | 6/1996 | Morgan et al. |
| 5,555,398 A | 9/1996 | Raman |
| 5,568,477 A | 10/1996 | Galand et al. |
| 5,579,301 A | 11/1996 | Ganson et al. |
| 5,644,784 A | 7/1997 | Peek |
| 5,652,579 A | 7/1997 | Yamada et al. |
| 5,696,899 A | 12/1997 | Kalwitz |
| 5,742,613 A | 4/1998 | MacDonald |
| 5,748,631 A | 5/1998 | Bergantino et al. |

(Continued)

FOREIGN PATENT DOCUMENTS

EP 0312917 A2 4/1989

(Continued)

OTHER PUBLICATIONS

Tanenbaum, A. S., "Computer Networks", Prentice-Hall Int., USA, XP-002147300, Sec.5.2-Sec.5.3, Routing Algorithms and Congestion Control Algorithms,(1998), pp. 309-320.

(Continued)

*Primary Examiner* — Michael J Moore, Jr.

(57) ABSTRACT

A method and apparatus for controlling data flow across a network performs a method which includes transmitting a packet request message from a first station to a second station, then determining if the packet request message is valid. A request acknowledge message is transmitted from the second station to the first station, and it is then determined if the request acknowledge message is valid. The packet request message and the request acknowledge message each includes a control bit string, an identification bit string, and at least one parity bit.

26 Claims, 51 Drawing Sheets

U.S. PATENT DOCUMENTS

| | | | |
|---|---|---|---|
| 5,774,673 A * | 6/1998 | Beuk et al. | 709/236 |
| 5,781,549 A | 7/1998 | Dai | |
| 5,781,745 A * | 7/1998 | Ramelson et al. | 710/113 |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,104,749 A | 8/2000 | Lu | |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,263,001 B1 | 7/2001 | Banks | |
| 6,289,016 B1 | 9/2001 | Subbiah | |
| 6,337,852 B1 | 1/2002 | Desnoyers et al. | |
| 6,457,146 B1 | 9/2002 | Keen | |
| 6,611,495 B1 | 8/2003 | Meyer | |
| 7,539,134 B1 | 5/2009 | Bowes | |
| 2001/0030943 A1 | 10/2001 | Gregg | |
| 2003/0133448 A1 | 7/2003 | Frink | |

FOREIGN PATENT DOCUMENTS

| | | | |
|---|---|---|---|
| EP | 0465090 A1 | 1/1992 | |
| EP | 0752796 A2 | 1/1997 | |
| EP | 0849917 A2 | 6/1998 | |
| EP | 0853441 A2 | 7/1998 | |
| EP | 0854606 A2 | 7/1998 | |
| EP | 0859492 A2 | 8/1998 | |
| EP | 0862349 A2 | 9/1998 | |
| EP | 0907300 A2 | 4/1999 | |
| FR | 2725573 A1 | 4/1996 | |
| JP | 4-189023 | 7/1992 | |
| WO | 9809473 | 3/1998 | |
| WO | 9900938 A1 | 1/1999 | |
| WO | 9900939 A1 | 1/1999 | |
| WO | 9900944 A1 | 1/1999 | |
| WO | 9900945 | 1/1999 | |
| WO | 9900948 | 1/1999 | |
| WO | 9900949 | 1/1999 | |
| WO | 9900950 | 1/1999 | |

OTHER PUBLICATIONS

Harufusa, Kondoh et al., "A 622-Mb/s 8×8 ATM switch chip set with shared multibuffer architecture", 8107 IEEE Journal of solid-state circuits 28, vol. 7, (1993), pp. 808-814.

Lin, Yu-Sheng et al., "Queue Management for shared buffer and shared multi-buffer ATM switches", Department of electronics engineering & institute of electronics, National ChiaoTung University, Hsinchu, Taiwan, R.O.C.,(Mar. 24, 1996), pp. 688-695.

Catalyst 8500 CSR Architecture, White PaperXP-002151999, Cisco Systems Inc, (1998), pp. 1-19.

Local Area Network Switch Frame Lookup Techniquefor Increased Speed and Flexibility, 700 IBM Technical Disclosure Bulletin vol. 38, No. 7, Armonk, NY, US, (Jul. 1995), pp. 221•222.

Chemarin, Alain et al., "A High-Speed CMOS Circuit for 1.2-Gb/s 16 × 16 ATM Switching", 8107 IEEE Journal of Solid-State Circuits, vol. 27, No. 7, NewYork, US, (Jul. 1992), pp. 1116-1120.

Macleod, K. et al., "Enhanced Flow Control for 802.3 Links Utilizing Extensions of 802.3× Flow Control", IEEE 802 Exec Study Group on QOS and Flow Control, XP002178211,(Nov. 11, 1998), pp. 1-11.

* cited by examiner

Fig.5

PROTOCOL CHANNEL MESSAGES

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| OPCODE | IP IPX | RESERVED | NXT CELL | SRC DEST PORT | | | COS | J | S | E | CRC | P | O | LEN | |

| 62 | 60 | 58 | 56 | 54 | 52 | 50 | 48 | 46 | 44 | 42 | 40 | 38 | 36 | 34 | 32 |
|---|---|---|---|---|---|---|---|---|---|---|---|---|---|---|---|
| MODULE ID BITMAP ||||||||||||||||

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| R | Bc / Mc PORTBITMAP |||||||||||||||

| 62 | 60 | 58 | 56 | 54 | 52 | 50 | 48 | 46 | 44 | 42 | 40 | 38 | 36 | 34 | 32 |
|---|---|---|---|---|---|---|---|---|---|---|---|---|---|---|---|
| PFM | NEW IP CHECKSUM |||||||| M | MT-MOD ID || T | TGID | MOD OPCODE | c |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| U | UNTAGGED PORTBITMAP / SRC PORT NUMBER (bit0...5) |||||||||||||||

| 62 | 60 | 58 | 56 | 54 | 52 | 50 | 48 | 46 | 44 | 42 | 40 | 38 | 36 | 34 | 32 |
|---|---|---|---|---|---|---|---|---|---|---|---|---|---|---|---|
| RSVD || MATCHED FILTER || VLAN ID |||||| SRC PORT ||| REMOTE PORT |||

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| CPU OPCODES |||||||| TIME STAMP ||||||||

| 62 | 60 | 58 | 56 | 54 | 52 | 50 | 48 | 46 | 44 | 42 | 40 | 38 | 36 | 34 | 32 |
|---|---|---|---|---|---|---|---|---|---|---|---|---|---|---|---|
| R | L3 PORT BITMAP |||||||||||||||

Fig.6

SIDE BAND CHANNEL MESSAGES

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| OPCODE ||| DEST PORT / DESTINATION DEV ID ||| SRC PORT ||| DATA LEN ||| E | EC ODE | COS | C |
| ADDRESS ||||||||||||||||
| DATA ||||||||||||||||

Fig. 17  FFP PROGRAMMING FLOW CHART

Fig.20

| FIELD | HEADER | SIZE | OFFSET FOR ETHERNET II UNTAGGED | OFFSET FOR ETHERNET II TAGGED | OFFSET FOR SNAP UNTAGGED | OFFSET FOR SNAP TAGGED |
|---|---|---|---|---|---|---|
| DESTINATION MAC ADDRESS | MAC | 6 BYTES | 0 | 0 | 0 | 0 |
| SOURCE MAC ADDRESS | MAC | 6 BYTES | 6 | 6 | 6 | 6 |
| PROTOCOL TYPE | MAC | 2 BYTES | 12 | 16 | 20 | 24 |
| DESTINATION TYPE | 802.3 | 1 BYTE | NA | NA | 14 | 18 |
| SOURCE SAP | 802.3 | 1 BYTE | NA | NA | 15 | 19 |
| 802.1p PRIORITY | MAC | 3 BITS | NA | 14 | NA | 14 |
| VLAN Id | MAC | 12 BITS | NA | 14+14b | NA | 14+14b |
| TOS PRECEDENCE | IP | 3 BITS | 15 | 19 | 23 | 27 |
| DIFFERENTIATED SERVICES | IP | 6 BITS | 15 | 19 | 23 | 27 |
| SOURCE IP ADDRESS | IP | 4 BYTES | 26 | 30 | 34 | 38 |
| DESTINATION IP ADDRESS | IP | 4 BYTES | 30 | 34 | 38 | 42 |
| PROTOCOL | IP | 1 BYTE | 23 | 27 | 31 | 35 |
| SOURCE PORT | TCP/UDP | 2 BYTES | 34 | 38 | 42 | 46 |
| DESTINATION PORT | TCP/UDP | 2 BYTES | 36 | 40 | 44 | 48 |
| TCP CONTROL FLAGS (FOR ALIGNING ON BYTE BOUNDARY 2 BITS OF RESERVED BITS PRECEDING THIS FIELD IS INCLUDED) | TCP | 1 BYTE | 47 | 51 | 55 | 59 |
| DATA AT OFFSET 1 | NA | 8 BYTES | DATA OFFSET1 FROM START OF IP/IPX HEADER | DATA OFFSET1 FROM START OF IP/IPX HEADER | DATA OFFSET1 FROM START OF IP/IPX HEADER | DATA OFFSET1 FROM START OF IP/IPX HEADER |
| DATA AT OFFSET 2 | NA | 8 BYTES | DATA OFFSET2 FROM START OF IP/IPX HEADER | DATA OFFSET2 FROM START OF IP/IPX HEADER | DATA OFFSET2 FROM START OF IP/IPX HEADER | DATA OFFSET2 FROM START OF IP/IPX HEADER |
| DATA AT OFFSET 3 | NA | 8 BYTES | DATA OFFSET3 FROM START OF IP/IPX HEADER | DATA OFFSET3 FROM START OF IP/IPX HEADER | DATA OFFSET3 FROM START OF IP/IPX HEADER | DATA OFFSET3 FROM START OF IP/IPX HEADER |
| DATA AT OFFSET 4 | NA | 8 BYTES | DATA OFFSET4 FROM START OF IP/IPX HEADER | DATA OFFSET4 FROM START OF IP/IPX HEADER | DATA OFFSET4 FROM START OF IP/IPX HEADER | DATA OFFSET4 FROM START OF IP/IPX HEADER |

Fig.21a

FILTER MASK FORMAT:

| FILTER ENABLE (1b) | COUNTER (5b) | Rem PORT (1b) | OUTPUT MOD (5b) | OUTPUT PORT (6b) | TOS Prec (3b) | Diff Serv (6b) | 802.1p PRIOR (3b) |
|---|---|---|---|---|---|---|---|
| NMA ENB (1b) | NO MATCH ACTION (10b) | DATA OFFSET 4 (7b) | DATA OFFSET 3 (7b) | DATA OFFSET 2 (7b) | DATA OFFSET 1 (7b) | INGRESS PORT MASK (6b) | EGRESS MOD ID MASK (5b) | EGRESS PORT MASK (6b) |
| FIELD MASK ||||||||

Fig.21b

FIELD MASK FORMAT:

| DEST MAC ADDR (6B) | SRC MAC ADDR (6B) | PROT TYPE (2B) | DEST SAP (1B) | SRC SAP (1B) | 802.1p PRIO (3b) | VLAN ID (12b) | TOS PREC (3b) | DIFF SERV (6b) | SRC IP ADDR (4B) | DEST IP ADDR (4B) | PROT IP (1B) | SRC PORT (2B) | DEST PORT (2B) |
|---|---|---|---|---|---|---|---|---|---|---|---|---|---|
| TCP CNTR FLAGS (1B) | DATA 1 (8B) | DATA 2 (8 B) | DATA 3 (8B) | DATA 4 (8B) |||||||||

Fig.23

| COUNTER (5b) | OUTPUT MOD (5b) | OUTPUT PORT (6b) | TOS_P (3b) | DIFF SERVICES (6b) | 802.1p PRIORITY (3b) | ACTIONS (11b) | FILTER SELECT (3b) | INGRESS PORT (6b) | EGRS MOD (5b) | EGRS PORT (6b) | FILTER VALUE (512b) |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

Fig.24

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| SOURCE IP ADDRESS ||||||||||||||||
| MULTICAST IP ADDRESS ||||||||||||||||
| r | L3 PORT BITMAP |||||||||||||||
| L3 MODULE BITMAP ||||||||||||||||
| UNUSED |||||||||| TTL THRESHOLD ||| SOURCE PORT |||

Fig.30

| COS QUEUE (3b) | CPF | NCA (2b) | 802.1p PRIORITY (3b) | RATE COUNTER (8b) | RATE COUNTER THRESHOLD (8b) | RATE DISCARD THRESHOLD ID (8b) | NEW CODE POINT (6b) | NEW COS QUEUE (3b) | NEW 802.1 PRIORITY (3b) |
|---|---|---|---|---|---|---|---|---|---|

Fig.31

| OFFSET FIELD | OFFSET 1 | OFFSET 2 | OFFSET 3 | OFFSET 4 |
|---|---|---|---|---|
| 000 | 0-15 | 16-31 | 32-47 | 48-63 |
| 001 | 8-23 | 24-39 | 40-55 | 56-71 |
| 010 | 16-31 | 32-47 | 48-63 | 64-79 |
| 011 | 24-39 | 40-55 | 56-71 | 72-87 |
| 100 | 32-47 | 48-63 | 64-79 | 80-95 |
| 101 | 40-55 | 56-71 | 72-87 | 88-103 |
| 110 | 48-63 | 64-79 | 80-95 | 96-111 |
| 111 | 56-71 | 72-87 | 88-103 | 104-119 |

Fig.40a

| ADDRESS | ENTRY |
|---|---|
| 31 | AF |
| 30 | AE |
| 29 | AD |
| 28 | AC |
| 27 | AB |
| 26 | AA |
| 25 | Z |
| 24 | Y |
| 23 | X |
| 22 | W |
| 21 | V |
| 20 | U |
| 19 | T |
| 18 | S |
| 17 | R |
| 16 | Q |
| 15 | P |
| 14 | O |
| 13 | N |
| 12 | M |
| 11 | L |
| 10 | K |
| 9 | J |
| 8 | I |
| 7 | H |
| 6 | G |
| 5 | F |
| 4 | E |
| 3 | D |
| 2 | C |
| 1 | B |
| 0 | A |

| ADDRESS | ENTRY |
|---|---|
| 30 | AE |
| 28 | AC |
| 26 | AA |
| 24 | Y |
| 22 | W |
| 20 | U |
| 18 | S |
| 16 | Q |
| 14 | O |
| 12 | M |
| 10 | K |
| 8 | I |
| 6 | G |
| 4 | E |
| 2 | C |
| 0 | A |

212

| ADDRESS | ENTRY |
|---|---|
| 31 | AF |
| 29 | AD |
| 27 | AB |
| 25 | Z |
| 23 | X |
| 21 | V |
| 19 | T |
| 17 | R |
| 15 | P |
| 13 | N |
| 11 | L |
| 9 | J |
| 7 | H |
| 5 | F |
| 3 | D |
| 1 | B |

| ADDRESS | ENTRY |
|---|---|
| 31 | NN |
| 30 | MM |
| 29 | LL |
| 28 | KK |
| 27 | JJ |
| 26 | GH |
| 25 | CF |
| 24 | CC |
| 23 | BE |
| 22 | BD |
| 21 | BC |
| 20 | BA |
| 19 | AC |
| 18 | AB |
| 17 | AA |
| 16 | Y |
| 15 | X |
| 14 | V |
| 13 | T |
| 12 | S |
| 11 | R |
| 10 | Q |
| 9 | N |
| 8 | M |
| 7 | L |
| 6 | K |
| 5 | J |
| 4 | G |
| 3 | E |
| 2 | D |
| 1 | C |
| 0 | B |

211

| ADDRESS | ENTRY |
|---|---|
| 30 | MM |
| 28 | KK |
| 26 | GH |
| 24 | CC |
| 22 | BD |
| 20 | BA |
| 18 | AB |
| 16 | Y |
| 14 | V |
| 12 | S |
| 10 | Q |
| 8 | M |
| 6 | K |
| 4 | G |
| 2 | D |
| 0 | B |

212

| ADDRESS | ENTRY |
|---|---|
| 31 | NN |
| 29 | LL |
| 27 | JJ |
| 25 | CF |
| 23 | BE |
| 21 | BC |
| 19 | AC |
| 17 | AA |
| 15 | X |
| 13 | T |
| 11 | R |
| 9 | N |
| 7 | L |
| 5 | J |
| 3 | E |
| 1 | C |

Fig.41b

HIGH SPEED FLOW CONTROL METHODOLOGY

CROSS REFERENCE TO RELATED APPLICATIONS

This application is a continuation application of U.S. patent application Ser. No. 09/709,532, filed Nov. 13, 2000, entitled "HIGH SPEED FLOW CONTROL METHODOLOGY," issued as U.S. Pat. No. 7,539,134, on May 26, 2009, which is a continuation-in-part application of U.S. patent application Ser. No. 09/528,434, filed on Mar. 17, 2000, now U.S. Pat. No. 6,850,521 which claims priority to Provisional Application 60/165,670, filed on Nov. 16, 1999, all of which are incorporated by reference herein in their entirety.

BACKGROUND OF THE INVENTION

1. Field of the Invention

The invention relates to a flow control method for a high speed interface/data bus connection between switching devices.

2. Description of the Related Art

The present invention advances network switching technology in a switch suitable for use in Ethernet, fast Ethernet, Gigabit Ethernet, and other types of network environments which require high performance switching of data packets or data cells. A switch utilizing the disclosed elements, and a system performing the disclosed steps, provides cost and operational advantages over the prior art.

SUMMARY OF THE INVENTION

The invention is therefore directed to a method for controlling data flow across a link; the method includes the steps of transmitting a packet request message from a first station to a second station, then determining of the packet request message is valid. A request acknowledge message is transmitted from the second station to the first station, and it is then determined if the request acknowledge message is valid. The packet request message and the request acknowledge message each includes a control bit string, an identification bit string, and at least one parity bit.

The invention is also directed to a data flow control method for controlling data transmitted across a high speed link. The method comprises the steps of transmitting a packet request message from a first station to a second station. The packet request message has a first identification number, a first control code group, and a first parity parameter associated therewith. The first identification number associated with the packet request message is stored, and a request acknowledge message is transmitted from the second station to the first station. The request acknowledge message has a second identification number, a second control group, and a second parity parameter associated therewith. It is then determined if the first and second control groups are valid, and then if the second identification number matches the first identification number. It is then determined if the first and second parity parameters are valid.

The invention also includes an apparatus for controlling data flow across a link. The apparatus comprises a first transmitting unit for transmitting a packet request message from a first station to a second station. The packet request message includes a first identification number, a first control code group, and a first parity parameter associated therewith. A storage unit is provided for storing the first identification number associated with the packet request message. A second transmitting unit is provided for transmitting a request acknowledge message from the second station to the first station. The request acknowledge message has a second identification number, a second control group, and a second parity parameter associated therewith. At least one flow logic unit is provided for determining if the first and second control groups are valid, determining if the second identification number matches the first identification number, and determining if the first and second parity parameters are valid.

BRIEF DESCRIPTION OF THE DRAWINGS

The objects and features of the invention will be more readily understood with reference to the following description and the attached drawings, wherein:

FIG. 5 illustrates P-channel message types;

FIG. 6 illustrates a message format for S channel message types;

FIG. 20 is a table listing numerous fields for various packet types;

FIGS. 21A and 21B illustrate a filter mask format and a field mask format, respectively;

FIG. 23 illustrates an example of a format for a rules table;

FIG. 24 illustrates a format for an IP multicast table;

FIG. 30 is a diffserv-to-COS mapping table;

FIG. 31 illustrates the configuration of the offsets;

FIG. 40a illustrates a first example of address entries stored in an a single address table;

FIG. 40b illustrates a second example of address entries stored in two separate sorted address tables;

FIG. 41a illustrates a third example of address entries stored in a single address table;

FIG. 41b illustrates a fourth example of address entries stored in two separate sorted address tables;

DETAILED DESCRIPTION OF THE PREFERRED EMBODIMENTS

Figure 1:
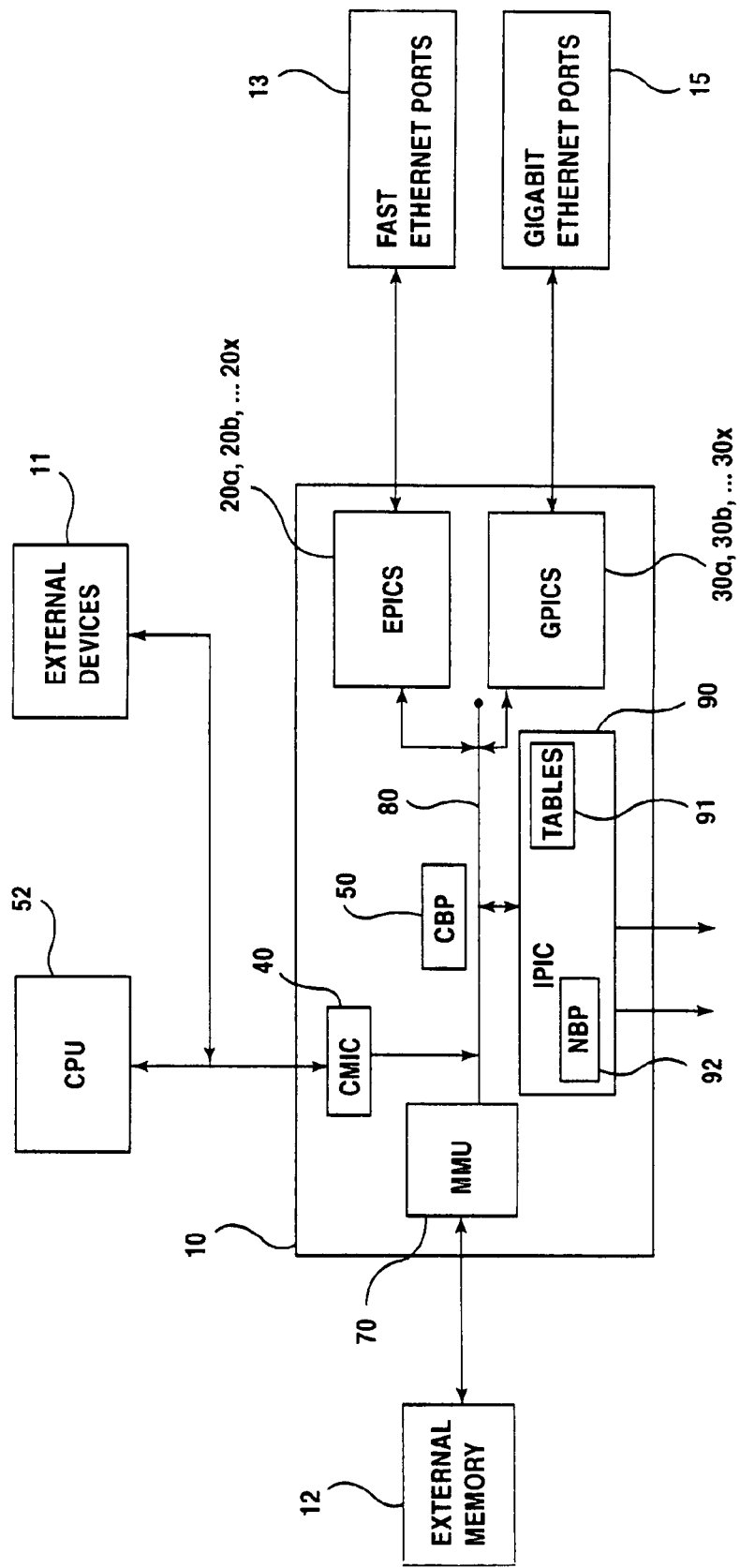
FIG. 1 is a general block diagram of elements of a network switch as discussed herein.

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of networking systems can be found, for example, in SWITCHED AND FAST Ethernet, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic Ethernet wirespeed is up to 10 megabits per second, and Fast Ethernet is up to 100 megabits per second. Gigabit Ethernet is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead which compared to DRAMs such as elimination of page misses, etc. Although DRAMs have adequate speed when accessing locations on the same page, speed is reduced when other pages must be accessed.

Figure 7:
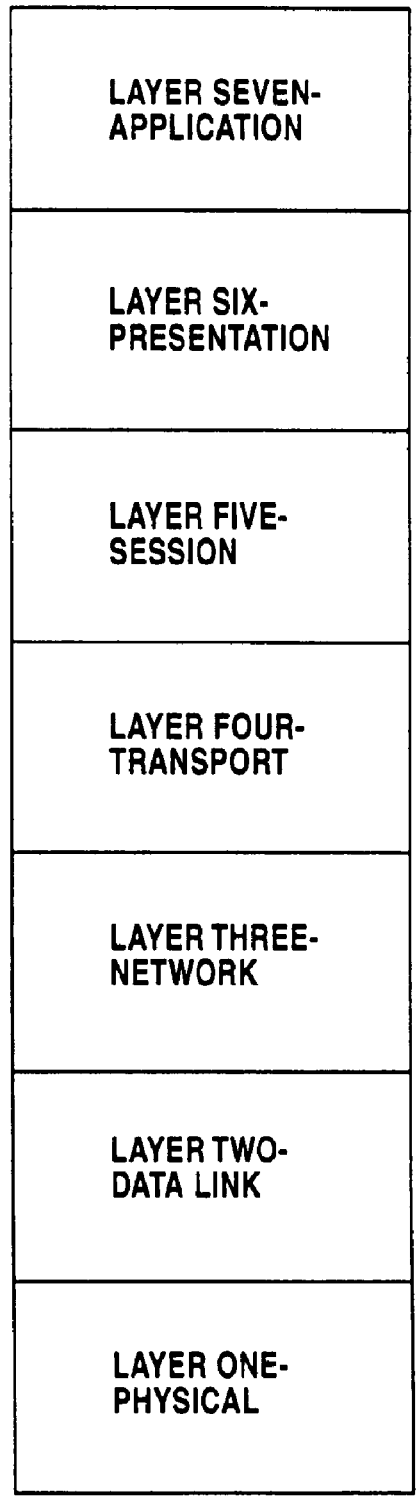
FIG. 7 is an illustration of the OSI 7 layer reference model.

Referring to the OSI 7-layer reference model discussed previously, and illustrated in FIG. 7, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multipart bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off-loading the host CPU so that instruction decisions do not delay packet forwarding.

FIG. 1 illustrates a configuration wherein a switch-on-chip (SOC) 10, in accordance with the present invention, is functionally connected to external devices 11, external memory 12, fast Ethernet ports 13, and gigabit Ethernet ports 15. For the purposes of this embodiment, fast Ethernet ports 13 will be considered low speed Ethernet ports, since they are capable of operating at speeds ranging from 10 Mbps to 100 Mbps, while the gigabit Ethernet ports 15, which are high speed Ethernet ports, are capable of operating at 1000 Mbps. External devices 11 could include other switching devices for expanding switching capabilities, or other devices as may be required by a particular application. External memory 12 is additional off-chip memory, which is in addition to internal memory which is located on SOC 10, as will be discussed below. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches. As also will be discussed below, SOC 10 utilizes external memory 12 in an efficient manner so that the cost and performance requirements of memory 12 can be reduced. Internal memory on SOC 10, as will be discussed below, is also configured to maximize switching throughput and minimize costs.

It should be noted that any number of fast Ethernet ports 13 and gigabit Ethernet ports 15 can be provided. In one embodiment, a maximum of 24 fast Ethernet ports 13 and 2 gigabit ports 15 can be provided. Similarly, additional interconnect links to additional external devices 11, external memory 12, and CPUs 52 may be provided as necessary.

FIG. 1 also illustrates that SOC 10 includes various internal modular components, such as at least one Ethernet port interface controller (EPIC) 20, a plurality of which will be referred to as 20*a*, 20*b*, . . . 20*x*, a plurality of gigabit port interface controllers (GPIC) 30, referred to herein as 30*a*, 30*b*, . . . 30*x*, an internet port interface controller (IPIC) 90, a common buffer pool (CBP) 50, a memory management unit (MMU) 70, and a CPU management interface controller (CMIC) 40. CPS channel 80 runs through SOC 10, and enables communication between the modular elements of SOC 10.

Figure 2:
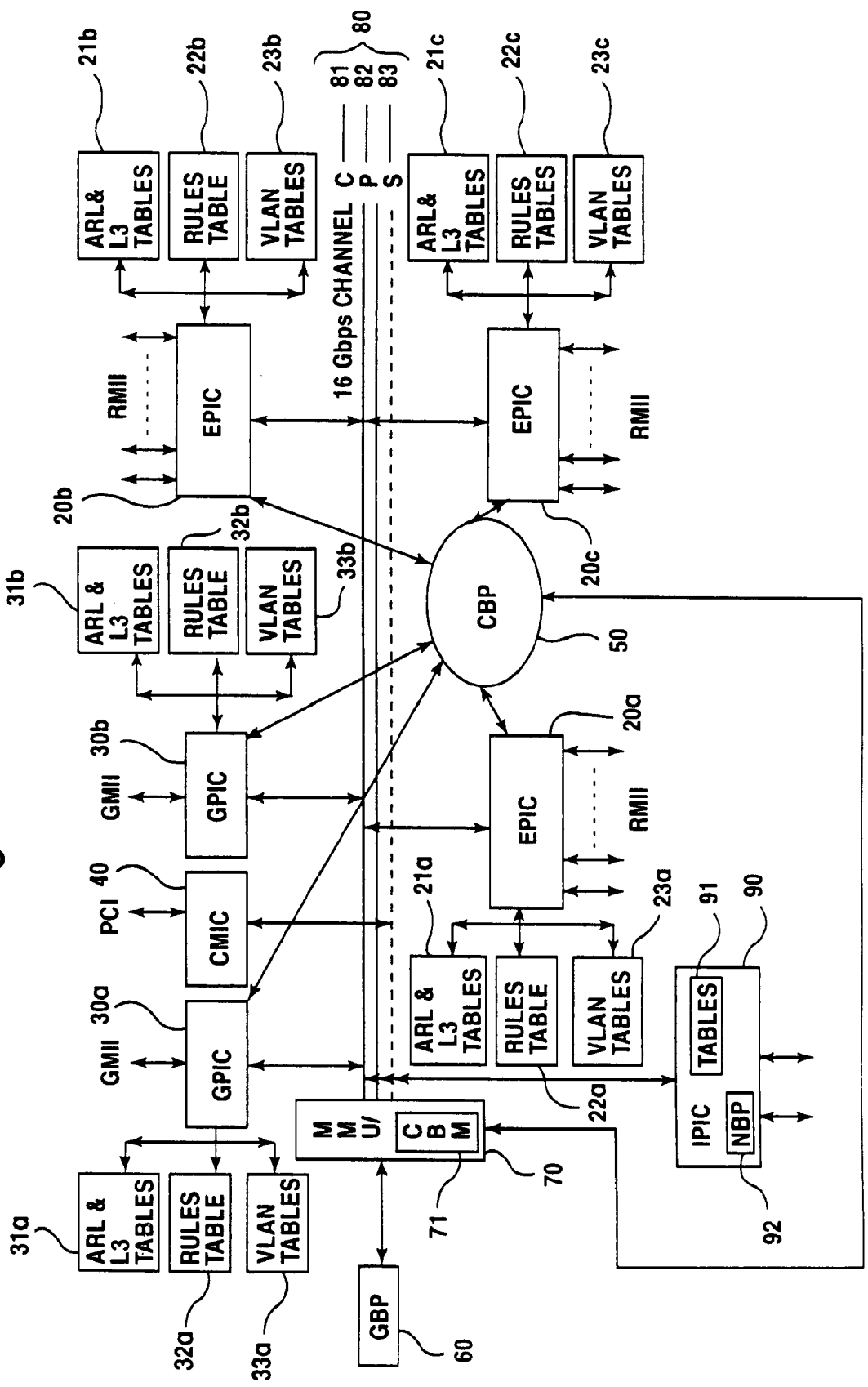
FIG. 2 is a more detailed block diagram of the network switch.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from the other modular systems. Therefore, each module can efficiently operate in parallel with other modules, and this configuration enables a significant amount of freedom in updating and re-engineering SOC 10.

SOC 10 includes a plurality of Ethernet Port Interface Controllers 20*a*, 20*b*, 20*c*, etc., a plurality of Gigabit Port Interface Controllers 30*a*, 30*b*, etc., a CPU Management Interface Controller 40, a Common Buffer Memory Pool 50, a Memory Management Unit 70, including a Common Buffer Manager (CBM) 71, and a system-wide bus structure referred to as CPS channel 80. The MMU 70 communicates with external memory 12, which includes an external Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, also included is internet port interface controller (IPIC) 90, which includes a plurality of tables 91, and network buffer pool (NBP) 92 thereupon. Also, included in IPIC 90, and discussed later, are a plurality of components associated with enabling IPIC 90 to communicate with other switches, or other components through a high performance interface. IPIC 90 enables high efficiency stacking configurations to be created.

As will be discussed below, each EPIC 20*a*, 20*b*, and 20*c*, generally referred to as EPIC 20, and GPIC 30*a* and 30*b*, generally referred to as GPIC 30, are closely interrelated with appropriate address resolution logic and layer three switching tables 21*a*, 21*b*, 21*c*, 31*a*, 31*b*, rules tables 22*a*, 22*b*, 22*c*, 31*a*, 31*b*, and VLAN tables 23*a*, 23*b*, 23*c*, 31*a*, 31*b*. These tables will be generally referred to as 21, 31, 22, 32, 23, 33, respectively. These tables, like other tables on SOC 10, are implemented in silicon as x by y two-dimensional arrays, wherein each array has (x·y) memory storage locations therein.

In one embodiment of the subject invention, each EPIC 20 supports 8 fast Ethernet ports 13, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast Ethernet, wherein the network is capable of negotiating a highest communication speed between a source and a destination based on the capabilities of the respective devices. The communication speed can vary, as noted previously, between 10 Mbps and 100 Mbps; auto-negotiation capability, therefore, is built directly into each EPIC module. The address resolution logic (ARL) and layer three tables (ARL/L3) 21*a*, 21*b*, 21*c*, rules table 22*a*, 22*b*, 22*c*, and VLAN tables 23*a*, 23*b*, and 23*c* are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic (ARL) is utilized to assist in this task. Address aging is built in as a feature, in order to eliminate the storage of address information which is no longer valid or useful. EPIC 20 also carries out layer 2 mirroring. A fast filtering processor (FFP) 141 (see FIG. 14) is incorporated into each EPIC and GPIC, in order to accelerate packet forwarding and enhance packet flow. The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 has a separate ingress submodule 14 associated therewith. From an implementation perspective, however, in order to minimize the amount of hardware implemented on the single-chip SOC 10, common hardware elements in the silicon will be used to implement a plurality of ingress submodules on each particular module. The configuration of SOC 10 discussed herein enables concurrent lookups and filtering, and therefore, allows for processing of up to 6.6 million packets per second. Layer two lookups, layer three lookups, and filtering occur simultaneously to achieve this level of performance. On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with Ethernet port interface.

Each GPIC 30 is similar to each EPIC 20, but supports only one gigabit Ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMiC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI 64.

Common buffer memory pool or CBP 50 can be considered to be the on-chip data memory. In one embodiment, CBP 50 is first level high speed SRAM type memory, to maximize performance and minimize hardware overhead requirements. CBP 50 can have a size of, for example, 720 kilobytes running at 132 MHZ. Packets stored in the CBP 50 are typically stored as a series of linked cells, rather than packets. The packets are stored and moved within SOC 10 as cells, and reassembled as packets before being sent out on appropriate egress ports. As illustrated in the figure, MMU 70 also contains the Common Buffer Manager (CBM) 71 thereon. CBM 71 handles queue management, and is responsible for assigning cell pointers to incoming cells, as well as assigning common packet IDs (CPIDs) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In one embodiment, GBP 60 is located off chip with respect to SOC 10. When located off-chip, GBP 60 is considered to be a part of or all of external memory 12. As a second level memory, the GBP does not need to be expensive high speed SRAMs, and can be a slower less expensive memory, such as DRAM. The GBP is tightly coupled to the MMU 70, and operates like the CBP in that packets are stored as cells. For broadcast and multicast messages, only one copy of the packet is stored in GBP 60.

As shown in the figures, MMU 70 is located between GBP 60 and CPS channel 80, and acts as an external memory interface. In order to optimize memory utilization, MMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control.

As shown in FIG. 2, the CPS channel 80 is actually three separate channels, referred to as the C-channel, the P-channel, and the S-channel. The C-channel is 128 bits wide, and runs at 132 MHZ. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the MMU. The P-channel is 64 bits wide, and runs at 132 MHZ.

The S or sideband channel runs at 132 MHZ, and is 32 bits wide. The S-channel is used for functions such as for conveying Port Link Status, receive port full, port statistics, ARL table synchronization, memory and register access to CPU and other CPU management functions, and global memory full and common memory full notification.

Figure 3:
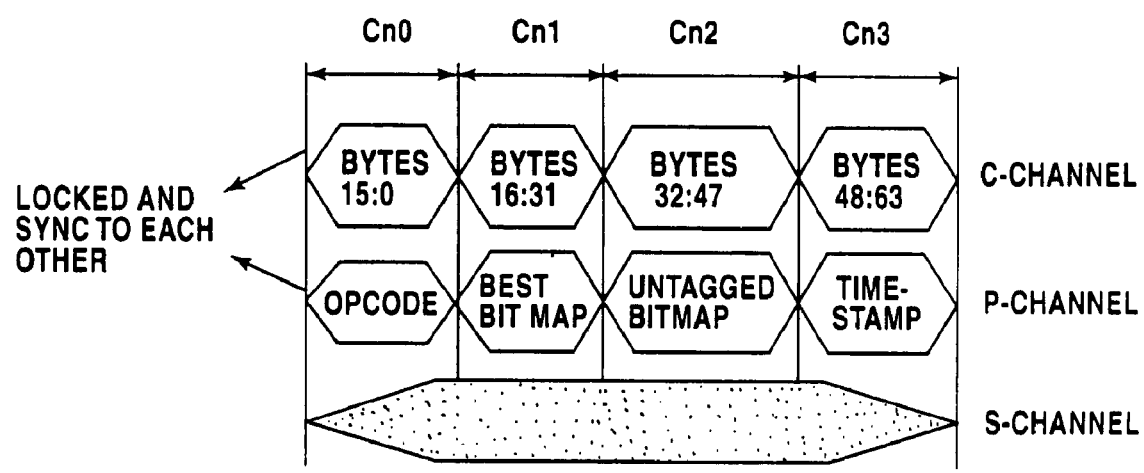
FIG. 3 illustrates the data flow on the CPS channel of the network switch.

A proper understanding of the operation of SOC 10 requires a proper understanding of the operation of CPS channel 80. Referring to FIG. 3, it can be seen that in SOC 10, on the ingress, packets coming in to an EPIC or GPIC are sliced by the EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In the SOC, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

IPIC 90 communicates with CPS channel 80 and functions essentially like a port. Packets coming into the IPIC from the outside of SOC 10 would either be coming from another IPIC module on another SOC 10, or from other links through a high performance interface. The IPIC, therefore, is distinguishable from an EPIC module 20, since each EPIC will typically have a plurality of ports, while the IPIC has a single port. As will be discussed in more detail, the IPIC includes an internal memory buffer called the network buffer pool or NBP, and which is illustrated in FIGS. 1 and 2 as NBP 92. IPIC 90 also includes a plurality of tables 91 for packet handling, such as a VLAN Table 802.1q, trunking tables, etc. IPIC 90 does not have ARL tables, since the destination port number will be available in the module header. Packets which come in to SOC 10 through either an EPIC 20 or a GPIC 30, which are destined for IPIC 90, are not stored in the CBP or GBP, but instead are routed to and stored in NBP 92 within IPIC 90 itself.

Cell or C-Channel

Figure 4A:
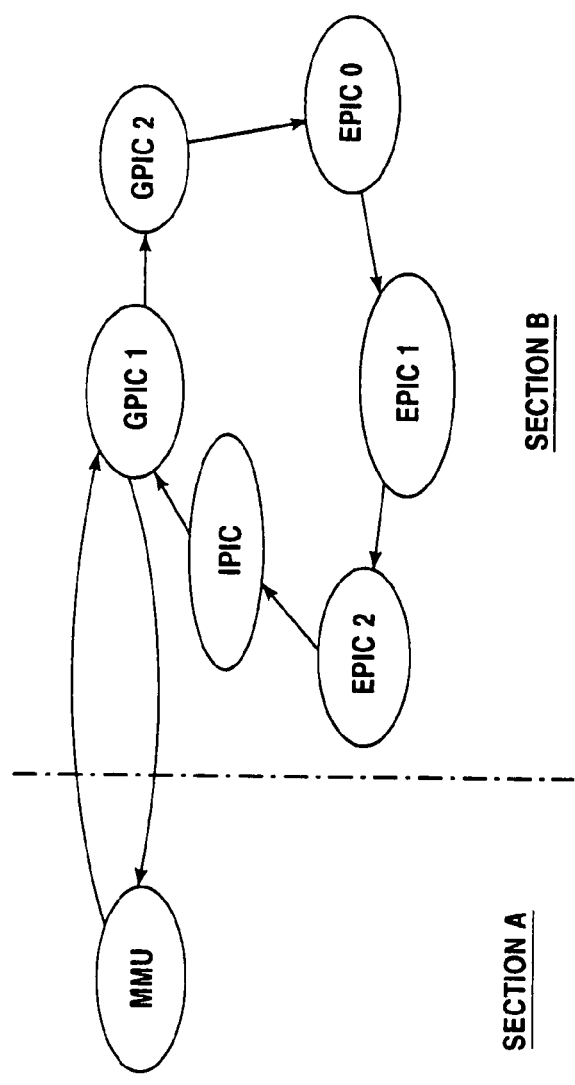
FIG. 4A illustrates demand priority round robin arbitration for access to the C-channel of the network switch.
Figure 4B:
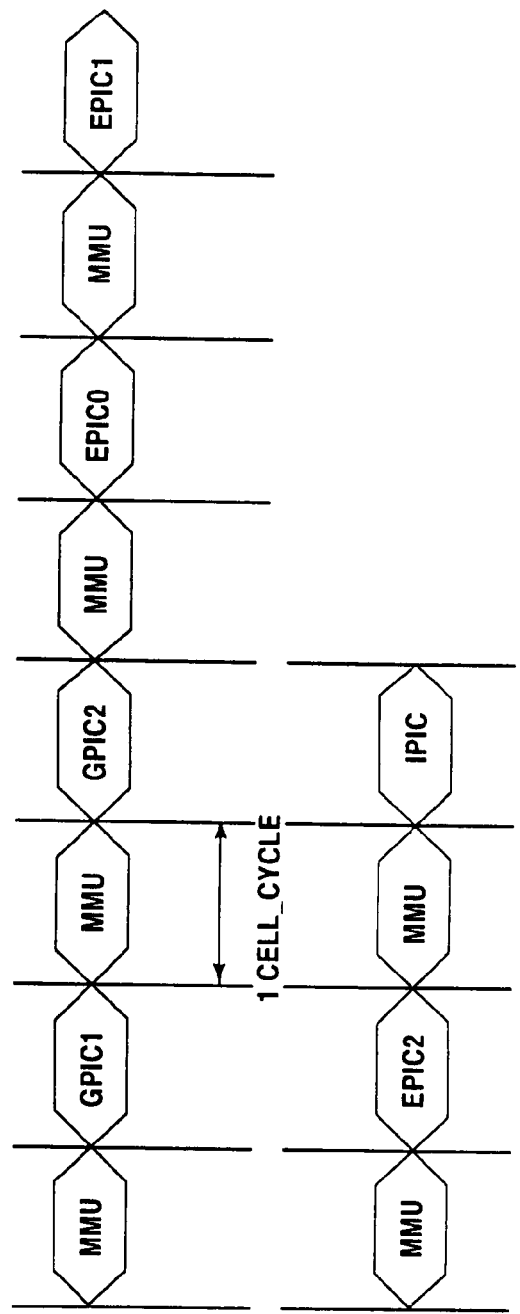
FIG. 4B illustrates access to the C-channel based upon the round robin arbitration illustrated in FIG. 4A.

Arbitration for the CPS channel occurs out of band. Every module (EPIC, GPIC, IPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the MMU is granted access every other cell cycle, and EPICs 20, GPICs 30, and IPIC 90 share equal access to the C-channel on a round robin basis. FIGS. 4A and 4B illustrate a C-channel arbitration mechanism wherein section A is the MMU, and section B consists of two GPICs, three EPICs, and one IPIC. The sections alternate access, and since the MMU is the only module in section A, it gains access every other cycle. The modules in section B, as noted previously, obtain access on a round robin basis.

The C channel 81 arbitration scheme, as discussed previously and as illustrated in FIGS. 4A and 4B, is Demand Priority Round-Robin. Each I/O module, EPIC 20, GPIC 30, CMIC 40, and IPIC 90, along with the MMU 70, can initiate a request for C channel access. If no requests exist at any one given time, the default module established with a high priority gets complete access to the C channel 81. If any one single I/O module or the MMU 70 requests C channel 81 access, that single module gains access to the C channel 81 on-demand.

If EPIC modules 20*a*, 20*b*, 20*c*, and GPIC modules 30*a* and 30*b*, IPIC 90, and CMIC 40 simultaneously request C channel access, then access is granted in round-robin fashion. For a given arbitration time period each of the I/O modules would be provided access to the C channel 81. For example, each GPIC module 30*a* and 30*b* would be granted access, followed by the EPIC modules, and finally the CMIC 40. After every arbitration time period the next I/O module with a valid request would be given access to the C channel 81. This pattern would continue as long as each of the I/O modules provide an active C channel 81 access request.

Protocol or P-Channel

Referring once again to the protocol or P-channel, a plurality of messages can be placed on the P-channel in order to properly direct flow of data flowing on the C-channel. Since P-channel 82 is 64 bits wide, and a message typically requires 128 bits, two smaller 64 bit messages are put together in order to form a complete P-channel message. The following list identifies the fields and function and the various bit counts of the 128 bit message on the P-channel.

IP/IPX Bits—2 bits long—IP/IPX Bits—contains information on Packet Type. Value 0—is L2 switched Packet. Value 1—The packet is IP Switched Packet. Value 2—The packet is IPX Switched Packet. Value 3—The packet is IP Multicast Packet.

Next Cell—2 bits long—Next Cell has this unique requirement to satisfy Cell header: Value 01—If the valid bytes in this cell between 1 to 16. Value 02—If the valid bytes in this cell are between 17 to 32. Value 03—If the valid bytes in this cell are between 33 to 48. Value 00—If the valid bytes in this cell are between 49 to 64. For the First cell all four cycles are valid.

Src Dest Port—6 bits long—The Port Number which sends the Message or receive the message. The interpretation of Source or Destination depends on Opcode.

Cos—3 bits long—COS—Class of Service for this packet.

J Bit—1 bit long—J bit in the message identifies that the Packet is a Jumbo Packet.

S Bit—1 bit long—S bit is used to identify that this is the first cell of the Packet. When S bit is set all four cycles are valid.

E Bit—1 bit long—E Bit is used to identify that this is the last cell of the Packet. If E bit is set then the length field contains the number of valid bytes in the transfer.

CRC Bits—2 bits long—Value 0x01—is Append CRC Bit. If it is set then the egress Port should append the CRC to the packet. Value 0x02—is Regenerate CRC Bit. If this bit is set then the egress Port should regenerate CRC. Value 0x00—no change in CRC. Value 0x03—unused.

P Bit—1 bit long—If this bit is set then MMU should Purge the entire Packet.

Len—7 bits long—The Len Bits is used to identify the valid number of bytes in this transfer. This field is valid for every cell.

O Bits—2 bits long—Optimization Bits are provided for CPU so that it can process the packet more efficiently. Value 0—Not Used. Value 1—is set when the packet is send to the CPU as a result of C Bit set in the Default Router Table. Value 2—Frame Type Mismatch—If this bit is set then IPX Frame Packet Type does not match the Packet Type in the IPX L3 Table. Value 3—Reserved.

Bc/Mc Bitmap—31 bits long—Broadcast and Multicast Bitmap. This field identifies all the egress ports, the packet should be sent to.

UnTagged Bits/Source Port (bit 0.5)—31/5 bits long—If the opcode is 0x02, that is, the packet is being transferred from Port to MMU then this field is interpreted as Untagged Bitmap. But if the opcode is 0x01, that is, the packet is being transferred from MMU to Egress Port then the last 6 bits of this field is interpreted as Source Port field. Untagged Bits—This bits identifies all the egress ports which is suppose to Strip the Tag Header. Source Port (bit 0.5)—The Source Port Number i.e. the port number on which this packet has entered the switch.

U Bit—1 bit long—U Bit—This field has meaning only if the opcode is 0x01, that is, the packet is being transferred from MMU to Egress. If this bit is set then the packet should go out of the port as Untagged, that is, MAC has to do the Tag stripping.

Time Stamp—14 bits long—Time Stamp is a 14 bit running counter, which the system puts in this field when the packet arrives. Time Stamp is implemented with the granularity of 1 usec.

Vlan Id—12 bits long—Vlan Identifier. Note: In Orion-SA all the packets on the CP Channel are transmitted as Tagged Packet. i.e. the VLAN Id is sent along with the packet where as in Orion-SM VLAN Id is passed on the Pchannel. That means any packet (untagged or tagged) will go as is on Cell Channel.

Matched Filter—4 bits long—Matched Filter Rules—This field identifies the matched Filter if the packet has to go to CPU as a result of Filter match. This field is valid only if bit 0 of CPU Opcodes is set. If the MSB (bit 4) is 0 then it is Filter set 1, but is the MSB (bit 4) is 1 then it is Filter set 2.

CPU Opcodes—18 bits long—CPU Opcodes: We have provided these bits for efficient processing of the packet by the CPU. These bits are set if the packet is sent to the CPU for various reasons. The following Opcodes are defined: Bit 0—Filter Match Bit—This bit is set as a result of Filter match and one of the Action of the filter is to send the Packet to CPU. Bit 1—This bit is set if the 1) CPU Learn bit is set in the Port Based VLAN Table and the Source Mac Address is learnt in the ARL Table, or 2) CM Bit is set in the PVLAN table and it's a SLF or 3) the incoming VLAN Id is not found in 802.1Q VLAN Table. Bit 2—This bit is set if the Source Routing Bit is bit 40 of the Source Mac Address. Bit 3—This bit is set if 1) it's a Destination lookup failure or 2) there is L3 station Movement. Bit 4—Control Frame Bit—This bit is set if the Packet is a BPDU, GVRP, GMRP or one of the Reserved addresses. Bit 5—IP Packet Bit—This bit is set if the Packet needs to be IP switched. Bit 6—IPX Packet Bit—This bit is set if the Packet needs to be IPX switched. Bit 7—IP Options Present Bit—This bit is set if IP options are present. Bit 8—This bit is set if the Packet is Class D IP Multicast Packet. Bit 9—This bit is set if TTL is zero or less after decrement. Bit 10—Broadcast Bit—If this bit is set then the Packet is a Broadcast Packet. Bit 11—Multicast Packet—This bit is set if the Packet is a Multicast Packet.

New IP Checksum—16 bits long—New IP Checksum—This field is used only for Layer 3 Switched—IP Multicast Packets. This field contains the new IP checksum calculated by Ingress after decrementing the TTL field.

L3 Port Bitmap—31 bits long—L3 Port Bitmap—identifies all the L3 switched ports for IP Multicast Packet.

Module Specific Fields:

C Bit—1 bit long—Control Bit—The Control Bit identifies whether this is a Control frame or a data frame. This bit is set to 1 for Control Frame and is set to 0 for data frame.

Mod Opcodes—3 bits long—Mod Opcodes—are used to identify the Packet Type. Value 00—identifies that the packet is a unicast Packet and the Egress Port is uniquely identified by Module Id Bitmap (only one bit will be set in this field) and the Egress Port Number. Value 01—identifies that the Packet is a Broadcast or Destination Lookup Failure (DLF) and is destined to Multiple Ports on the same Module or multiple ports on different Modules. The Egress port is not a valid field in this scenario. Value 02—identifies that the packet is a multicast packet and is addressed to multiple ports. Value 03—identifies that the Packet is a IP Multicast Packet and is addressed to Multiple Ports.

TGID—3 bits long—TGID Bits—TGID identifies the Trunk Group Identifier of the Source Port. This field is valid only if T bit is set. T—1 bit long—T Bit—If this bit is set then TGID is a valid field.

MT Module Id—5 bits long—MT Module Id is "Mirrored-To" Module Id. This field is used to send the packet to a "mirrored-to" port, which is located on a remote Module. This field is valid only if M bit is set.

M Bit—1 bit long—M Bit—If this bit is set then MT Module Id is a valid field.

Remote Port—6 bits long—Remote Port is the Port Number on the remote module, which is suppose to receive this packet.

Src Port—6 bits long—Source Port is the Source Port of the Packet.

PFM Bits—2 bits long—PFM Bits is the Port Filtering Mode of the Source Port. This bits are valid only for Multicast Packet.

Mod Id Bitmap—32 bits long—The Bitmap of all the modules that should get this Packet.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 5.

An early termination message is used to indicate to CBM 71 that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Because SOC 10 is configured for efficient stacking configurations, 32 bits are provided on protocol channel messages for a module ID bitmap, which is a bitmap of all of the modules of a stack which should get the packet. Because of the importance of the module ID in SOC 10, the module ID and the port number (determinable from the remote port field), are important for proper packet flow in a stack.

The time stamp field of the message has a resolution of 1 µs and is valid only for the first cell of the packet defined by the S bit field of the message. A cell is defined as the first cell of a received packet when the S bit field of the message is set to a logical one value.

As is described in more detail below, the C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 is a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table synchronization, CPU 52 access to GBP 60 and CBP 50 memory buffers and SOC 10 control registers, and memory full notification corresponding to GBP 60 and/or CBP 50.

FIG. 6 illustrates a message format for an S channel message on S channel 83. The message is formed of four 32-bit words; the bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data—0-127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the SOC 10 supports fast Ethernet ports, gigabit ports, and extendible interconnect links as discussed above. The SOC configuration can also be stacked as noted previously, thereby enabling significant port expansion capability. Once data packets have been received by SOC 10, sliced into cells, and placed on CPS channel 80, stacked SOC modules can interface with the CPS channel, monitor the channel, and extract appropriate information as necessary. As will be discussed below, a significant amount of concurrent lookups and filtering occurs as the packet comes into ingress submodule 14 of an EPIC 20 or GPIC 30, with respect to layer two and layer three lookups, and fast filtering.

Figure 8:
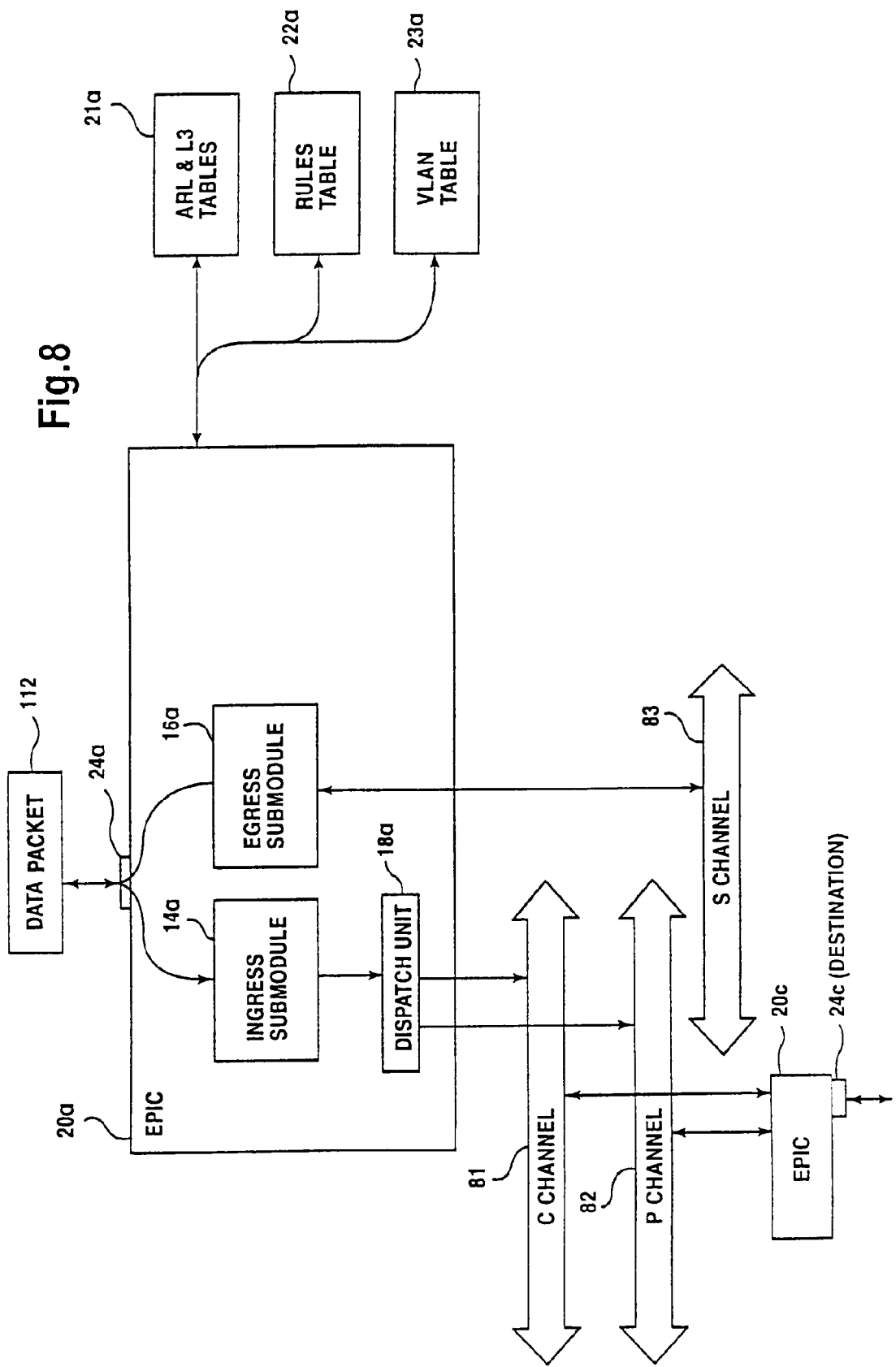
FIG. 8 illustrates an operational diagram of an EPIC module.
Figure 9:
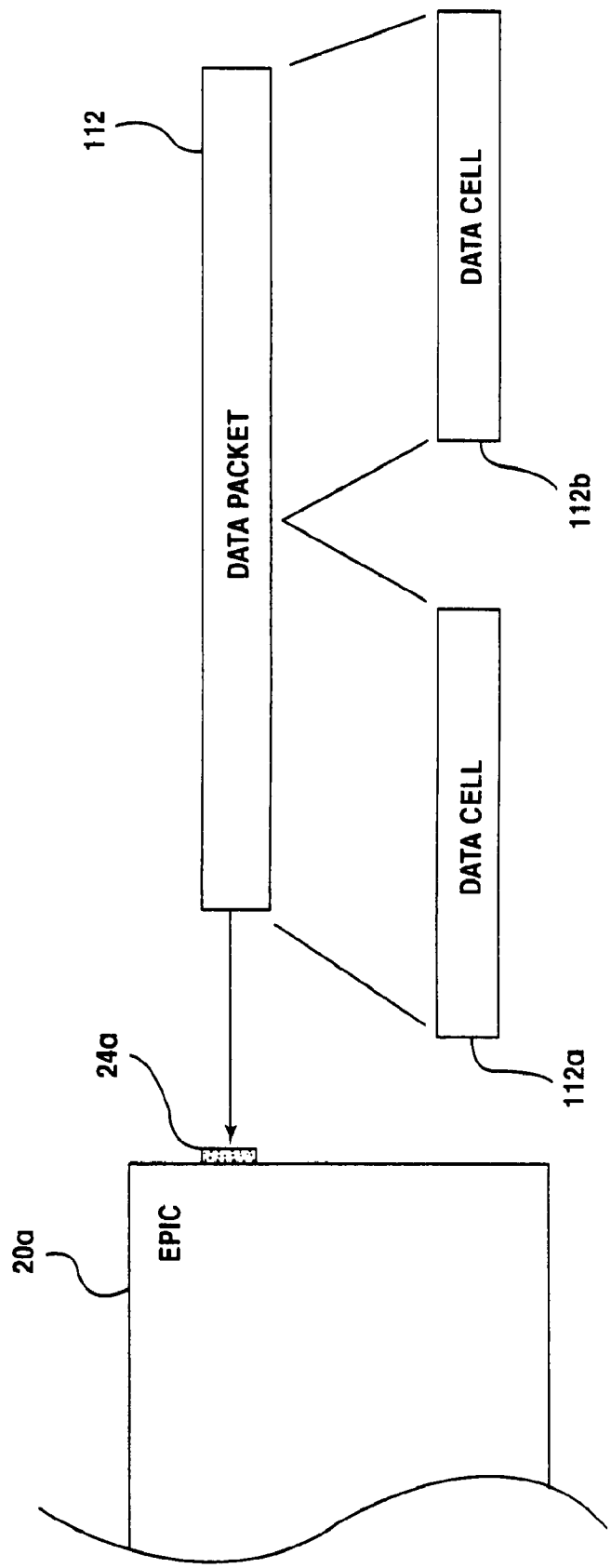
FIG. 9 illustrates the slicing of a data packet on the ingress to an EPIC module.

Now referring to FIGS. 8 and 9, the handling of a data packet is described. For explanation purposes, Ethernet data to be received will consider to arrive at one of the ports 24a of EPIC 20a. It will be presumed that the packet is intended to be transmitted to a user on one of ports 24c of EPIC 20c. All EPICs 20 (20a, 20b, 20c, etc.) have similar features and functions, and each individually operate based on packet flow.

An input data packet 112 is applied to the port 24a is shown. The data packet 112 is, in this example, defined per the current standards for 10/100 Mbps Ethernet transmission and may have any length or structure as defined by that standard. This discussion will assume the length of the data packet 112 to be 1024 bits or 128 bytes.

It should be noted that each EPIC 20 and each GPIC 30 has an ingress submodule 14 and egress submodule 16, which provide port specific ingress and egress functions. All incoming packet processing occurs in ingress submodule 14, and features such as the fast filtering processor, layer two (L2) and layer three (L3) lookups, layer two learning, both self-initiated and CPU 52 initiated, layer two table management, layer two switching, packet slicing, offset application, and channel dispatching occurs in ingress submodule 14. After lookups, fast filter processing, and slicing into cells, as noted above and as will be discussed below, the packet is placed from ingress submodule 14 into dispatch unit 18, and then placed onto CPS channel 80 and memory management is handled by MMU 70. A number of ingress buffers are provided in dispatch unit 18 to ensure proper handling of the packets/cells. Once the cells or cellularized packets are placed onto the CPS channel 80, the ingress submodule is finished with the packet. The ingress is not involved with dynamic memory allocation, or the specific path the cells will take toward the destination. Egress submodule 16, illustrated in FIG. 8 as submodule 16a of EPIC 20a, monitors CPS channel 80 and continuously looks for cells destined for a port of that particular EPIC 20. When the MMU 70 receives a signal that an egress associated with a destination of a packet in memory is ready to receive cells, MMU 70 pulls the cells associated with the packet out of memory, as will be discussed below, and places the cells on CPS channel 80 destined for the appropriate egress submodule. A FIFO in the egress submodule 16 continuously sends a signal onto the CPS channel 80 that it is ready to receive packets, when there is room in the FIFO for packets or cells to be received. As noted previously, the CPS channel 80 is configured to handle cells, but cells of a particular packet are always handled together to avoid corrupting or misordering of packets.

Figure 11:
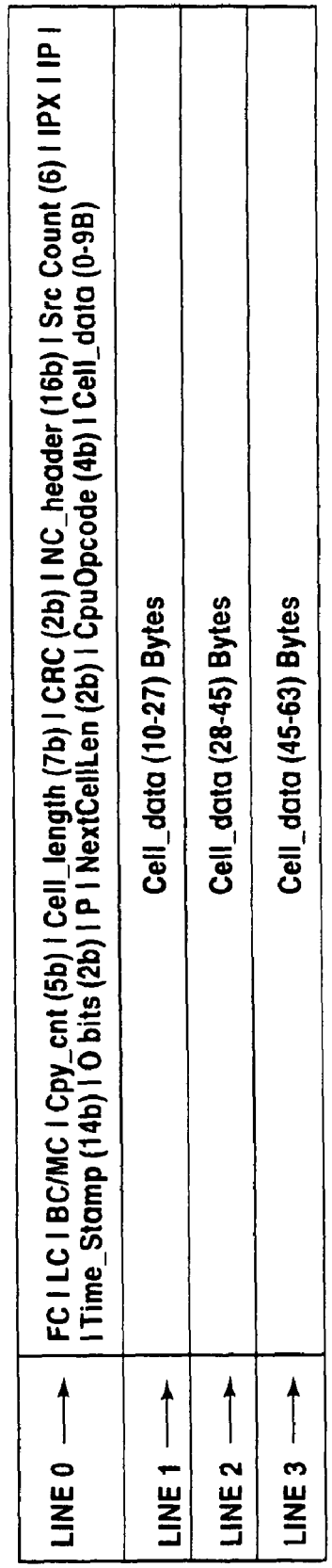
FIG. 11 illustrates the CBM cell format.

In one embodiment of the subject invention, when data packet 112 is received by EPIC module 20a, ingress submodule 14a within EPIC 20a, as an ingress function, determines the destination of the packet 112. Specifically, the first 64 bytes of data packet 112 constituting header information are buffered by the ingress sub-module 14a and compared to data stored in the ARL/L3 tables 21a to determine the destination port 24c of the data packet 112. Also as an ingress function, the ingress sub-module 14a slices the data packet 112 into an appropriate number of 64-byte cells. In this case, the exemplary 128 byte packet is sliced in two 64 byte cells 112a and 112b. Although the exemplary data packet 112 shown in this example is exactly two 64-byte cells 112a and 112b, an actual incoming data packet may, and often times does include any number of cells, wherein at least one of these cells is of a length less than 64 bytes. In these situations, padding bytes are added to the incomplete cell to fill the entire 64 bytes of the cell. In such cases the ingress sub-module 14a disregards the padding bytes within the cell and processes the packet as any other. Further discussions of packet handling will refer to packet 112 and/or cells 112a and 112b. A typical cell format is shown in FIG. 11.

In order to overcome data flow degradation problems associated with overhead usage of the C channel 81, all L2 learning and L2 table management is achieved through the use of the S channel 83. L2 self-initiated learning is achieved by deciphering the source address of a user at a given ingress port 24 utilizing the packet's associated address. Once the identity of the user at the ingress port 24 is determined, the ARL/L3 tables 21a are updated to reflect the user identification. The ARL/L3 tables 21 of each other EPIC 20 and GPIC 30 are updated to reflect the newly acquired user identification in a synchronizing step, as will be discussed below. As a result, while the ingress of EPIC 20a may determine that a given user is at a given port 24a, the egress of EPIC 20b, whose table 21b has been updated with the user's identification at port 24a, can then provide information to the user at port 24a without re-learning which port the user was connected, which increases the ARL lookup efficiency of SOC 10.

Table management may also be achieved through the use of CPU 52. CPU 52, via the CMIC 40, can provide the SOC 10 with software functions that result in the designation of the identification of a user at a given port 24. However, as discussed above, it is undesirable for the CPU 52 to continually access the packet information in its entirety, as this would lead to performance degradation. Rather, the SOC 10 is generally programmed by the CPU 52 with identification information concerning the user. Thereafter, SOC 10 can maintain real-time data flow, as the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21a. If the packet is addressed to one of the layer three (L3) switches of the SOC 10, then the ingress sub-module 14a performs the L3 and default table lookup. Once the destination port has been determined, the EPIC 20*a* sets a ready flag in the dispatch unit 18*a* which then arbitrates for C channel 81.

If all the I/O modules, including the MMU 70, request C channel 81 access, MMU 70 is granted access as shown in FIG. 4B since the MMU provides a critical data path for all modules on the switch. Upon gaining access to the channel 81, the dispatch unit 18*a* (FIG. 9) proceeds in passing the received packet 112, one cell at a time, to C channel 81.

Referring again to FIG. 3, the individual C, P, and S channels of the CPS channel 80 are shown. Once the dispatch unit 18*a* has been given permission to access the CPS channel 80, during the first time period Cn0, the dispatch unit 18*a* places the first 16 bytes of the first cell 112*a* of the received packet 112 on the C channel 81. Concurrently, the dispatch unit 18*a* places the first P channel message corresponding to the currently transmitted cell. As stated above, the first P channel message defines, among other things, the message type. Therefore, this example is such that the first P channel message would define the current cell as being a unicast type message to be directed to the destination egress port 21*c*.

During the second clock cycle Cn1, the second 16 bytes (16:31) of the currently transmitted data cell 112*a* are placed on the C channel 81. Likewise, during the second clock cycle Cn1, the Bc/Mc Port Bitmap is placed on the P channel 82.

As indicated by the illustration of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112*a* of the incoming packet 112 is placed on the CPS channel 80 the MMU 70 determines whether the cell is to be transmitted to an egress port 21 local to the SOC 10.

If the MMU 70 determines that the current cell 112*a* on the C channel 81 is destined for an egress port of the SOC 10, the MMU 70 takes control of the cell data flow.

Figure 10:
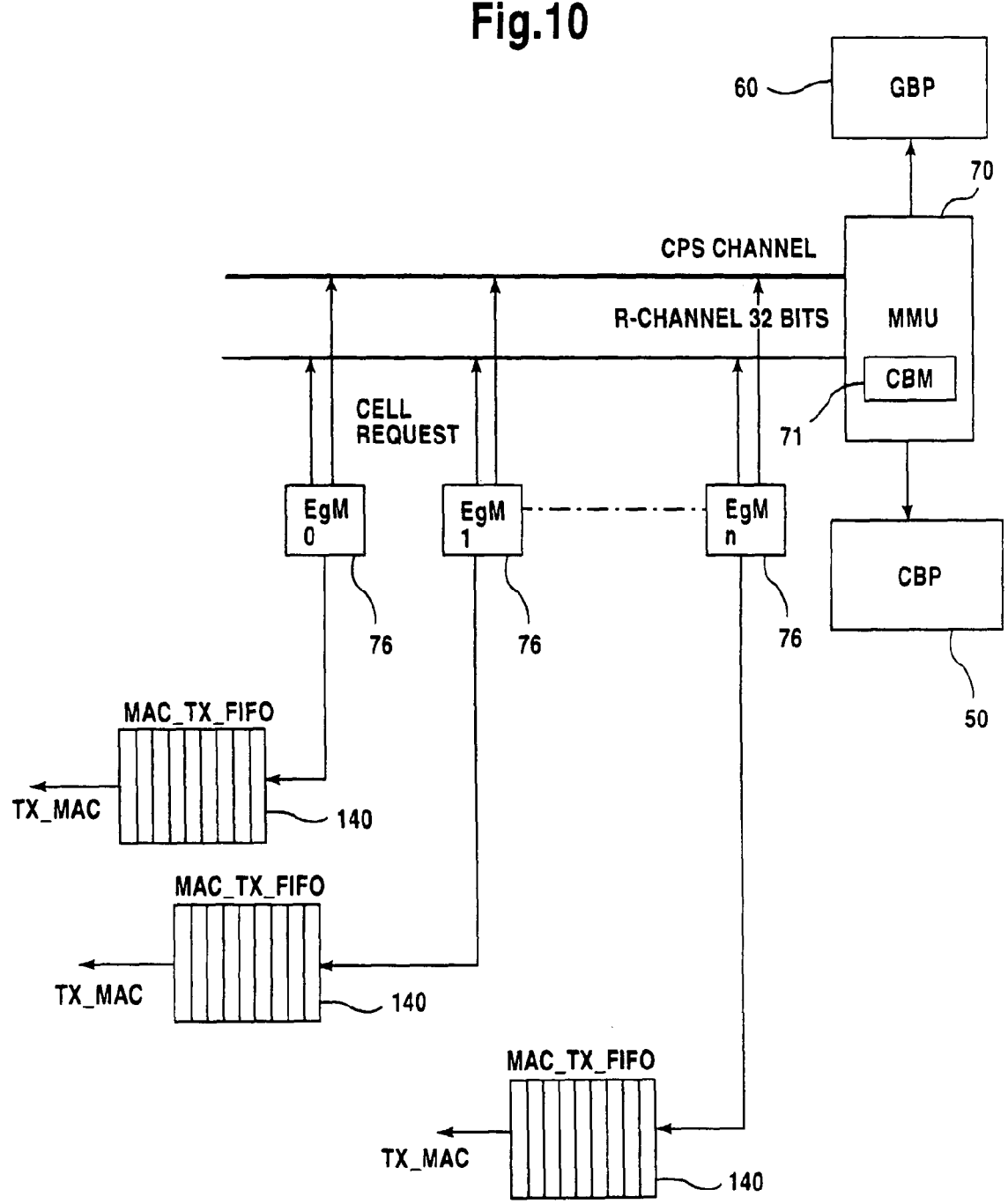
FIG. 10 is a detailed view of elements of the MMU.

FIG. 10 illustrates, in more detail, the functional egress aspects of MMU 70. MMU 70 includes CBM 71, and interfaces between the GBP 60, CBP 50 and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112*a* and 112*b*.

CBM 71, in summary, performs the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 11; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within MMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71, as explained herein.

When MMU 70 determines that cell 112*a* is destined for an appropriate egress port on SOC 10, MMU 70 controls the cell flow from CPS channel 80 to CBP 50. As the data packet 112 is received at MMU 70 from CPS 80, CBM 71 determines whether or not sufficient memory is available in CBP 50 for the data packet 112. A free address pool (not shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by MMU 70, CBM 71 assigns cell pointers. The initial pointer for the first cell 112*a* points to the egress manager 76 which corresponds to the egress port to which the data packet 112 will be sent after it is placed in memory. In the example of FIG. 8, packets come in to port 24*a* of EPIC 20*a*, and are destined for port 24*c* of EPIC 20*c*. For each additional cell 112*b*, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24*c*. Once the packet is fully written into CBP 50, a corresponding CBP Packet Identifier (CPID) is provided to the appropriate egress manager 76; this CPID points to the memory location of initial cell 112*a*. The CPID for the data packet is then used when the data packet 112 is sent to the destination egress port 24*c*. In actuality, the CBM 71 maintains two buffers containing a CBP cell pointer, with admission to the CBP being based upon a number of factors. An example of admission logic for CBP 50 will be discussed below with reference to FIG. 12.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112*a*, 112*b* of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

When the value of the budget register exceeds the high watermark value, the associated ingress port is disabled. Similarly, when data cells of an egress manager 76 are sent via the egress port, and the corresponding budget register decreases to a value below the low watermark value, the ingress port is once again enabled. When egress manager 76 initiates the transmission of packet 112, egress manager 76 notifies CBM 71, which then decrements the budget register value by the number of data cells which are transmitted. The specific high watermark values and low watermark values can be programmed by the user via CPU 52. This gives the user control over the data flow of any port on any EPIC 20 or GPIC 30, and of IPIC 90.

Egress manager 76 is also capable of controlling data flow. Each egress manager 76 is provided with the capability to keep track of packet identification information in a packet pointer budget register; as a new pointer is received by egress manager 76, the associated packet pointer budget register is incremented. As egress manager 76 sends out a data packet 112, the packet pointer budget register is decremented. When a storage limit assigned to the register is reached, corresponding to a full packet identification pool, a notification message is sent to all ingress ports of the SOC 10, indicating that the destination egress port controlled by that egress manager 76 is unavailable. When the packet pointer budget register is decremented below the packet pool high watermark value, a notification message is sent that the destination egress port is now available. The notification messages are sent by CBM 71 on the S channel 83.

As noted previously, flow control may be provided by CBM 71, and also by ingress submodule 14 of either an EPIC 20, GPIC 30, or by IPIC 90. Ingress submodule 14 monitors cell transmission into port 24. When a data packet 112 is received at a port 24, the ingress submodule 14 increments a received budget register by the cell count of the incoming data packet. When a data packet 112 is sent, the corresponding ingress 14 decrements the received budget register by the cell count of the outgoing data packet 112. The budget register 72 is decremented by ingress 14 in response to a decrement cell count message initiated by CBM 71, when a data packet 112 is successfully transmitted from CBP 50.

Efficient handling of the CBP 50 and GBP 60 is necessary in order to maximize throughput, to prevent port starvation, and to prevent port underrun. For every ingress, there is a low watermark and a high watermark; if cell count is below the low watermark, the packet is admitted to the CBP, thereby preventing port starvation by giving the port an appropriate share of CBP space.

Figure 12:
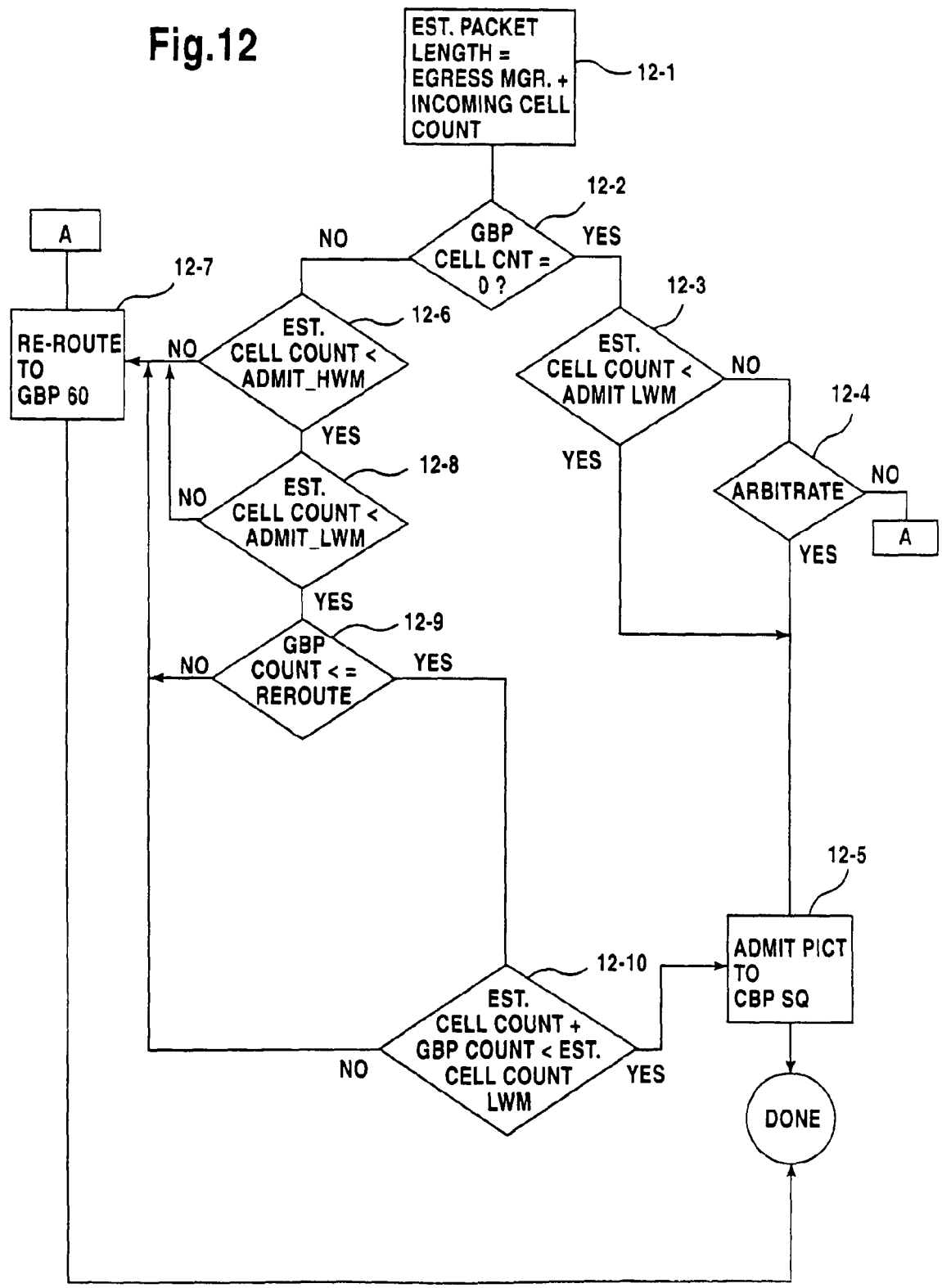
FIG. 12 illustrates an internal/external memory admission flow chart.

FIG. 12 generally illustrates the handling of a data packet 112 when it is received at an appropriate ingress port. This figure illustrates dynamic memory allocation on a single port, and is applicable for each ingress port of SOC 10. In step 12-1, the incoming packet length is estimated by estimating the cell count based upon the egress manager count plus the incoming cell count. After this cell count is estimated, the GBP 60 current cell count is checked at step 12-2 to determine whether or not GBP 60 is empty. If the GBP cell count is 0, thus indicating that GBP 60 is empty, then the method proceeds to step 12-3, where it is determined whether or not the estimated cell count from step 12-1 is less than the admission low watermark of CBP 50. The admission low watermark value enables the reception of new packets 112 into CBP 50 if the total number of cells in the associated egress is below the admission low watermark value. If the cell count is less than the admission low watermark of CBP 50, then the packet is admitted into CBP 50 at step 12-5. If the estimated cell count is not below the admission low watermark, then CBM 71 then must arbitrate for CBP memory allocation with other ingress ports of other EPICs and GPICs in step 12-4. If the arbitration process is unsuccessful, then the incoming packet is sent to a reroute process, referred to as A in FIG. 12, which reroutes the packet to GBP 60. Alternatively, if the arbitration is successful, then the packet is admitted to CBP 50 at step 12-5. Admission of packet 112 to CBP 50 is preferred, in order to facilitate linespeed communication.

The above discussion is directed to the situation wherein the GBP cell count is determined to be 0, representing an empty external memory. If in step 12-2 the GBP cell count is determined not to be 0, then the method proceeds to step 12-6, where the estimated cell count determined in step 12-1 is compared to the admission high watermark of CBP 50. If the estimated cell count is greater than the admission high watermark of CBP 50, then the packet is rerouted to GBP 60 at step 12-7. If the estimated cell count is less than the admission high watermark, then the estimated cell count is compared to the admission low watermark of CBP 50 at step 12-8. If the estimated cell count is determined to be greater than the admission low watermark, which means that the estimated cell count is between the high watermark and the low watermark, then the packet is rerouted to GBP 60 at step 12-7. If the estimated cell count is below the admission low watermark, then the GBP current count is compared with a reroute cell limit value at step 12-9. This reroute cell limit value is user programmable through CPU 52. If the GBP count is below or equal to the reroute cell limit value at step 12-9, then the estimated cell count and GBP count are compared with an estimated cell count low watermark. If the combination of estimated cell count and GBP count are less than the estimated cell count low watermark, the packet is admitted to the CBP 50 at step 12-5. If the sum is greater than the estimated cell count low watermark, then the packet is rerouted to GBP 60 at step 12-7. After rerouting to GBP 60, the GBP cell count is updated, and the packet processing is finished. It should be noted that if both the CBP 50 and the GBP 60 are full, then the packet is dropped. Dropped packets are handled in accordance with known Ethernet or network communication procedures, and have the effect of delaying communication. However, this configuration applies appropriate back pressure by setting watermarks, through CPU 52, to appropriate buffer values on a per port basis to maximize memory utilization and minimize dropped packets. This CBP/GBP admission logic results in a distributed hierarchical shared memory configuration, with a hierarchy between CBP 50 and GBP 60, and hierarchies within the CBP 50.

If the packet 112, discussed above with respect to FIG. 12 is destined for the IPIC, and therefore intended to be sent out of the high performance interconnect, then the packet is immediately switched to the IPIC module, and does not need to be admitted to either the CBP 50 or GBP 60. After the destination address is determined to be associated with the IPIC, the packet is placed on C channel 81 as illustrated in FIG. 8, and is "picked up" by IPIC 90 where it is placed into NBP 92. After the destination address for destinations located on IPIC 90 have been learned, then a packet coming in to port 24, destined for a port on IPIC 90 is sliced into cells, and placed on CPS channel 80, destined directly for NBP 92 of IPIC 90. The cells associated with the packet are not handled by MMU 70, and therefore are not subjected to CBP/GBP admission logic as discussed above. If the destination address has not, however, been learned, then the packet is sent to all ports through CBP/GBP admission logic, and also through NBP 92. A more detailed discussion of NBP 92 and IPIC 90 will be found later.

Address Resolution (L2)+(L3)

Figure 14:
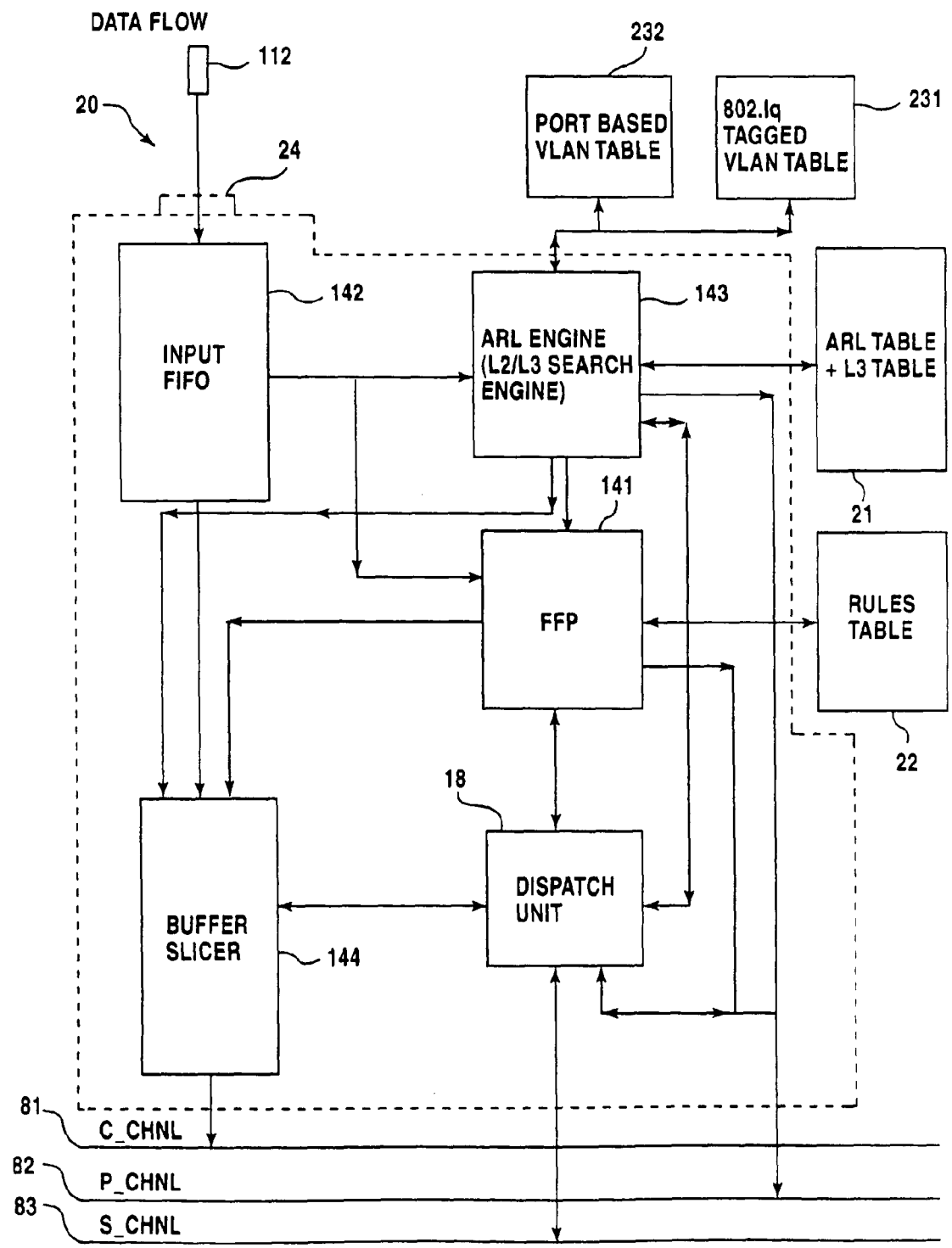
FIG. 14 illustrates more details of an EPIC module.

FIG. 14 illustrates some of the concurrent filtering and look-up details of a packet coming into the ingress of an EPIC 20. FIG. 12, as discussed previously, illustrates the handling of a data packet with respect to admission into the distributed hierarchical shared memory. FIG. 14 addresses the application of filtering, flow monitoring, address resolution, and rules application segments of SOC 10. These functions are performed simultaneously with respect to the CBP 50 and GBP 60 admission discussed above. As shown in the figure, packet 112 is received at an input port 24 of EPIC 20, and is then directed to input FIFO 142. As soon as the first sixteen bytes of the data packet arrive in the input FIFO 142, an address resolution request is sent to ARL engine 143, which initiates an address lookup in the ARL/L3 tables 21.

A description of the fields within ARL/L3 tables 21 is as follows:
  Mac Address—48 bits long—Mac Address;
  VLAN tag—12 bits long—VLAN Tag Identifier as described in IEEE 802.1q standard for tagged packets. For an untagged Packet, this value is picked up from Port Based VLAN Table.
  CosDst—3 bits long—Class of Service based on the Destination Address. COS identifies the priority of this packet. 8 levels of priorities as described in IEEE 802.1p standard.
  Port Number—6 bits long—Port Number is the port on which this Mac address is learned.
  SD_Disc Bits—2 bits long—These bits identifies whether the packet should be discarded based on Source Address or Destination Address. Value 1 means discard on source. Value 2 means discard on destination.
  C bit—1 bit long—C Bit identifies that the packet should be given to CPU Port.
  St Bit—1 bit long—St Bit identifies that this is a static entry (it is not learned Dynamically) and that means is should not be aged out. Only CPU 52 can delete this entry.
  Ht Bit—1 bit long—Hit Bit—This bit is set if there is match with the Source Address. It is used in the aging Mechanism.
  CosSrc—3 bits long—Class of Service based on the Source Address. COS identifies the priority of this packet.
  L3 Bit—1 bit long—L3 Bit—identifies that this entry is created as result of L3 Interface Configuration. The Mac address in this entry is L3 interface Mac Address and that any Packet addresses to this Mac Address need to be routed.
  T Bit—1 bit long—T Bit identifies that this Mac address is learned from one of the Trunk Ports. If there is a match on Destination address then output port is not decided on the Port Number in this entry, but is decided by the Trunk Identification Process based on the rules identified by the RTAG bits and the Trunk group Identified by the TGID.
  TGID—3 bits long—TGID identifies the Trunk Group if the T Bit is set. SOC 10 supports 6 Trunk Groups per switch.
  RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.
  SCP—1 bit long—Source CoS Priority Bit—If this bit is set (in the matched Source Mac Entry) then Source CoS has priority over Destination Cos.
  Module ID—5 bits long—Module ID identifies the module on which this MAC address is learned.

SOC 10 also includes a multicast table, for appropriate handling of multicast packets. One configuration of the multicast table would be 256 bits deep and 128 bits wide. The search fields of the multicast table could be, in one embodiment, as follows:
  Mac Address—48 bits long—Mac Address.
  VLAN Tag—12 bits long—VLAN Tag Identifier as described in IEEE 802.1q standard.
  CosDst—3 bits long—Class of Service based on the Destination Address. COS identifies the priority of this packet. We support 8 levels of priorities as described in IEEE 802.1p standard.
  Mc Port Bitmap—31 bits long—Port Bitmap Identifies all the egress ports on which the packet should go.
  Untagged Bitmap—31 bits long—This bitmap identifies the Untagged Members of the VLAN. i.e. if the frame destined out of these member ports should be transmitted without Tag Header.
  Module Id Bitmap—32 bits long—Module Id Bitmap identifies all the Modules that the packets should go to.

It should also be noted that VLAN tables 23 include a number of table formats; all of the tables and table formats will not be discussed here. However, as an example, the port based VLAN table fields are described as follows:
  Port VLAN Id—12 bits long—Port VLAN Identifier is the VLAN Id used by Port Based VLAN.
  Sp State—2 bits long—This field identifies the current Spanning Tree State. Value 0x00—Port is in Disable State. No packets are accepted in this state, not even BPDUs. Value 0x01—Port is in Blocking or Listening State. In this state no packets are accepted by the port, except BPDUs. Value 0x02—Port is in Learning State. In this state the packets are not forwarded to another Port but are accepted for learning. Value 0x03—Port is in Forwarding State. In this state the packets are accepted both for learning and forwarding.
  Port Discard Bits—6 bits long—There are 6 bits in this field and each bit identifies the criterion to discard the packets coming in this port. Note: Bits 0 to 3 are not used. Bit 4—If this bit is set then all the frames coming on this port will be discarded. Bit 5—If this bit is set then any 802.1q Priority Tagged (vid=0) and Untagged frame coming on this port will be discarded.
  J Bit—1 bit long—J Bit means Jumbo bit. If this bit is set then this port should accept Jumbo Frames.
  RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.
  T Bit—1 bit long—This bit identifies that the Port is a member of the Trunk Group.
  C Learn Bit—1 bit long—Cpu Learn Bit—If this bit is set then the packet is send to the CPU whenever the source Address is learned.

PT—2 bits long—Port Type identifies the port Type. Value 0—10 Mbit Port. Value 1—100 Mbit Port. Value 2—1 Gbit Port. Value 3—CPU Port.

VLAN Port Bitmap—28 bits long—VLAN Port Bitmap Identifies all the egress ports on which the packet should go out.

B Bit—1 bit long—B bit is BPDU bit. If this bit is set then the Port rejects BPDUs. This Bit is set for Trunk Ports which are not supposed to accept BPDUs.

TGID—3 bits long—TGID—this field identifies the Trunk Group which this port belongs to.

Untagged Bitmap—28 bits long—This bitmap identifies the Untagged Members of the VLAN. i.e. if the frame destined out of these members ports should be transmitted without Tag Header.

M Bits—1 bit long—M Bit is used for Mirroring Functionality. If this bit is set then mirroring on Ingress is enabled.

SOC 10 may also include a plurality of 802.1Q tagged VLAN tables, which can be used to get all of the member ports of explicitly tagged VLANs. The table can be, for example, 64 entries deep and 68 bits wide. The fields could be as follows:

VLAN Tag—12 bits long—VLAN Tag Identifier as described in IEEE 802.1q standard.

VLAN Port Bitmap—28 bits long—VLAN port bitmap identifies all of the egress ports on which the packet should be sent.

Untagged Bitmap—28 bits long—This bitmap identifies the untagged members of the VLAN. Therefore, this bitmap identifies if the frame from these member ports should be transmitted with or without a tag header.

Referring to the discussion of address resolution, and also referring to FIG. 14, the ARL engine 143 reads the packet; if the packet has a VLAN tag according to IEEE Standard 802.1q, then ARL engine 143 performs a look-up based upon tagged VLAN table 231, which is part of VLAN table 23. If the packet does not contain this tag, then the ARL engine performs VLAN lookup based upon the port based VLAN table 232. Once the VLAN is identified for the incoming packet, ARL engine 143 performs an ARL table search based upon the source MAC address and the destination MAC address. If the results of the destination search is an L3 interface MAC address, then an L3 search is performed of an L3 table within ARL/L3 table 21. If the L3 search is successful, then the packet is modified according to packet routing rules.

To better understand lookups, learning, and switching, it may be advisable to once again discuss the handling of packet 112 with respect to FIG. 8. If data packet 112 is sent from a source station A into port 24a of EPIC 20a, and destined for a destination station B on port 24c of EPIC 20c, ingress submodule 14a slices data packet 112 into cells 112a and 112b. The ingress submodule then reads the packet to determine the source MAC address and the destination MAC address. As discussed previously, ingress submodule 14a, in particular ARL engine 143, performs the lookup of appropriate tables within ARL/L3 tables 21a, and VLAN table 23a, to see if the destination MAC address exists in ARL/L3 tables 21a; if the address is not found, but if the VLAN IDs are the same for the source and destination, then ingress submodule 14a will set the packet to be sent to all ports on the VLAN. The packet will then propagate to the appropriate destination address. A "source search" and a "destination search" occurs in parallel. When the source address is not found on a source lookup, a source lookup failure (SLF) occurs. Upon the occurrence of an SLF, the source MAC address of the incoming packet is "learned", and therefore added to an ARL table within ARL/L3 tables 21a. After the packet is received by the destination, an acknowledgment is sent by destination station B to source station A. Since the source MAC address of the incoming packet is learned by the appropriate table of B, the acknowledgment is appropriately sent to the port on which A is located. The destination address for the acknowledgment packet or packets is known since it was previously the source address which was learned as a result of the initial SLF. When the acknowledgment is received at port 24a, therefore, the ARL table learns the source MAC address of B from the acknowledgment packet. It should be noted that as long as the VLAN IDs (for tagged packets) of source MAC addresses and destination MAC addresses are the same, layer two switching as discussed above is performed. L2 switching and lookup is therefore based on the first 16 bytes of an incoming packet. For untagged packets, the port number field in the packet is indexed to the port-based VLAN table within VLAN table 23a, and the VLAN ID can then be determined. If the VLAN IDs are different, however, L3 switching is necessary wherein the packets are sent to a different VLAN. L3 switching, however, is based on the IP header field of the packet. The IP header includes source IP address, destination IP address, and TTL (time-to-live).

If data packet 112 were sent from a source station A into port 24a of EPIC 20a, and was destined for IPIC 90, the same learning process upon occurrence of an SLF, and the same sending of the packet to all ports upon the occurrence of a DLF, would occur. IPIC 90 is treated essentially as any other port on SOC 10, with notable exceptions regarding the existence of NBP 92, as discussed above and as will be discussed below.

In order to more clearly understand layer three switching on SOC 10, data packet 112 is sent from source station A onto port 24a of EPIC 20a, and is directed to destination station B; assume, however, that station B is disposed on a different VLAN, as evidenced by the source MAC address and the destination MAC address having differing VLAN IDs. The lookup for B would be unsuccessful since B is located on a different VLAN, and merely sending the packet to all ports on the same VLAN would result in B never receiving the packet. Layer three switching, therefore, enables the bridging of VLAN boundaries, but requires reading of more packet information than just the MAC addresses of L2 switching. In addition to reading the source and destination MAC addresses, therefore, ingress 14a also reads the IP address of the source and destination. As noted previously, packet types are defined by IEEE and other standards, and are known in the art. By reading the IP address of the destination, SOC 10 is able to target the packet to an appropriate router interface which is consistent with the destination IP address. Packet 112 is therefore sent on to CPS channel 80 through dispatch unit 18a, destined for a port connected to an appropriate router interface (not shown, and not part of SOC 10), upon which destination B is located. Control frames, identified as such by their destination address, are sent to CPU 52 via CMIC 40. The destination MAC address, therefore, is the router MAC address for B. The router MAC address is learned through the assistance of CPU 52, which uses an ARP (address resolution protocol) request to request the destination MAC address for the router for B, based upon the IP address of B. Through the use of the IP address, therefore, SOC 10 can learn the MAC address. Through the acknowledgment and learning process, however, it is only the first packet that is subject to this "slow" handling because of the involvement of CPU 52. After the appropriate MAC addresses are learned, linespeed switching can occur through the use of concurrent table lookups since the necessary information will be learned by the tables. Implementing the tables in silicon as two-dimensional arrays enables such rapid concurrent lookups. Once the MAC address for B has been learned, therefore, when packets come in with the IP address for B, ingress 14*a* changes the IP address to the destination MAC address, in order to enable linespeed switching. Also, the source address of the incoming packet is changed to the router MAC address for A rather than the IP address for A, so that the acknowledgment from B to A can be handled in a fast manner without needing to utilize a CPU on the destination end in order to identify the source MAC address to be the destination for the acknowledgment. Additionally, a TTL (time-to-live) field in the packet is appropriately manipulated in accordance with the IETF (Internet Engineering Task Force) standard. A unique aspect of SOC 10 is that all of the switching, packet processing, and table lookups are performed in hardware, rather than requiring CPU 52 or another CPU to spend time processing instructions. It should be noted that the layer three tables for EPIC 20 can have varying sizes; in a preferred embodiment, these tables are capable of holding up to 2000 addresses, and are subject to purging and deletion of aged addresses, as explained herein.

Figure 38:
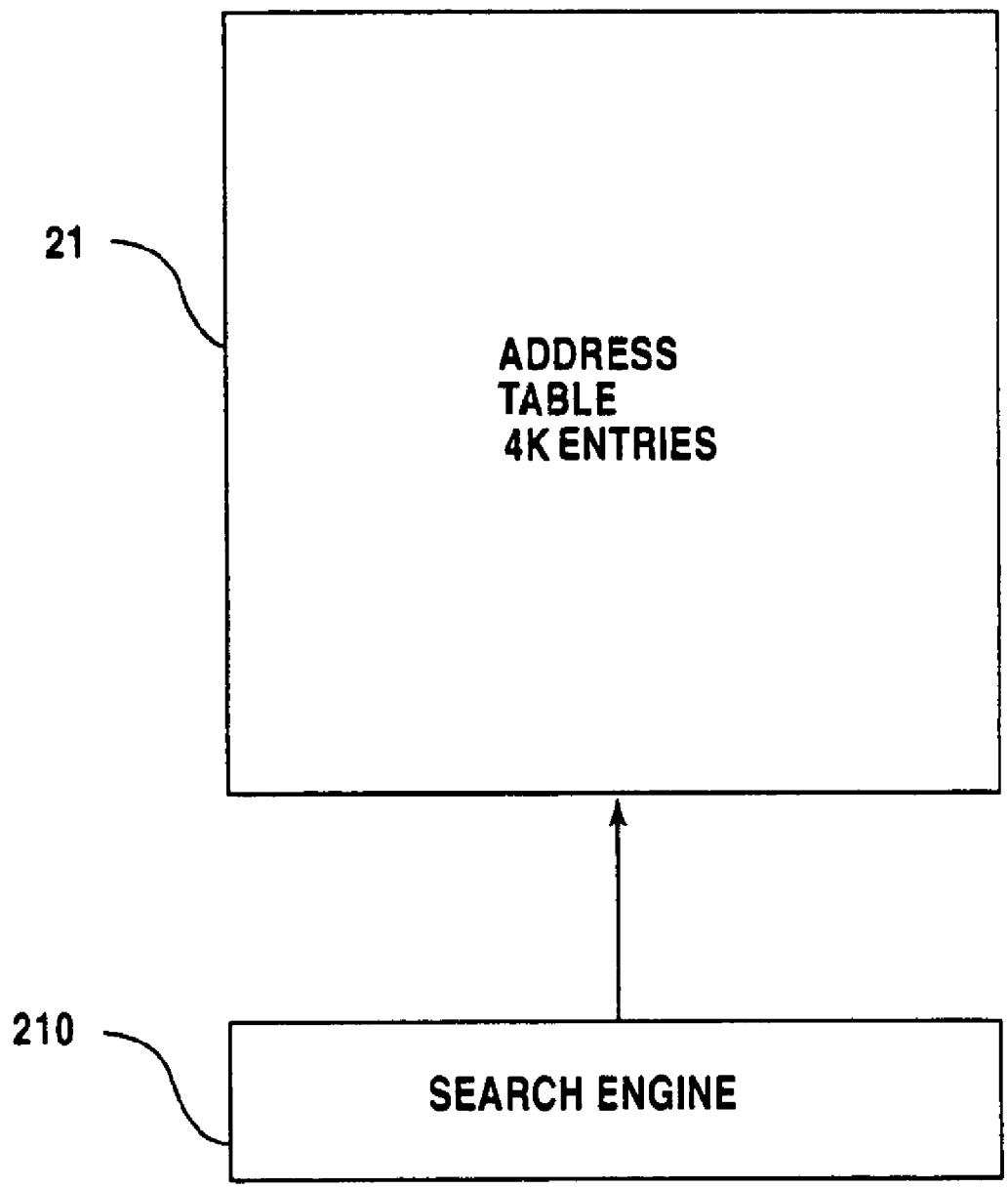
FIG. 38 illustrates a first configuration of an address table and a search engine.

As mentioned previously, when a data packet 112 enters SOC 10 through a port 24 and is sent to ingress submodule 14, an address lookup is performed on ARL/L3 table 21 to determine if that address has already been learned. The lookup is logically performed on an appropriate table 21 by a search engine 210, as shown in FIG. 38. Lookups are typically enabled by the fact that the tables are stored in sorted order, and addresses are searched utilizing a binary or lockstep-type search method.

Figure 39:
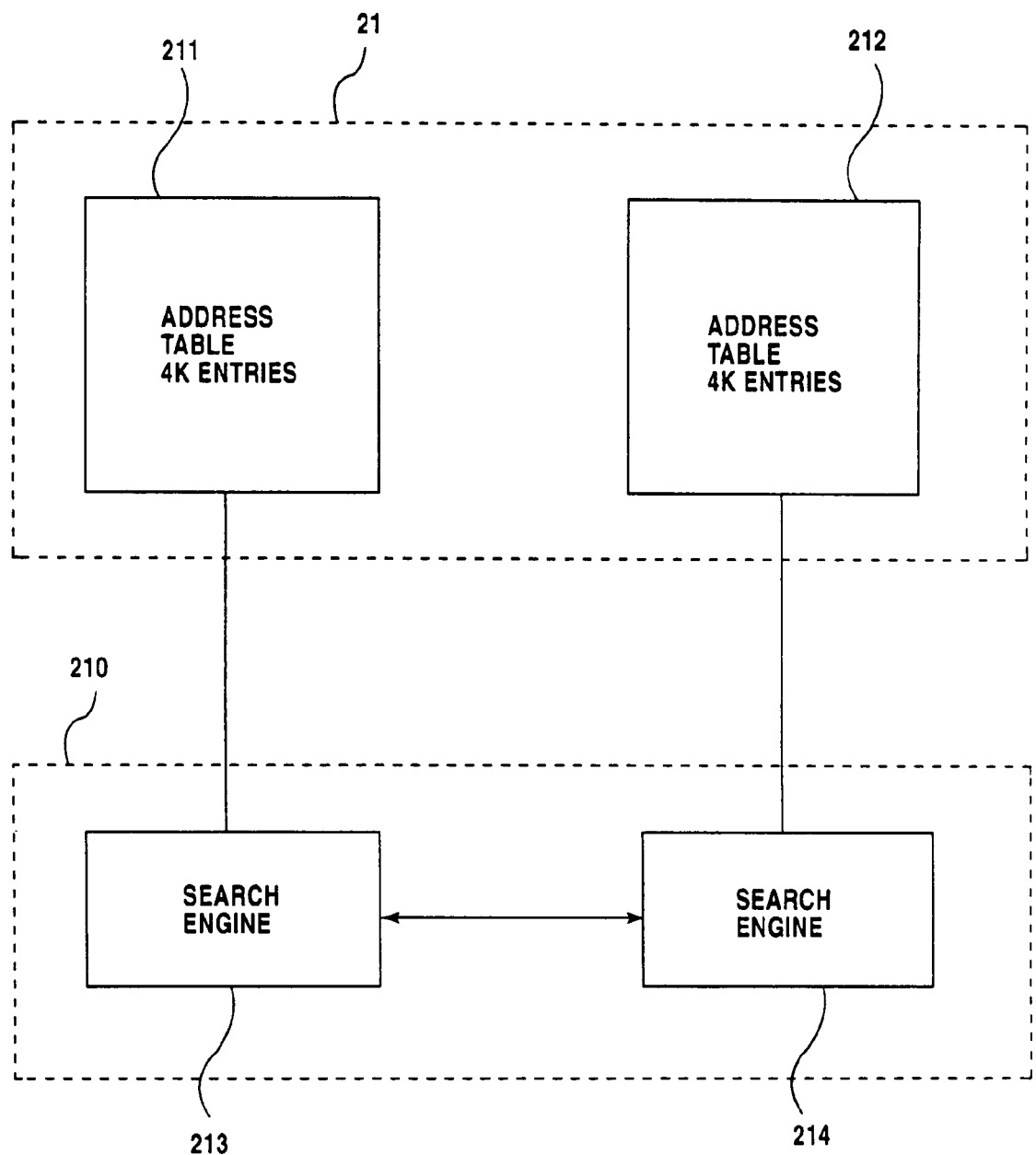
FIG. 39 illustrates a second configuration of two address tables and two search engines.

The present invention includes a method and structure for accelerating searches within an address table 21, such as a layer 2 table. Referring to FIG. 39, a more detailed view of an accelerated lookup configuration is disclosed with respect to address table 21 and search engine 210. In one example, address table 21 might be a single 8K sorted table that is searched by a single search engine 210. In the accelerated example shown in FIG. 39, this single address table 21 is split into two half-sized tables 211 and 212, with each half-sized table having 4K entries. The table can be split by having address table 211 contain all of the even addressed entries from original address table 21, and table 212 containing all of the odd addressed entries from original address table 21. By splitting the original address table 21 into two separate tables based upon the last bit of the table address, each of tables 211 and 212 remain in sorted order, and contain entries from the entire address range of the original table 21. Search engine 210 can then be divided into two separate search engines, first search engine 213 and second search engine 214, as shown in FIG. 39, which are configured to perform simultaneous address lookups for two data packets. In SOC 10, since each EPIC module 20 and/or GPIC module 30 has a plurality of ports, packets are queued for lookup. Concurrent and/or simultaneous lookups are possible, as the search algorithm which is implemented in SOC 10 does not differentiate between even and odd addressed entries until the very last search cycle. This optimization, therefore, enables a significant amount of the searching for two separate packet addresses to be performed simultaneously, in parallel, thereby nearly doubling throughput, even though the actual time required to complete each individual lookup does not change.

Therefore, when two packets come into an EPIC module 20 for address lookup, source and destination address lookups are interleaved, thereby time multiplexing the resources of SOC 10 for maximum efficiency. The utilization of two search engines 213 and 214 enables the search engines to operate in a simultaneous manner as they search tables 211 and 212, utilizing different search keys. Only the last comparison in the binary search will differentiate between even and odd addresses. Therefore, for an 8K deep address table 21 that is divided into two 4K deep tables, 211 and 212, the first twelve search cycles for the incoming packet addresses are done in parallel, while the 13th and final search cycle, which is conducted only if the respective search engine has not yet found a match for a desired address in the address table, requires an access to the other address table to locate the desired address. Referring to FIG. 40*a*, an original un-divided table is shown as 21. FIG. 40*b* illustrates how, in this embodiment of the invention, table 21 is divided into two tables 211 and 212, wherein table 211 contains even address locations and table 212 contains odd address locations, both remaining in sorted order.

As a first example of the operation of this embodiment, assume a first data packet and a second data packet come into a single GPIC 20 on SOC 10, and are submitted for address lookups. Assume that the first packet comes from MAC address D, and is destined for a MAC address AE. The second packet is coming from MAC address Z and is destined for MAC address AH. In a switch requiring a four clock cycle overhead, the address lookups begin essentially simultaneously at clock cycle 4, with the first packet being handled by first search engine 213, and the second packet being handled by second search engine 214. First search engine 213 initially searches the even address memory locations in table 211, while second search engine 214 searches the odd address memory locations in table 212, as illustrated by FIG. 40*b*. The tables being appropriately sorted, the search engines are configured to initiate binary searches which proceed in a lockstep or parallel manner beginning at the middle entry of the respective tables. Therefore, first search engine 213 initiates searching of table 211 at memory address location 16, and compares the source address D of the first data packet as the source search key with entry Q, which is stored at memory address location 16, as shown in FIG. 40*b*. The result of this comparison is the determination that the first search engine 213 should continue searching for the desired address at lower memory address locations, as address entry Q is numerically greater than the desired address D, indicating that the desired address, if in the table, must be stored at a lower memory address location. As discussed previously, both a source address and a destination address lookup for each data packet must be performed. Therefore, at clock cycle 5, first search engine 213 compares the destination address AE of the first data packet as the search key with the entry Q stored in middle memory address location 16, and determines that the search should continue at higher memory address locations, as entry Q is numerically, in hexadecimal, lower than the desired address AE. This indicates that the desired destination address, if in the table, must be stored at a higher memory address location. At clock cycle 6, first search engine 213 looks in memory address location 8, comparing the search key D with entry I, and determines that the search should continue at lower memory address locations, in similar fashion to that which is discussed above. At clock cycle 7, first search engine 213 looks in memory address location 24, comparing destination search key AE with entry Y, and determines that the search should continue at higher memory address locations. At clock cycle 8, first search engine 213 looks in memory address location 4, comparing source search key D with the entry E stored at that location. As a result of the comparison, it is determined that the search should continue at lower memory address locations. At clock cycle 9, first search engine 213 looks in memory address location 28, comparing the destination search key AE with address entry AC, and determines that the search should continue at higher memory address locations. At clock cycle 10, first search engine 213 looks in memory address location 2 and compares source search key D with entry C, and determines that the search should continue in the odd address table 212 at memory address location 3. This determination is a result of the first search engine 213 determining that the desired address D has not been found in either memory address locations 2 or 4, which are sequential entries that numerically surround the desired address. Therefore, in view of this situation, it is known that the desired address does not reside in the first table 211, and thus, the first search engine 213 must attempt to look in the second address table 212 at memory address location 3, as this memory address location is interstitially positioned between the previously searched memory address locations 2 and 4. At clock cycle 11, first search engine 213 looks in memory address location 30, the final memory address location in the even address table 211, comparing destination search key AE with entry AE, and determines that the result is a hit at clock 12. Inasmuch as a hit was determined, first search engine 213 does not continue to search for AE in the odd address table 212, as the destination address lookup for the first packet is complete. However, the source address is still not found, and therefore, at clock cycle 12, first search engine 213 looks in the odd address table 212 at memory address location 3, comparing source search key D with entry D, and determines that the result is a hit at clock cycle 13. Thus, the address lookup for the first packet is complete, as both the source and destination addresses have been found within the respective address lookup tables.

While search engine 213 is conducting the aforementioned lookups associated with the source and destination addresses of the first data packet, second search engine 214 is simultaneously performing the lookups for the source and destination addresses of the second data packet. At clock cycle 4, simultaneously with first search engine 213's comparison of even memory address location 16, second search engine 214 looks in odd memory address location 17, which represents the middle of the odd address table 212. Second search engine 214 compares source search key Z with the address entry R, and determines that the search should continue at higher memory address locations, as R is numerically less than the desired address. At clock cycle 5, second search engine 214 looks in memory address 17, comparing destination address search key AH with entry R, and determines that the search should continue at higher memory address locations, as the desired address is numerically less than the entry stored at memory address location 17. At clock cycle 6, second search engine 214 looks in memory address location 25, comparing the source search key Z with entry Z, and determines that the result is a hit at clock 7. The source address lookup for the second data packet is therefore complete. At clock cycle 7, second search engine 214 continues looking for the destination address by looking in memory address location 25, and comparing the destination search key AH with entry Z. This comparison determines that the search should continue at higher memory address locations. At clock cycle 9, second search engine 214 evaluates the contents of memory address location 29, comparing destination search key AH with entry AD, and determines that the search should continue at higher memory address locations. At clock cycle 11, second search engine 214 looks in memory address location 31, compares the destination search key AH with entry AF, and determines that the result is a miss at clock 12. The destination address lookup for the second packet is therefore complete. The destination address lookup for the second packet does not require a final read from the even addressed table 213; search engine 214 determines a miss when the results of the final search does not provide a pointer to table 211 from table 212.

As a second example, assume that a first data packet comes into a port on EPIC 20 on SOC 10 from MAC address A that is destined for a MAC address JJ, while a second data packet concurrently comes into another port on EPIC 20 of SOC 10 from MAC address G and is destined for MAC address CC. In a switch again requiring a four clock cycle overhead, the address lookups begin at clock cycle 4, with the first packet being handled by first search engine 213, and the second packet being handled by second search engine 214. First search engine 213 initially searches the even address location table 211, and second search engine 214 searches the odd address location table 212. With the tables 211 and 212 being appropriately divided and sorted from the primary address table, as shown in FIGS. 41a and 41b, the search engines are again configured to initiate a binary or lockstep-type search operation at the middle address location of the respective tables. Therefore, at clock cycle 4, first search engine 213 compares the source address search key A with entry Y stored at memory address location 16, and determines that the search should continue at lower memory address locations, as the hexadecimal numerical value of the desired address is greater than the entry. At clock cycle 5 first search engine 213 compares destination address search key JJ with entry Y, and determines that the search should continue at higher memory address locations, as the hexadecimal numerical value of the desired address is less than the entry. At clock cycle 6, first search engine 213 compares the source address search key to entry M stored at memory address location 8, and determines that the search should continue at lower memory address locations. At clock cycle 9, first search engine 213 compares the destination address search key to entry KK stored at memory address location 28, and determines that the search should continue at lower memory address locations. At clock cycle 10, first search engine 213 compares the source address search key to entry D stored at memory address location 2, and determines that the search should continue at lower memory address locations. At clock cycle 11, first search engine 213 compares the destination address search key to entry GH stored at memory address location 26, and determines that the search should continue in the odd address table 212 at memory address location 27. This determination is based upon the fact that search engine 213 has compared the entries in adjoining memory address locations 26 and 28 to the destination search key, and has determined that the desired address, if in the table, would be stored in a memory address location between these two memory address locations. As such, the only remaining memory address location available to search in the lockstep-type operation is memory address location 27 in the odd address table 212. At clock cycle 12, first search engine 213 compares the source address search key to entry B stored at memory location 0, and determines that the search has revealed a miss. Inasmuch as entry B is the lowest numerical address in the tables, a miss is determined, and thereafter the source MAC address A must be learned and inputted into the table at the appropriate location to maintain the sorted order of the table, which will be discussed herein. At clock cycle 13, first search engine 213 compares the destination address search key JJ to entry JJ stored at memory address location 27 of the odd address table 212, and determines that a hit has occurred.

Therefore, upon completion of the aforementioned steps, the source address of the first data packet has not been located, and thus must be learned and stored in the address tables.

However, the destination address of the first data packet was found at memory location 27 in the odd address table 212, and therefore, a hit was declared for this address. As such, the search operation for the source and destination addresses for the first data packet has been completed. However, as with the previous example, the source and destination addresses of the second data packet must also be searched within the address tables.

Therefore, simultaneously with the aforementioned steps associated with the first search engine 213 searching the even address table 211, the second search engine 214 undertakes a search of the odd address table 212 for the source and destination addresses of the second data packet. Second search engine 214 begins at clock cycle 4 by comparing the source address search key G with the address entry AA stored at memory address location 17 in odd address table 212. This comparison yields the determination that the search should continue at lower memory address locations, as entry G is numerically less than address entry AA. At clock cycle 5 second search engine 214 compares the destination address search key CC with the entry AA stored at memory address location 17. This comparison yields the determination that the search should continue at higher memory address locations. At clock cycle 6 second search engine 214 compares the source address search key G to the entry N stored at memory address location 9. Second search engine 214 determines that entry N is numerically greater than the desired address, and therefore the search is to be continued at lower memory address locations. At clock cycle 7 second search engine 214 compares the destination address search key CC to entry CF stored in memory address location 25 and determines that the search should continue at lower memory address locations. At clock cycle 8 second search engine 214 compares the origin address search key G to entry J stored in memory address location 5, and determines that the search should continue at lower memory address locations. At clock cycle 9 search engine 214 compares the destination search address search key to the entry BC stored at memory address location 21 and determines that the search should continue at higher memory address locations. At clock cycle 10 search engine 214 compares the source address search key G to the entry E stored at memory address location 3 and determines that the desired address is numerically greater than entry E. Thus, inasmuch as the desired address has been previously determined to be greater than the entry at odd memory address location 3 during clock cycle 10 and less than the entry at odd memory address location 5 in clock cycle 8, second search engine 214 determines that the next comparison will be in the even address table 211 at memory address location 4. At clock cycle 11 second search engine 214 compares the destination address search key CC to the entry BE and determines that the search should continue at higher memory address locations. However, second search engine 214 has already searched the adjoining higher memory address location, which was memory address location 25, in clock cycle 7. Therefore, second search engine 214 determines that the next comparison for the destination address will be in the even address table 211 at memory address location 24. At clock cycle 12 second search engine 214 attempts to search the even address table 211 for the source address search key G; however, as discussed above, first search engine 213 is executing a lookup for source address key A at memory address location 0 in the even address table 211 during this particular clock cycle, and as such, second search engine 214 stalls during this clock cycle and is unable to execute the comparison. At clock cycle 13 first search engine 213 has completed its lookup in the even address table 211, and second search engine 214 is then allowed to continue with the previously stalled address lookup in the even address table 211. Therefore, at clock cycle 13 second search engine 214 compares entry G stored in even address table memory location 4 with the source address search key G. At clock cycle 14 a hit is determined for the source address, and second search engine 214 continues to search for the destination address of the second data packet by comparing the destination address search key CC with the entry CC stored in the even address table 211 memory address location 24. At clock cycle 15 a hit is determined for the destination address.

Upon completion of clock cycle 15, both the source and destination address lookup for the first and second data packets is complete. The source address of the first data packet was not found within the tables, and therefore had to be learned and appropriately inserted into the tables. The remaining addresses, including the destination address of the first data packet and the source and destination addresses of the second data packet, were found within the address tables.

Figure 42:
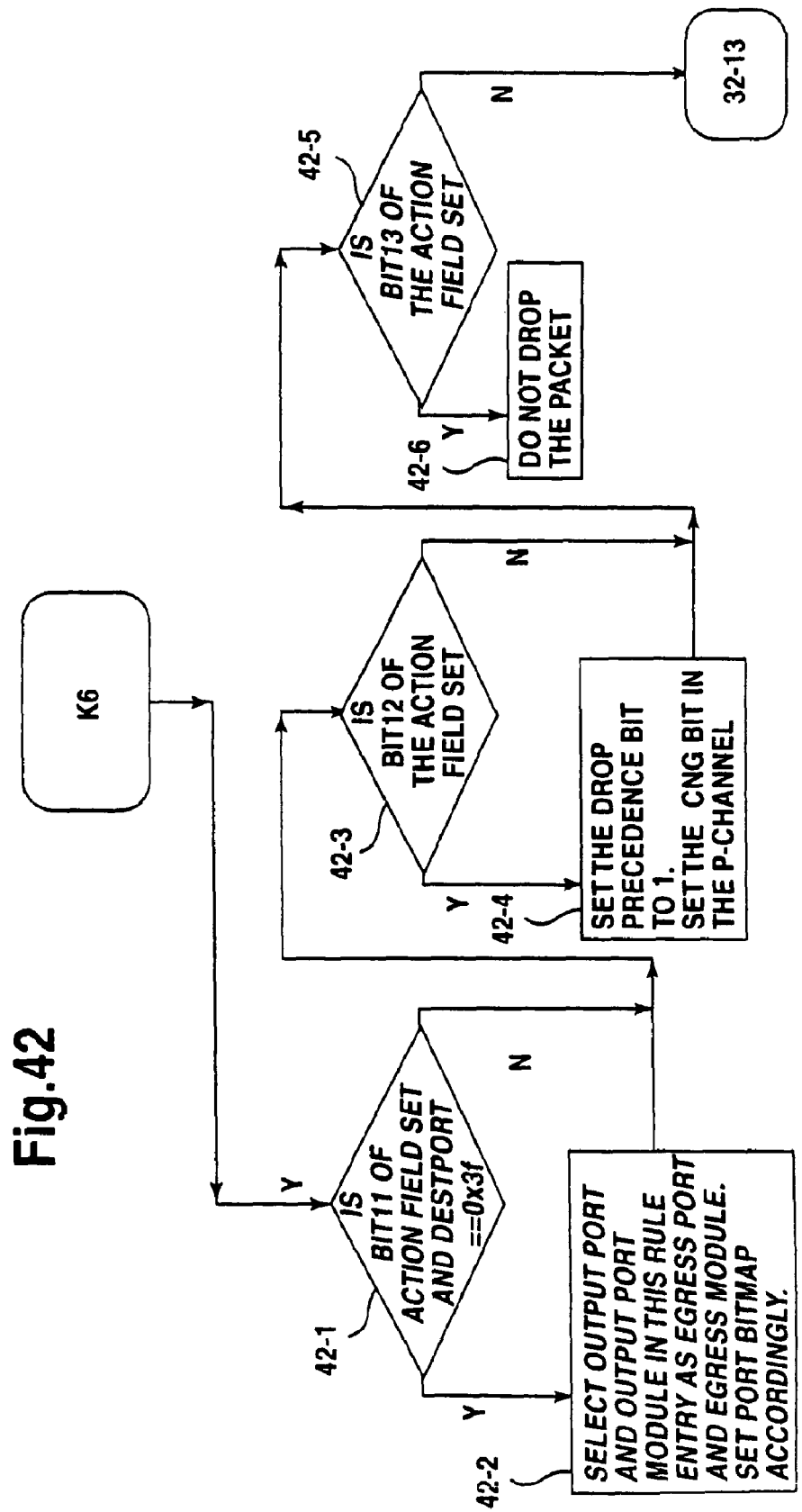
FIG. 42 is a flowchart of the in-profile action logic for bits 11-13.

In instances where an address must be learned, as noted above, a specific operational procedure is followed. As an example, the primary address table, as shown in FIG. 42, is again split into the first and second address tables 211 and 212, as shown in FIG. 42*a*. Assume that address F needs to be learned as a result of a search operation not finding that address within the tables. Inasmuch as the address entries stored within the tables are in sorted order, address F would logically belong in memory address location 4, if the sorted order is to be maintained upon insertion. However, memory address location 4 is currently occupied with entry G. Therefore, in order to make room for address F to be learned and properly stored at memory address location 4, each of the entries in memory address locations 4 through 26 need to be moved or shifted upward to the adjacent memory address locations, thereby opening memory address location 4. To accomplish the shift of these addresses entries, a learning state machine reads address entry GH from memory address location 26 and address entry CF from memory address location 25 on a single clock cycle. Address entry GH is then written to memory address location 27, while address entry CF is written to memory address location 26, again on the same clock cycle. This simultaneous read/write pair-type operation continues downward through the memory address locations within the tables until entries K and J are read from memory address locations 6 and 5, and are respectively written into memory address locations 7 and 6. At this time entry G is read from memory address location 4 and written into memory address location 5 vacated by address J in the previous shift. This results in the desired vacancy in memory address location 4, thus providing space for the learned memory address F to be written into memory address location 4. As a result of this particular table configuration, the learning rate nearly doubles that of the single table scheme.

In the situation where a single data packet arrives from an ingress and requires address resolution, and there are no other queued data packets awaiting address lookup, then the search engine handles the address lookup for the data packet singly. If immediately after the lookup for the single data packet is started, a flood of data packets arrives from the other ingresses, then in the worst case, the newly arrived data packets must wait for 30 clock cycles while the source and destination addresses of the single data packet are looked up in the tables before the search engines can begin lookup for the newly arrived data packets. If any of the newly arrived data packets are from the gigabit ports, then any arbitration scheme must be configured to assign higher priority to those data packets, as their address lookups must all be completed within 90 clock cycles after the single data packet's address lookups are completed.

The present invention provides a clear advantage over single address table lookup schemes, as the great majority of the concurrent searches are conducted in parallel. Therefore, in the case where both searches require only comparisons, performance doubles, irrespective of address insertions and deletions, as these operations are of a lower priority and have no affect on performance. As a specific example, performance for the parallel operation is calculated by multiplying the number of cycles per search by the number of clock cycles per search cycle, and then adding the clock overhead. This calculation is represented by the following equation:

$$\text{Performance}=(\text{\#cycles parallel})\cdot(2\text{clocks/search cycle})+\text{overhead} \quad (1)$$

Therefore, the performance for an 8 k table using the present invention is represented by the following:

$$(13)\cdot(2)+4=30 \text{ clock cycles for 2 packets or 15 clock cycles for a single data packet} \quad (2)$$

Performance for a 16 k table using the present invention is represented by the following:

$$(14)\cdot(2)+4=32 \text{ clock cycles for 2 packets or 16 clock cycles for a single packet} \quad (3)$$

If only a single data packet requires an address lookup, the following represents the search time to accomplish the lookup with the present invention:

$$(13)\cdot(2)+4=30 \text{ clock cycles per packet} \quad (4)$$

$$(14)\cdot(2)+4=32 \text{ clock cycles per packet} \quad (5)$$

Therefore, the present invention provides a substantial increase in the performance of the address lookup time over a single table ARL, while not requiring the use of any additional memory. Furthermore, the lookup and learning latency of the present invention is cut nearly in half over single table ARL's, as the majority of the reads and writes associated therewith can be accomplished in parallel, thereby reducing the number of clock cycles necessary to complete the shifting of memory addresses and the insertion of a learned address. Additionally, as the table size is increased from 8 k to 16 k, the performance decreases by only two clock cycles in the worst case.

Furthermore, the embodiments of the present invention discussed above can be physically implemented in a number of ways. For example, the address tables and search engines of the present invention can be implemented in hardware, such as on a single semiconductor substrate in conjunction with the various components of SOC 10. Alternatively, the address tables and search engines could be implemented as separate discrete hardware components that are in electrical connection with the components of SOC 10. Further, the tables and search engines associated with SOC 10 can be implemented and searched through software, both exclusively or partially. Additionally, although the present apparatus and method is disclosed in conjunction with address resolution in a network switch, the apparatus and method of searching a sorted table recited herein is contemplated to apply to various alternative applications. Therefore, the recitation of the implementation of the apparatus and method in conjunction with address resolution is not intended in any way to limit the scope of the present invention, as the present invention could effectively be utilized in any sorted table searches.

Filtering:

Referring again to the discussion of FIG. 14, as soon as the first 64 (sixty four) bytes of the packet arrive in input FIFO 142, a filtering request is sent to FFP 141. FFP 141 includes an extensive filtering mechanism which enables SOC 10 to set packet filters on any field of a packet from layer 2 to layer 7 of the OSI seven layer model. Filters are used for packet classification based upon various protocol fields within the packets themselves. Various actions are taken based upon the packet classification, including packet discard, sending of the packet to the CPU, sending of the packet to other ports, sending the packet on certain COS priority queues, and changing the type of service (TOS) precedence, for example. Filters are also commonly used for implementing security features, as they can be configured to allow a packet to proceed only if there is a filter match. If there is no match, then the actions associated with exclusive filters can be taken. A further discussion of filters, both inclusive and exclusive, will be presented later.

It should be noted that SOC 10 has the capability to handle both tagged and untagged packets coming into the switch. Tagged packets are tagged in accordance with IEEE standards, and include a specific IEEE 802.1p priority field for the packet. Untagged packets do not have a tag, and therefore, do not include an 802.1p priority field. SOC 10 can assign an appropriate priority value for the packet based upon either the incoming port or the destination address. As noted in the ARL table format discussed herein, an SCP (Source COS Priority) bit is contained as one of the fields of the table. When this SCP bit is set, SOC 10 will assign a weighted based upon a source COS value in the ARL table. If the SCP is not set, then SOC 10 will assign a COS for the packet based upon the destination COS field in the ARL table. These COS values are three bit fields in the ARL table, as noted previously in the ARL table field descriptions.

FFP 141 is essentially a state machine driven programmable rules engine. The filters used by the FFP in a first embodiment are 64 (sixty-four) bytes wide, and are applied on an incoming packet. In some embodiments, a 64 byte filter mask can be used and applied to any selected 64 bytes or 512 bits of a packet. In another embodiment, however, a filter can be created by parsing selected fields of an incoming packet such that a 64 byte filter mask is created, which will be selectively applied to fields of interest of an incoming packet. In yet another embodiment, a filter can be created by applying a predetermined number of offsets to the incoming data packet 112, wherein a predetermined number of bytes immediately following each individual offset are parsed from the packet and thereafter concatenated together to form a filter value utilized in the filtration process.

Filters, as previously stated, are mainly used for packet classification based upon certain selected protocol fields in the packet. Based upon the packet classification, a plurality of actions can be taken. The actions may include discarding of the packets, sending of the packets to the CPU, sending the packets to a mirrored port, priority mapping, TOS tag modification, etc. In one embodiment, FFP 141 includes filtering logic 1411, illustrated in FIG. 15, which selectively parses predetermined fields from the incoming data packets, thereby effectively obtaining the values of the desired fields from the MAC, IP, TCP, and UDP headers. FIG. 20 is a table illustrating the various important fields, and their respective offsets for various packet types. Other fields that may be related to IPX and/or other fields may also be utilized in this filtration scheme through selection of these particular fields to be parsed from the packet upon filtration.

SOC 10 includes a filter database which contains a plurality of filter sets. In one example, two sets of filters may be provided, each containing eight filters and an associated rules table being 512 entries deep. FIG. 21A illustrates the format for a filter mask, showing the various fields thereof, including the Field Mask field. The specific fields of the filter mask are as follows:

Field Mask—512 bits long—Field Mask consists of several Protocol Masks. For the fields, which are of interest the Mask is set to all 1's and for other fields the mask is set to zero.

Egress Port Mask—6 bits long—Egress Port Mask—This Egress Port Mask is set to all 1's only if the Egress Port is part of the Filter.

Egress ModId Mask—5 bits long—Egress Module Id Mask—This Module Id Mask is set to all 1's only if the Egress Module Id is part of the Filter.

Ingress Port Mask—6 bits long—The Ingress Port Mask is set to all 1's only if the Ingress Port is part of the Filter.

Data Offset 1—7 bits long—Data Offset 1—The 7 bit data offset is used to set the Data Mask for 8 bytes of Data 1 anywhere in first 128 bytes of the packet.

Data Offset 2—7 bits long—Data Offset 2—The 7 bit data offset is used to set the Data Mask for 8 bytes of Data 2 anywhere in first 128 bytes of the packet.

Data Offset 3—7 bits long—Data Offset 3—The 7 bit data offset is used to set the Data Mask for 8 bytes of Data 3 anywhere in first 128 bytes of the packet.

Data Offset 4—7 bits long—Data Offset—The 7 bit data offset is used to set the Data Mask for 8 bytes of Data 4 anywhere in first 128 bytes of the packet.

No Match Action—13 bits long—No Match Action—This field is valid only if the No Match Action Enable Bit is set to 1. No Match Action is applied only if the filter does not match any of the Entries in the Rules Table. The following Actions are defined: Bit 0—If this bit is set then change 802.1p Priority in the packet. the Priority is picked up from the 802.1p priority field. Bit 1—If this bit is set then categorize this packet to send on priority COS Queue, but don't modify the 802.1p priority field in the packet tag header. Again the priority is picked up from the 802.1p Priority field. Bit 2—If this bit is set then change IP TOS Precedence in the IP Header. The new TOS Precedence value is picked up from the TOS_P field. Bit 3—if this bit is set then send the packet to CPU. Bit 4—if this bit is set then discard the packet. Bit 5—If this bit is set then select the output port from the Port Field. If the Packet is a Broadcast, Multicast or a DLF then this action is not applied. Bit 6—If this bit is set then the packet is sent to the "Mirrored-To" port. Bit 7—is a reserved bit. Bit 8—If this bit is set then the value of 802.1p Priority field is picked up from the TOS Precedence field in IP header. (TOS_P->COS). Bit 9—If this bit is set then the value of TOS Precedence field in IP header is picked up from the 802.1p Priority field. (TOS_P->COS). Bit 10—If this bit is set then the value of Differentiated Services (DS) is picked up from Differentiated Services Field. Bit 11—if this bit is set, then select the output port and output module id from the filter mask independent of packet type. Bit 12—reserved.

NMA Enable—1 bit long—No Match Action Enable—If this bit is set then No Match Action field is a valid field. Also the way the search is done in the Rules Table is slightly different.

802.1p Priority Bits—3 bits long—802.1p Priority Bits—The value in this field is used to assign the priority to the packet. The 802.1p standard define 8 levels of priorities from 0 to 7. The field is used only if bit 0 or bit 1 of Action Field is set.

TOS_P field—3 bits long—TOS_P field—The value in this field is used to assign the new value to TOS Precedence field in the IP Header. This field is used only if bit 2 of Action Field is set.

Differentiated Services—6 bits long—Differentiated Services—The value in this field is used to assign the new value to the Differentiated Services Field in IP Header.

Output Port—6 bits long—This field identifies the output Port Number. This port overrides the egress port selected by ARL.

Output Module Id—5 bits long—This field identifies the output Module Number. The output Module, output Port combination overrides the Egress Port, Module Id selected by ARL. This field is valid only if Remote Port Bit is set.

Remote Port Bit—1 bit long—If this bit is set then the Egress Port is on the Remote Module and the Port is identified by the Output Module Id and Output Port combination.

Filter Enable Bit—1 bit long—If this bit is set then the Filter is Enabled.

Counter—5 bits long—Counter Index—this is the counter, which needs to be incremented.

Figure 22:
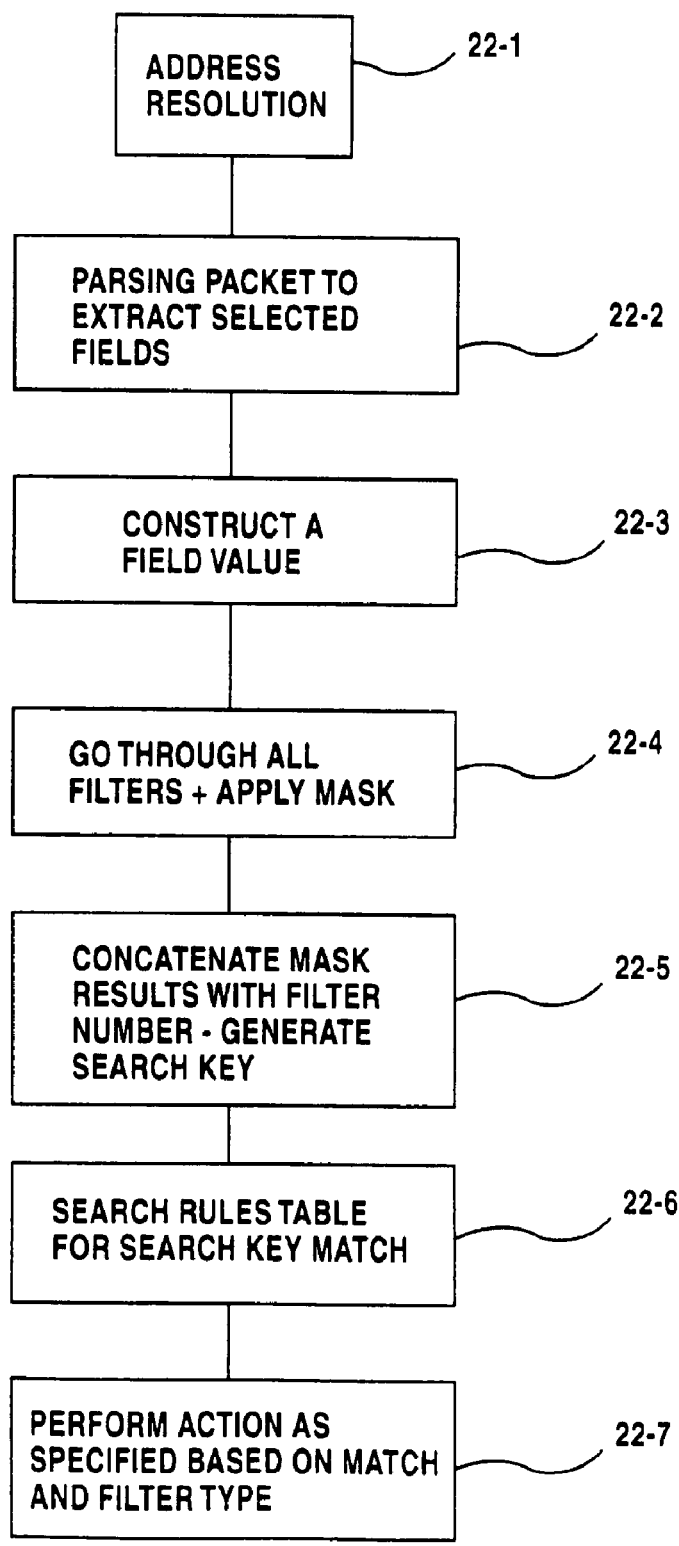
FIG. 22 is a flow chart which illustrates the formation and application of a filter mask.

FIG. 22 is a flow chart which illustrates filtering in SOC 10 in a first embodiment, using FFP 141 and the filtering configuration discussed above. An incoming packet coming in to an ingress of an EPIC 20 or GPIC 30 is subjected to address resolution through the address resolution logic shown at step 22-1. After the address resolution is completed, FFP 141 selectively parses the packet of step 22-2 and obtains the values of preselected fields associated with the packet. Depending upon the type of packet, whether it be Ethernet type II, 802.3, IP, IPX, TCP, UDP, etc. the fields listed above may also be extracted in the parsing process. A field value is constructed at step 22-3 by concatenating the extracted fields in the same order as listed in the field mask, including the ingress port and egress port. If the egress port, is not determined or known, then the port value is set to an invalid value that can be, for example, 0x3f. At step 22-4, logic 1411 goes through all filters which have the filter enable bit set, and applies the mask portion of the filter to the field. The result of this operation is concatenated at step 22-5 with the filter number to generate a search key. The search key is used to search for a match to the key in rules table 22 at step 22-6. If the no match action (NMA) bit is set to zero, then the filter is considered to be an inclusive filter. For inclusive filters, as will be discussed below, there should be an exact match in order to execute the actions defined in the rules table entry. If there is not an exact match, then no action is taken for that particular filter. If the NMA bit is set to one, then the filter is an exclusive filter. This process is repeated for each individual filter until all selected filters have been applied to the packet.

When a binary search is performed on rules table 22, additional comparison is done using filter select, source port, and destination port fields to determine if a partial match exists. If there is a full match, then the actions from the matched rules table entry are applied. If there is no full match but there is a partial match, then actions from the "no match action" field in the filter mask are applied at step 22-7. If there is no full match and no partial match, then no filter action is taken.

Rules table 22 is completely programmable by CPU 52 through CMIC 40. The rules table can be, as an example, 256 entries deep. The entries in the rules tables, again as an example, are stored in ascending order with filter value+egress port+egress module id+ingress port+filter select as the key. The ingress port or egress port is set only if there is an intention to do the filtering on a per port basis, and in that case the associated ingress and/or egress mask should be set to the aforementioned invalid value of 0x3F.

The FFP configuration enhances the handling of real time traffic since packets can be filtered and action can be taken on the fly. Without FFP 141, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

FIG. 23 illustrates an example of a format for rules table 22. The fields of this rules table are as follows:

- Filter Value—512 bits long—For every incoming packet the Filter Mask is applied and the result is compared with the Filter value. Since the incoming packet itself is typically in Big Endian Format the Filter value should be set up in Bit Endian Format.
- Ingress Port—6 bits long—Ingress Port Number: This field is set only if one is setting this filter on a specific ingress port. If this field is set then the Ingress Port Mask in the Filter Register should be set.
- Egress Port—6 bits long—Egress Port Number: This field is set only if one is setting the filter on a specific egress port. if this field is set then the Egress Port Mask in the Filter Register should be set. In case of Broadcast, Multicast or DLF, the Filtering Mechanism should use invalid port number (0x3f) so that there is no match on the entry.
- Egress Module Id—5 bits long—Egress Module Id—This field is set only if one is setting the filter on a specific egress port+Module Id. If this field is set then the Egress Port Mask+Egress Module Id in the Filter Register should be set. In case of Broadcast, Multicast or DLF, the Filtering Mechanism should use invalid port number (0x3f) so that there is no match on the entry. Note: Remote Egress Port is a combination of Egress Port+ Module Id. The only way to invalidate the Remote Port is to use an invalid Port Number.
- Filter Select—3 bits long—Filter Select—These bits are used to identify the Filter Number, which is used to match these entries.
- Action Bits—14 bits long—Action Bits defines the actions to be taken in case of the matched entry. Bit 0—If this bit is set then change 802.1p Priority in the packet. The Priority is picked up from the 802.1p priority field. Bit 1—If this bit is set then categorize this packet to send on priority COS Queue, but don't modify the 802.1p priority field in the packet tag header. Again the priority is picked up from the 802.1p Priority field. Bit 2—If this bit is set then change IP TOS Precedence in the IP Header. The new TOS Precedence value is picked up from the TOS_P field. Bit 3—if this bit is set then send the packet to CPU. Bit 4—if this bit is set then discard the packet. Bit 5—if this bit is set then select the output port and output module id from the Rule entry. If the Packet is a Broadcast, Multicast or a DLF then this action is not applied. Bit 6—If this bit is set then the packet is sent to the "Mirrored-To" port. Bit 7—If this bit is set then increment the counter indicated in the counter value. The counter index is picked up from the counter field. Up to 32 counters are supported. Bit 8—If this bit is set then the value of 802.1p Priority field is picked up from the TOS Precedence field in IP header. (TOS_P->COS). Bit 9—If this bit is set then the value of TOS Precedence field in IF header is picked up from the 802.1p Priority field. (COS->TOS_P). Bit 10—If this bit is set then the value of Differentiated Services (DS) is picked up from Differentiated Services Field. Bit 11—if this bit is set, then select the output port and output module id from the Rule entry. Bit 12—Reserved. Bit 13—if this bit is set, then the packet is not dropped. If bit 4 and bit 13 are both set, then the packet is not dropped.
- 802.1p Priority Bits—3 bits long—The value in this field is used to assign the priority to the packet. The 802.1p standard defines 8 levels of priorities from 0 to 7. The field is used only if bit 0 or bit 1 of Action Field is set.
- Differentiated Services—6 bits long—Differentiated Services—The value in this field is used to assign the new value to the Differentiated Services Field in the IP Header.
- TOS_P field—4 bits long—The value in this field is used to assign the new value to TOS Precedence field in the IP Header. This field is used only if bit 2 of Action Field is set.
- Output Port—6 bits long—Output Port—This field identifies the Output Port Number. This port overrides the egress port selected by ARL.
- Output Module Id—5 bits long—Output Module Id—This field identifies the output Module Number. The output Module, output Port combination overrides the Egress Port, Module Id selected by ARL. This field is valid only if Remote Port Bit is set.
- Counter—5 bits long—Counter Index is the counter, which needs to be incremented.

In other words, a logical AND operation is performed with the filter mask, having the selected fields enabled, and the packet. If there is a match, the matching entries are applied to rules tables 22, in order to determine which specific actions will be taken. Since there are a limited number of fields in the rules table, and since particular rules must be applied for various types of packets, the rules table requirements are minimized by setting all incoming packets to be "tagged" packets; all untagged packets, therefore, are subject to 802.1Q tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 15:
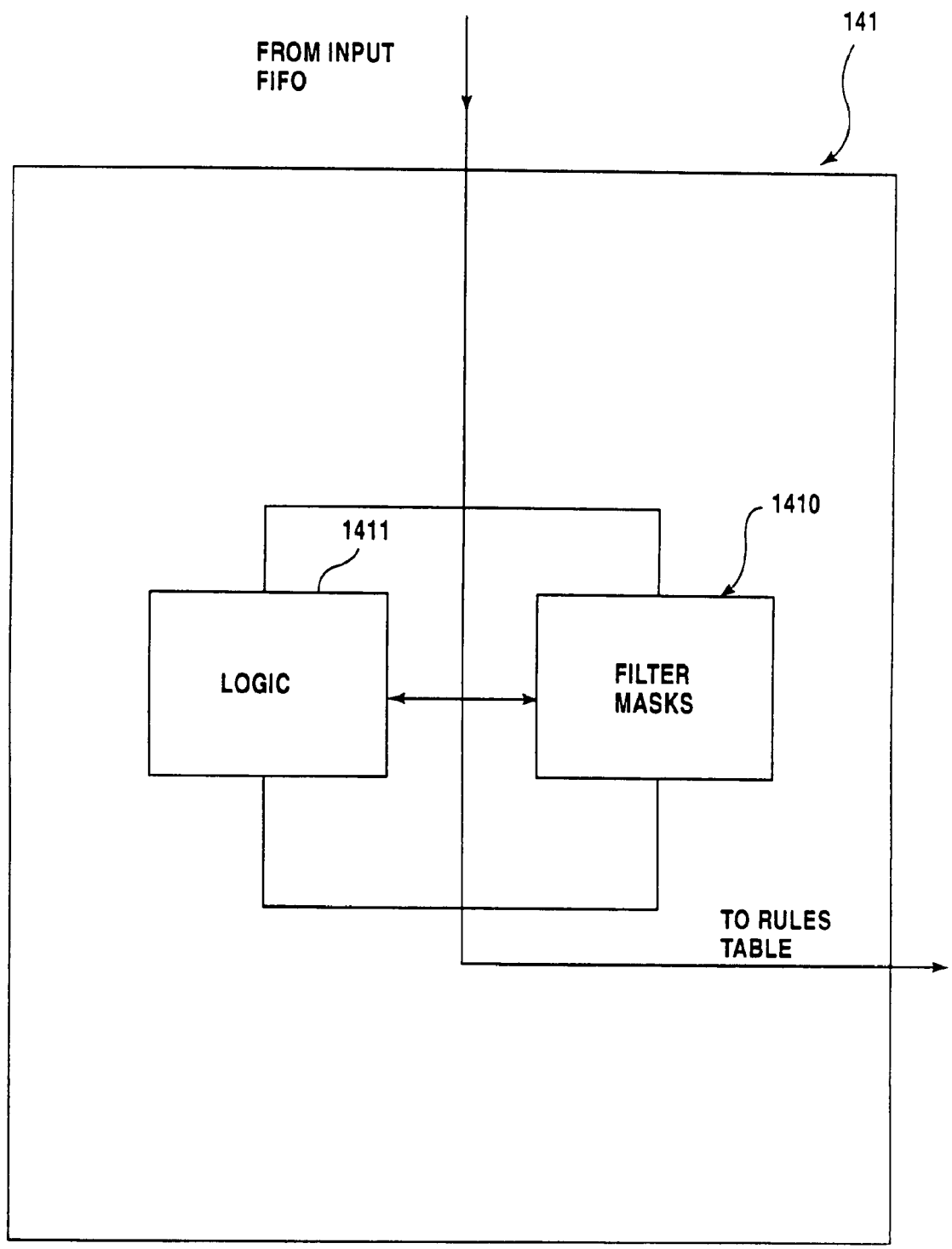
FIG. 15 is a block diagram of a fast filtering processor (FFP)

As noted previously, exclusive filters are defined as filters which exclude packets for which there is no match; for excluded packets, actions associated with exclusive filters are taken. With inclusive filters, however, inclusive actions are taken. If there is a match, action is taken as discussed above; if there is no match, no action is taken and the packet proceeds through the forwarding process. Referring to FIG. 15, FFP 141 is shown to include filter database 1410 containing filter masks therein, communicating with logic circuitry 1411 for determining packet types and applying appropriate filter masks. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring once again to FIG. 14, after FFP 141 applies appropriate configured filters and results are obtained from the appropriate rules table 22, logic 1411 in FFP 141 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 144, and the packet is placed on C channel 81. The control message and message header information is applied by the FFP 141 and ARL engine 143, and the message header is placed on P channel 82. Dispatch unit 18, also generally discussed with respect to FIG. 8, coordinates all dispatches to C channel, P channel and S channel. As noted previously, each EPIC module 20, GPIC module 30, MMU 70, IPIC 90, etc. are individually configured to communicate via the CPS channel. Each module can be independently modified, and as long as the CPS channel interfaces are maintained, internal modifications to any modules such as EPIC 20*a* should not affect any other modules such as EPIC 20*b*, GPICs 30, or IPIC 90.

Figure 17:
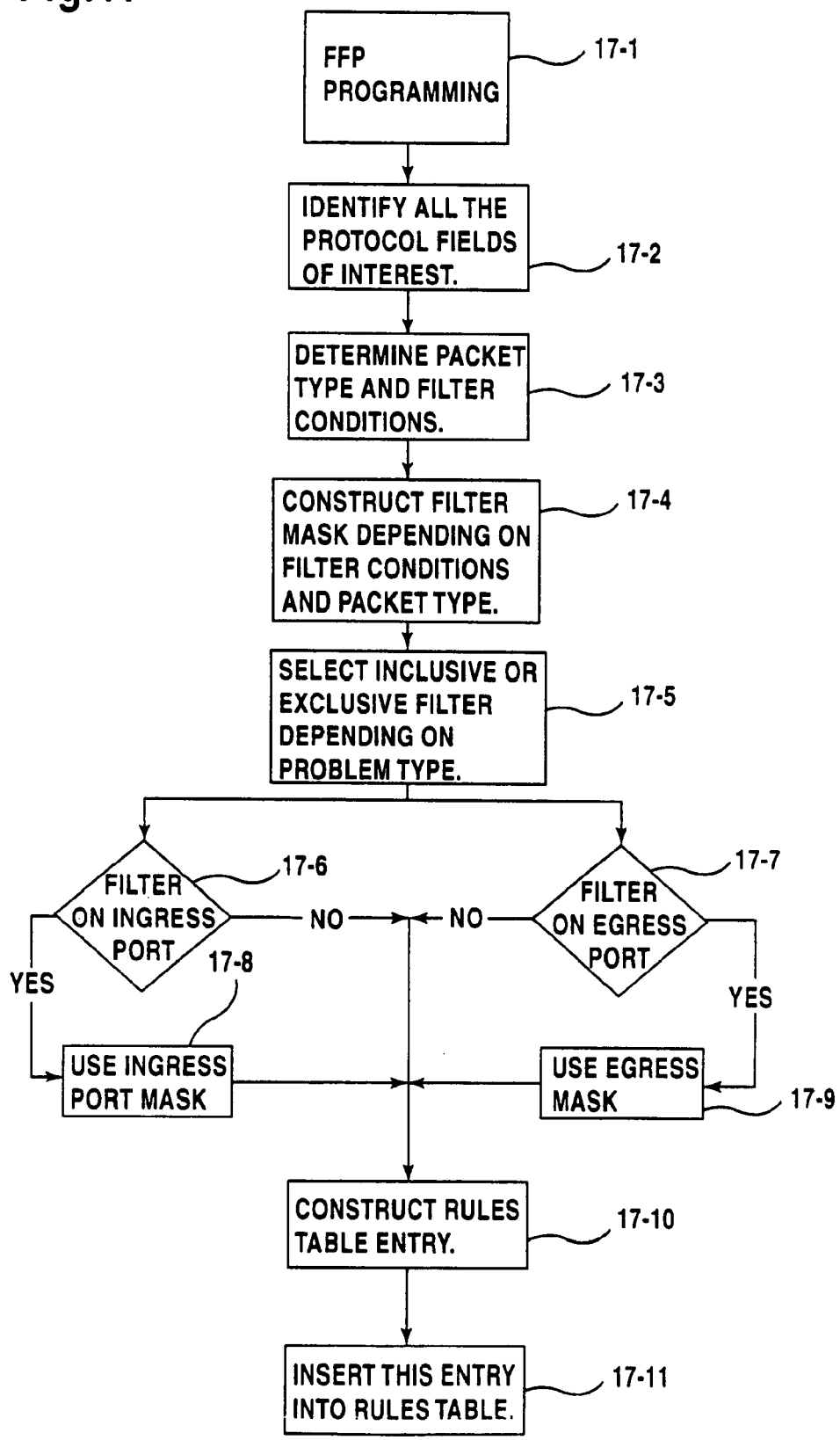
FIG. 17 illustrates a series of steps which are used to program an FFP.

As mentioned previously, FFP 141 is programmed by the user, through CPU 52, based upon the specific functions that are sought to be handled by the FFP. Referring to FIG. 17, it can be seen that in step 17-1, an FFP programming step is initiated by the user. Once programming has been initiated, the user identifies the protocol fields of the packet which are to be of interest for the filter, in step 17-2. In step 17-3, the packet type and filter conditions are determined, and in step 17-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 17-6, it is determined whether or not the filter is on the ingress port, and in step 17-7, it is determined whether or not the filter is on the egress port. If the filter is on the ingress port, an ingress port mask is used in step 17-8. If it is determined that the filter will be on the egress port, then an egress mask is used in step 17-9. Based upon these steps, a rules table entry for rules tables 22 is then constructed, and the entry or entries are placed into the appropriate rules table (steps 17-10 and 17-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

In another embodiment of the invention, the filtering logic is modified from the previous embodiment. In this embodiment, which is backward compatible in implementation with that which is previously discussed, four 16 byte fields are specifically defined within the packet header, each of these fields having their own configurable offset. These four 16 byte fields are combined to form the previously mentioned 64 byte/512 bit field mask. However, in this embodiment the offsets are configured in such a way that the filter mask can effectively look into the packet header up to 120 bytes deep. Although FIG. 20 illustrates that a substantial portion of the relevant filtering information is contained within the first 64 bytes of the packet header, when product and technology innovation renders bytes 64 to 120 of the packet header to be of substantial relevance to filtering, the present invention will be configured to filter using this header format.

As stated above, the 64 byte packet key is split up into a predetermined number of subfields. As an example, the 64 byte packet key can be split up into 4 16 byte subfields. Each subfield has a 3 bit mask associated therewith that indicates a multiple of 8 bytes to offset for each subfield, as shown in FIG. 31. Therefore, for example, if the first 64 bytes of the packet are of interest, then an offset field of 000 would be used for all four of the 16 byte subfields. This would cause the first offset to capture/review the 16 bytes beginning with byte 0 and continuing through byte 15. The second offset would capture the 16 bytes beginning with byte 16 and continuing through byte 31, and in similar fashion, the third offset would capture bytes 32 through 47, and the fourth offset would capture bytes 48 through 63, thereby including the entire first 64 bytes. As a second example, if the offsets were set as first offset 001, second offset 011, third offset 100, and fourth offset 110, then the subfields would be defined as follows. The first offset of 001 would define the first subfield as beginning with byte number 8 in the packet header and continuing for 16 bytes through byte 23. The second offset of 011 would define the second subfield as beginning at byte 40 and continuing for 16 bytes through byte 55. The third offset of 100 would define the third subfield as beginning with byte 64 and continuing through byte 79. Finally, the fourth offset of 110 would define the fourth subfield as beginning at byte 96 and continuing through byte 111. Thereafter, the 4 individual 16 byte subfields created through the application of the four offsets are concatenated into a single 64 byte field value. Again, the concatenation of the field value must include the ingress port, egress port, and the egress module id fields. If the egress module id or the egress port fields are not determined, then these fields are again set to an invalid value, such as 0x3f. The filter logic then goes through goes through all of the filters that are set and applies the mask portion of the filter to the field value and filter mask. The result of this operation is again concatenated with the filter number to generate the search key, which is then used to search for a match in the rules tables 22. If all of the no match action bits are set to 0, then the filter is considered to be an inclusive filter, which indicates that there must be an exact match in order to execute the actions defined in the rules table entry. If there is anything less than a full match, then no action is taken under an inclusive filter. However, if at least one of the action bits are set to 1, then the filter is considered to be an exclusive filter.

In executing actions from the rules table entries and no match actions from the filter, specific rules are followed in order to insure proper filtering and action execution. The relevant rules to execute actions from rules table entries and no match actions from filters are as follows.

- When a binary search is done in the rules table, additional comparison is done using {filter select+egress module id+ingress port+egress port} fields to determine a partial match
- A full match occurs when the filter select+egress module id+ingress port+egress port+packet format+filter value matches an entry in the rules table. Therefore, if there is a full match, then the associated actions from the matched rules table entry are applied.
- If there is no full match and no partial match, then no action is taken.
- If there is no full match, but there is a partial match, then the actions from the no match actions field are applied. This no match action is derived from the filter mask field.
- If there is a partial match with a filter, actions associated with the filter mask are taken. If there is a full match with a higher filter value, then the actions associated with the rule entry are taken. If a particular action bit is set by the no match action field and the full match on another filter mask does not set the same action bit, then the action is taken, as the partial match and full match are on different filters.
- If there is a partial match and a full match, the counters are updated only for the full march according to the rules table. If there is only a partial match, then the counters are updated according to action in the filter mask. If all of the filters have a full match in the rules table and the action is to increment the same counter, then the counter is incremented only once. If all of the filters have a partial match and the action is to increment the same counter, then the counter is incremented only once.

Packet Flow Control:

In conjunction with the filtering functions, the configuration of SOC 10 enables a traffic conditioning function, which can meter, shape, police, drop, and/or remark data packets as necessary, to ensure that the packets or data traffic entering the differentiated services (diffserv) domains conform to predetermined requirements for the particular implementation. Metering functions generally measure the temporal properties, generally the rate or flow, of the stream of packets selected by a classifier. In the present invention a rate counter field for a codepoint in diffserv-to-COS mapping table is incremented every time a packet comes into the switch with that particular codepoint, thus allowing a rate of traffic to be determined. A shaping function serves to delay some or all of the packets in a traffic stream in order to bring the traffic stream into compliance with a predetermined traffic profile. The present invention implements a shaping functionality for each COS queue, which is handled by the COS manager on each individual egress. The dropping function of the metering logic is responsible for discarding some or all of the packets in a data stream in order to bring the data stream into compliance with a predetermined traffic profile. Put simply, if the aforementioned rate counter for a specific code point value exceeds the rate counter threshold set in the diffserv-to-COS table, then the option is provided, using the new codepoint actions bits, to drop the packet from the date stream. The re-marking function allows the codepoint of a packet to be reset depending on the characteristics of the traffic profile. The re-marker may be configured to re-mark all packets to a single codepoint, or it may be configured to mark a packet to one of a set of codepoints. Specifically, if the aforementioned rate counter for a codepoint exceeds the rate counter threshold in the diffserv-to-COS table, then the option is provided, using the new codepoint action bits, to remark the codepoint and select a new COS queue for the packet, in addition to changing the 802.1p priority of the packet, both of which will have a direct impact upon flow threshold of the packet.

Figure 13:
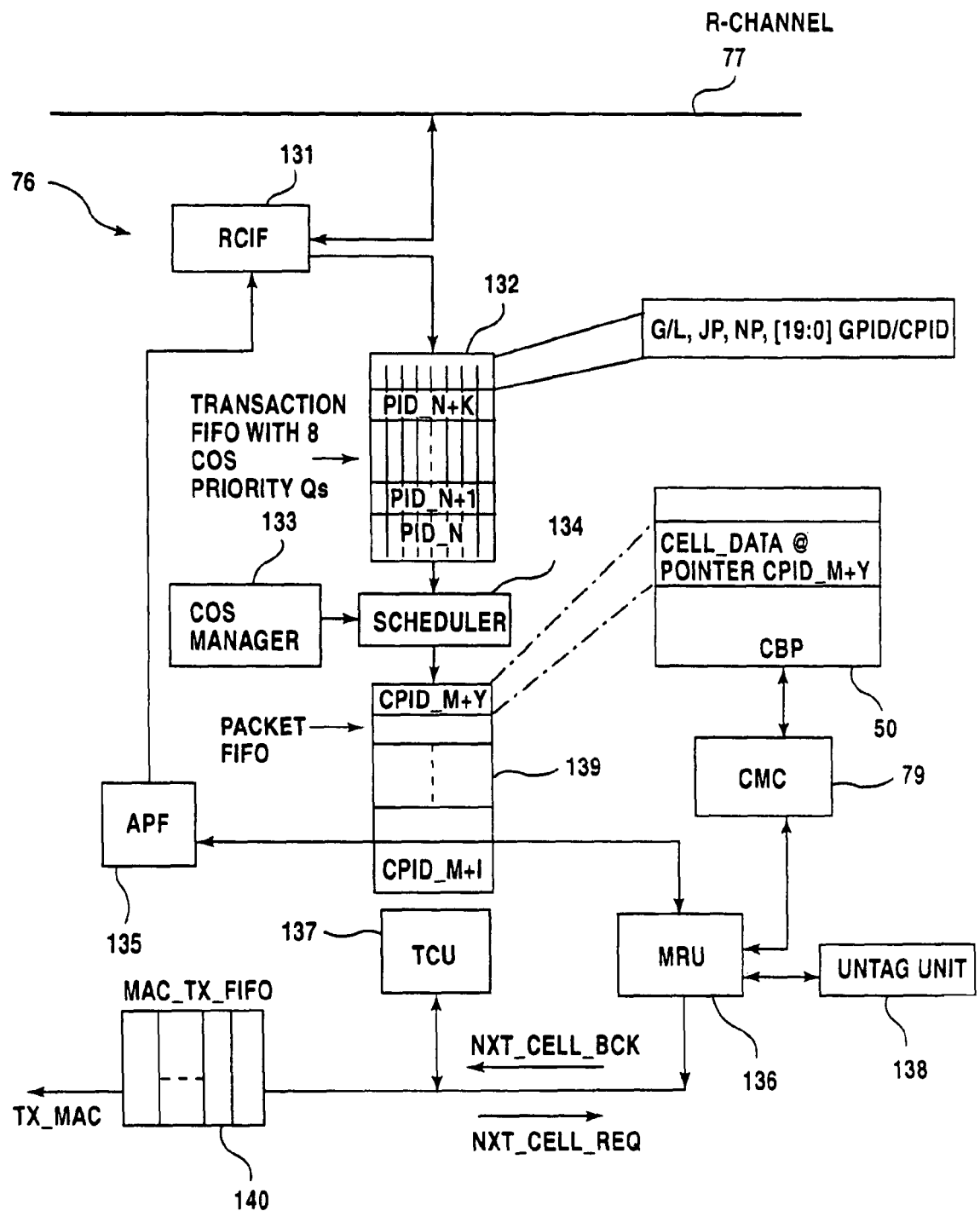
FIG. 13 illustrates a block diagram of an egress manager 76 illustrated in FIG. 10.

Although the present invention provides multiple packet flow control alternatives, metering is generally provided by the counter field of rules table 22. Using the counter and the COS queues, packets in a particular traffic stream can be delayed as necessary in order to bring the traffic stream into compliance with the desired traffic profile. This can be controlled through the use of COS manager 133 and transaction fifo 132, as illustrated in FIG. 13. Packet pointers that depend upon the differentiated services code point (DSCP) are placed in one of the COS queues in transaction fifo 132, and scheduler 134 picks up the next packet depending upon the priority determination of COS manager 133. Queue scheduling algorithms can be programmed into COS manager 133 as appropriate for a particular application. Strict priority based scheduling can be implemented, wherein packets in the high priority COS queue are taken up first for transmission. However, this can result in starvation of low priority COS queues. An option for resolving this difficulty, therefore, is implementing a weighted priority based scheduling scheme, wherein a minimum bandwidth is provided to all COS queues, so that no queue gets starved as a result of priority allocation. Bandwidth is a programmable parameter in COS manager 133, and can be programmed based upon the switch application. Realtime applications can be implemented through a Maximum Allowable Latency Parameter, which enables COS manager 133 to schedule packet transmission such that packets on a particular COS queue are not delayed for more than a maximum allowable latency time.

Metering Using Dscp

Figure 45:
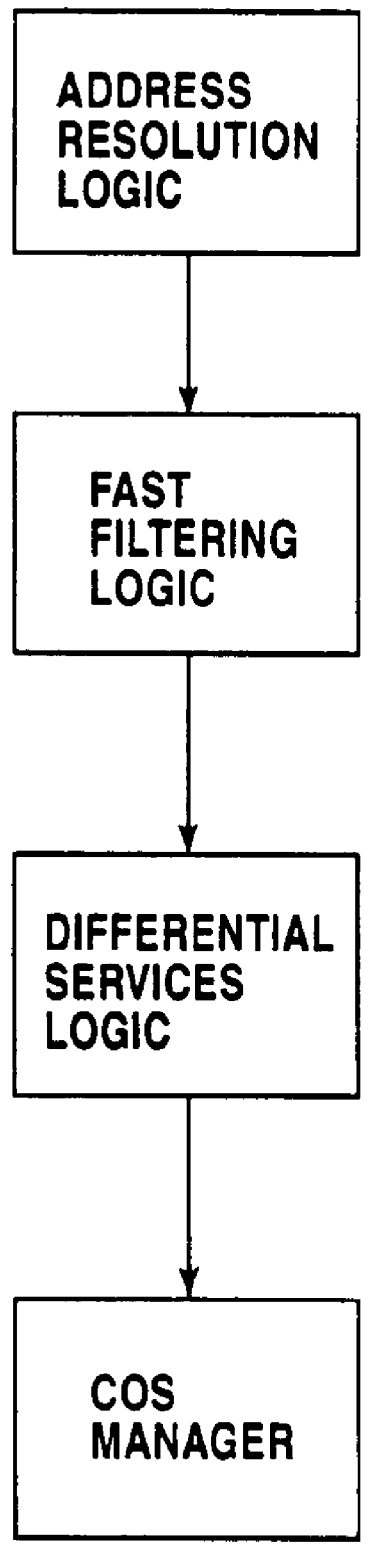
FIG. 45 is a flowchart of the data flow of an incoming packet.

The general flow of an incoming packet as it goes through the various functions of SOC 10 relative to differentiated services is shown in FIG. 45. In one embodiment of the present invention, a differentiated services enhancement to the Internet protocol is used to enable scalable service discrimination without the need for per flow state and signaling operations at every hop. Therefore, a variety of services may be built from a small, well-defined set of building blocks that are already deployed within the network switch configuration. Differentiated services can be constructed by a combination of: first, setting bits in the IP header field at network boundaries; second, using those bits to determine how packets are forwarded by the nodes within the network; and third, by conditioning the marked packets at network boundaries in accordance with predetermined requirements or rules of service. The present invention uses the differentiated services code point to classify and forward traffic entering the switch based upon predetermined policies directly related to the DSCP, which are discussed below.

In this embodiment, packet classification selects packets in a traffic stream based on the contents of specific fields in the packet protocol header. In the differentiated services architecture there are two types of packet classifiers: first, multi-field classifiers; and second behavior aggregate classifiers. Multi-field classifiers classify the packets entering the switch based upon the contents of specific fields in the protocol header. The specific fields of interest are as follows:

1) Source IP Address

2) Destination IP Address

3) DS Field

4) Protocol ID

5) Source TCP Port

6) Destination TCP Port

7) Source UDP Port

8) Destination UDP Port

9) Incoming Interface Number

10) Application Type, eg. Telnet, HTTP, FTP, RTP, RTCP, etc.

In using multi-field classifiers, SOC 10 uses FFP mechanism 141 to implement the multi-field (MF) classifications, which are accomplished at the network boundaries. MF classifier capability is implemented using the FFP 141 engine, wherein the filter mask and the corresponding rules table are as per the corresponding Differentiated services related policies to assign a new code point or the change the codepoint of the packet. The same rules entry can be used to change 802.1p priority of the packet, depending on the particular policy.

Alternatively, when a behavior aggregate (BA) classifier is used, the packets are classified using the DSCP only, and the BA classifiers are in switches that are deployed not only on the DS domain boundaries, but also within the DS domain itself. The BA classifier is implemented within the ingress logic. Although numerous more complex packet classifiers and policies can be defined per the agreement between a customer and service provider, the following table is exemplary of packet classification.

| Application | Code Point | Priority Field |
|---|---|---|
| Routing Protocol Traffic | R0 | 7 |
| VOIP Packets | X1 | 7 or 6 |
| Streaming Audio | X2 | 6 |
| Streaming Video | X3 | 6 or 5 |
| Telnet | X4 | 4 |
| HTTP, Secure HTTP | X5 | 4 or 3 |
| FTP and other Data transfer Type Applications | 00 | 0 |
| Any Packets originating from Source IP Address a.b.c.d | Y1 | 6 or 5 |
| Any Packets destined to IP Address a.b.c.d | Y2 | 6 or 5 |
| Packet Flows between networks e.f.g.h to i.j.k.l | Y3 | 4 or 3 |
| HTTP traffic to Destination Network i.j.k.l | Z1 | 0 |
| Streaming video to Destination Network m.n.o.p | Z2 | 3 |
| Traffic coming from Network p.q.r.s with DS Code Point A1, A2 or A3 | A4 | 0 |

Specifically, if the DS field in the incoming packet is non-zero, then the ingress logic gets the COS queue value from the DS field using the diffserv-to-COS mapping table shown in FIG. 30. The following fields are shown in FIG. 30 and detailed below.

COS Queue Value—3 bits long—COS Queue value used when sending the Packet to the Egress Port.

Change Priority Field (CPF) Bit—1 bit long—If CPF Bit is set then the 802.1p Priority Field in the Packet is changed to a new Priority. The new priority field is picked up from '802.1p Priority' Field.

New Codepoint Action (NCA) Bits—2 bits long—New Codepoint Actions are taken only if the Rate Counter exceeds the Rate Counter Threshold. Value 00—No Action. Value 01—Assign a new Codepoint. The new codepoint value is picked up from "New Codepoint" Field. Value 02—Assign a new codepoint and also change the 802.1p Priority of the Packet. New 802.1p Priority field is picked up from "New 802.1p Priority" Field. Value 03—Drop the incoming Packet.

802.p Priority—3 bits long—This priority field is used only if the CPF bit is set.

Rate Counter—12 bits long—This counter is incremented every time a packet arrives with this Codepoint. This counter is reset every 1 ms.

Rate Counter Threshold—12 bits long—is expressed as number of packets per 1 ms. If the rate counter exceeds this threshold then the packet is a candidate for new codepoint.

Rate Discard Threshold—12 bits long—Rate Discard Threshold is expressed in number of packets per 1 ms. If Rate Discard Threshold is exceeded then the packets are discarded if the NCA bit value is set to 03.

New Codepoint—6 bits long—If the Rate Counter exceeds the Rate Counter Threshold and the NCA Bit value is 01 then New Codepoint value is picked up from this field.

New COS Queue—3 bits long—If the Rate Counter exceeds Rate Counter Threshold and the NCA Bit value is 01 then New COS Queue value is picked up from this field.

New 802.1p Priority—3 bits long—If the Rate Counter exceeds Rate Counter Threshold and the NCA Bit value is 02 then New 802.1p Priority value of the packet is picked up from this field.

The mapping table shown above also offers the option of modifying the 802.1p priority field of the incoming packet. For any packet, even tagged or priority tagged packets with an 802.1p priority field, the COS queue value selected as a result of differentiated services mapping tables takes precedence over the priority selected from the 802.1p policies.

Figure 46:
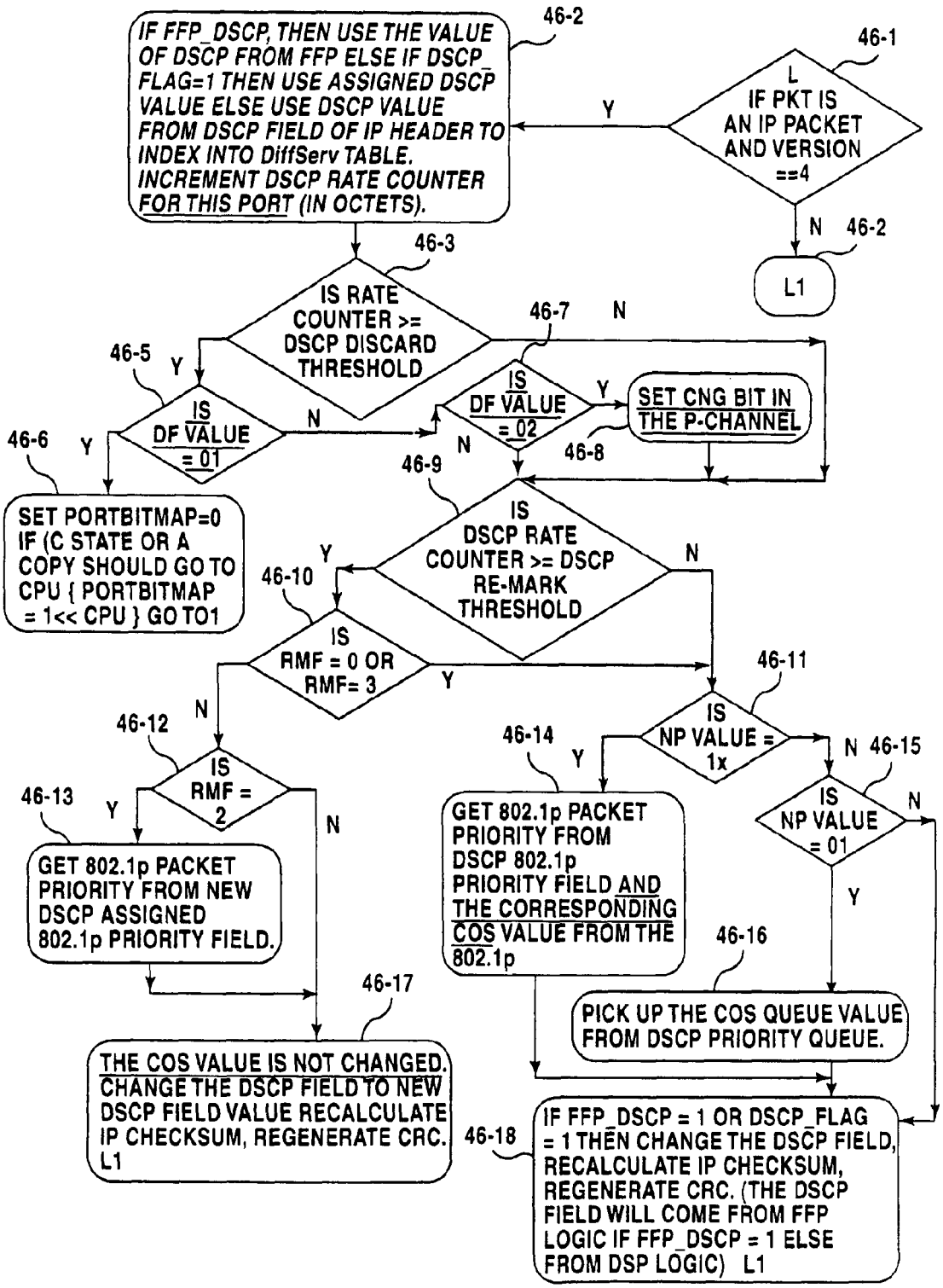
FIG. 46 is a flowchart of the differentiated services logic.

A flowchart of the differential services logic, which represents the predetermined policies associated with the DSCP, is shown in FIG. 46. The flowchart of the differentiated services logic begins at step 46-1, where the logic looks to see if the packet is an IP packet and if the packet type is 4. If not, then the logic continues to step 46-4, which will be further detailed herein; if so, then the logic proceeds to step 46-2, where, if FFP_DSCP is set, then the value of DSCP from FFP is used. If FFP_DSCP is not set, and the DSCP flag is set to 1, then the assigned DSCP value is used to index into the DiffServ table, else the DSCP value from the IP header is used. After executing the appropriate action at step 46-2, then the logic continues to step 46-3, where it is determined whether the rate counter is less than or equal to the DSCP threshold value. If the rate counter is not greater than or equal to the DSCP Discard threshold, then the flow logic continues to step 46-9. If the rate counter is greater than or equal to the DSCP discard threshold, then the logic continues to step 46-5, where it is determined if the DF value is 1. If the DF value is 1, then portbitmap is set to 0, and if C State or a copy of the packet should go to the CPU, then the portbitmap is set to 1, much less than CPU, and the logic skips to step 46-4. If DF value is not equal to 1, then the logic continues to step 46-7, where it is determined if the DF value equals 2. If the DF value is found to equal 2, then the CNG bit is set in the P Channel and the logic continues to step 46-9. If the DF value is not equal to 2, then the logic continues directly to step 42-9 without modification of the CNG bit. At step 46-9 the logic determines is the DSCP rate counter is less than or equal to the DSCP re-mark threshold. If so, then the logic continues to step 46-10, while if not, then the logic continues to 46-11. At step 46-10 the logic determines if the RMF value equals 0 or 3. If so, then the logic continues to step 46-11, while if not, then the logic checks to see if the RMF value equals 2 at step 46-12. If the RMF value equals 2, then the logic gets the 802.1p priority from the New DSCP assigned 802.1p priority field. If the RMF value does not equal 2, then the logic proceeds directly to step 46-17 without modification of the priority. At step 46-17, the DSCP field is changed to the New DSCP field, the IP checksum is recalculated, the CRC is regenerated. Upon completion of these actions, the logic continues to step 46-4.

Returning to step 46-10, if the RMF value is not equal to 0 or 3, then the logic continues to step 46-11, where the logic checks to see if the NP value equals 1x. If so, then the logic gets the 802.1p packet priority from the 802.1p priority field before continuing to step 46-18. If the NP value is not found to be equal to 1x at step 46-11, then the logic checks to see if the NP value equals 1 at step 46-15. If the NP value equals 1, then the logic picks up the COS queue value from the DSCP priority queue before continuing to step 46-18. If the NP value is not equal to 1 at step 46-15, then the logic continues directly to step 46-18 without modification of the COS queue. At step 46-18, if the FFP-DSCP equals 1 or the DSCP_flag equals 1, then the DSCP field is changed, the IP checksum is recalculated, and the CRC is regenerated. In this step, the DSCP field will come from the FFP logic if FFP_DSCP equals 1, if not, then the value will come from the DSCP logic. Upon completion of these actions, the DSCP logic continues to step 46-4.

Figure 47:
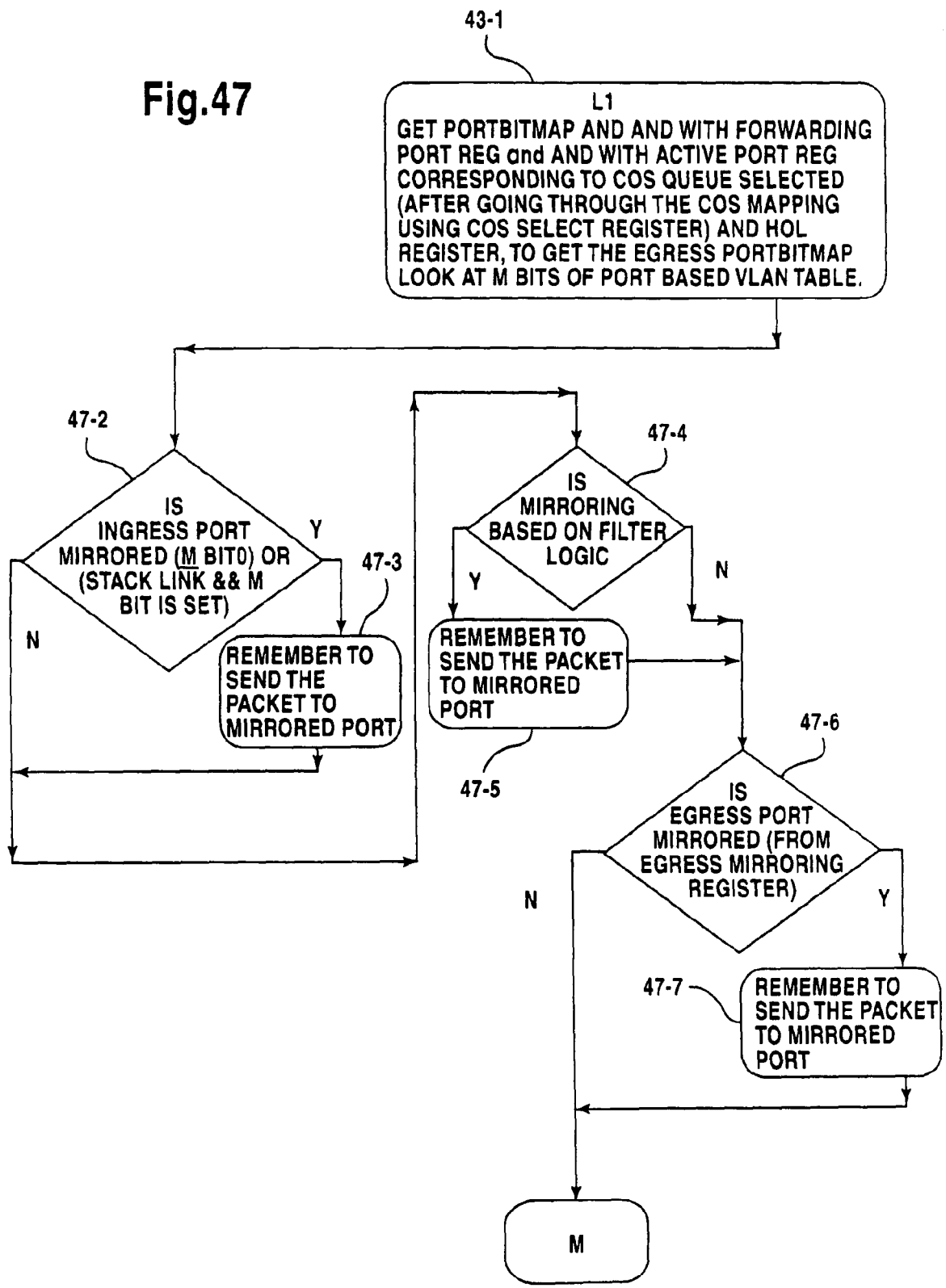
FIG. 47 is a flowchart expanding step 46-4.

FIG. 47 shows a detailed flowchart of the logic contained within step 42-4 of FIG. 42. At step 47-1 the logic gets the PortBitmap and conducts a logical "and" operation with this value and the forwarding port register, while also "anding" this value with the active port register corresponding to the COS queue selected, after going through the COS mapping using the COS Select Register. This value is also "anded" with the HOL Register value, which corresponds to Active Port Register 8, to get the PortBitmap at this step. The logic also looks at the M bits of the port based VLAN at this step. Upon completion of the actions of step 47-1, the logic continues to step 47-2, where the logic checks to see if the ingress port is mirrored, that is if the M bit is 0, or if the stack link and the M bit is set. If so, then the packet is sent to the according mirrored port at step 47-3, while if not, then the logic continues to step 47-4 without taking any mirror port action. At step 47-4 the logic checks to se if the mirroring is based upon filter logic. If so, then the packet is sent to the appropriate mirrored port at step 47-5, while if not, then the logic continues to step 47-6 without taking any mirrored port action. At step 47-6 the logic checks to see if the egress port is mirrored by looking at the egress mirroring register. If the egress port is mirrored, then the packet is sent to the mirrored port before continuing to step 47-8. If the packet is not mirrored, then the logic simply continues directly to step 47-8 without taking any mirror port action. Step 47-8 continues with the mirror port logic, and therefore, will not be discussed in detail. Nonetheless, at this stage of the logic the DSCP has been accordingly modified such that the packet flow can be appropriately shaped and/or metered upon egress.

Metering Using Meter Id

Figure 32:
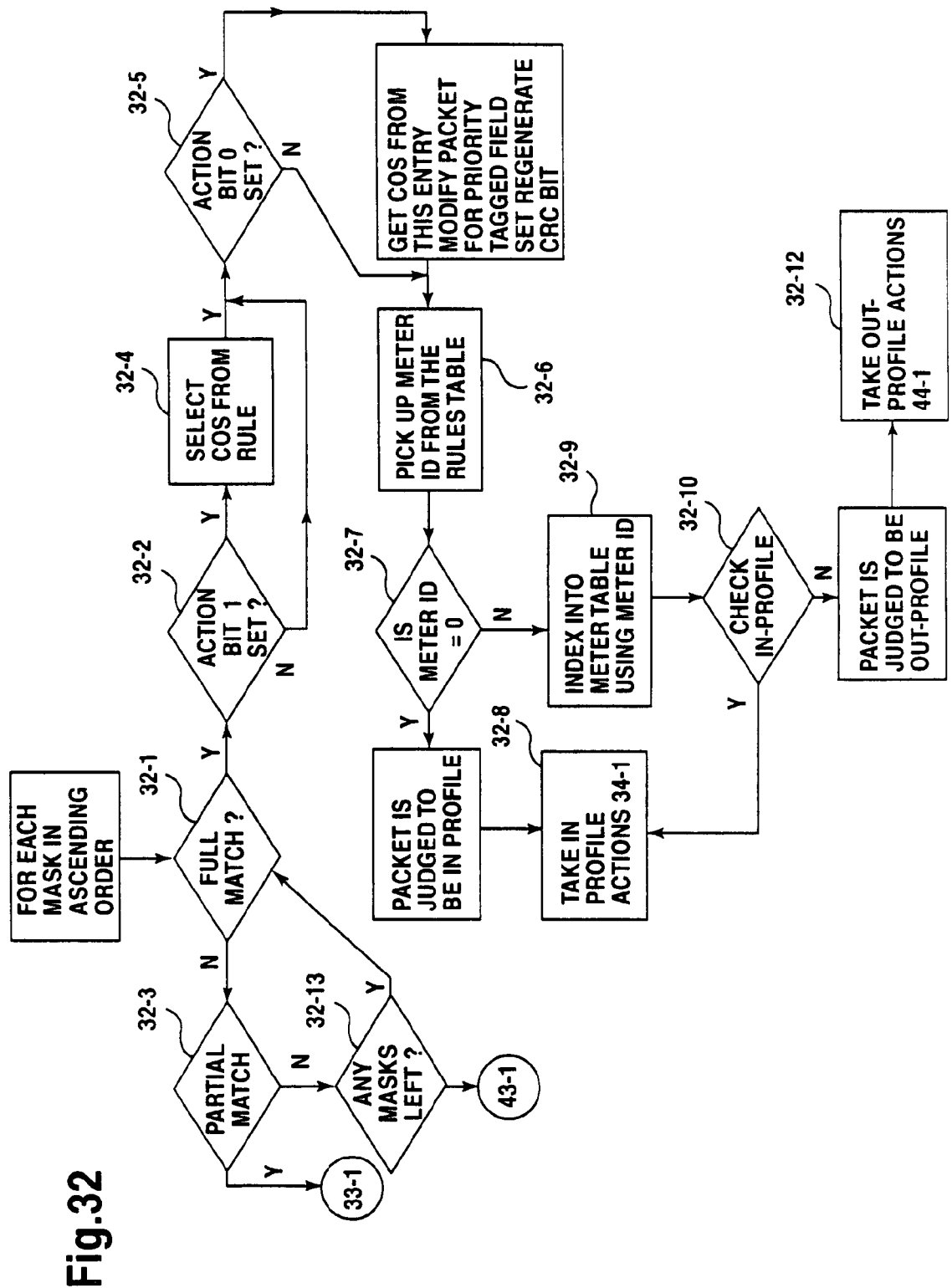
FIG. 32 is a primary flowchart for the filtering/metering logic.
Figure 33:
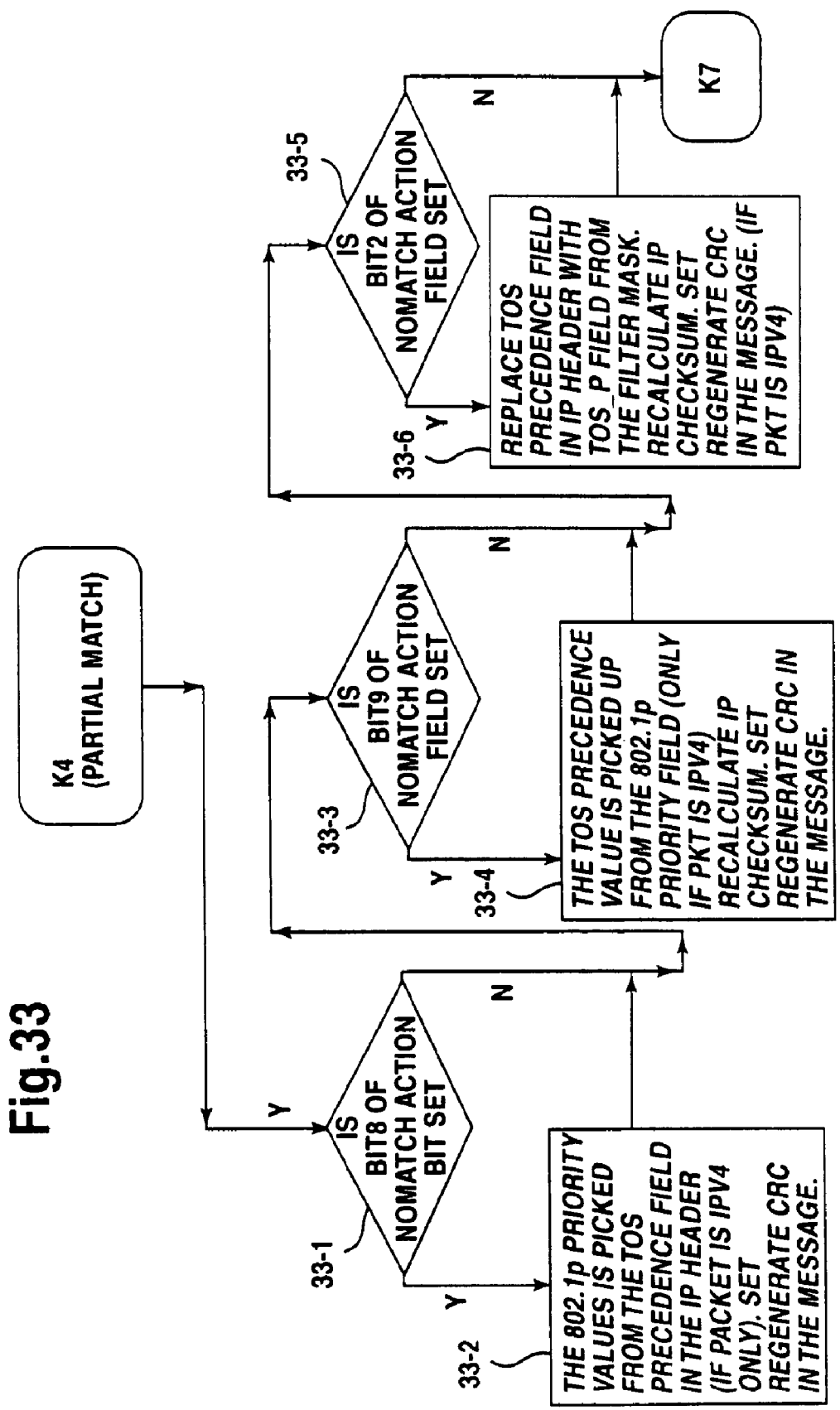
FIG. 33 is a flowchart of the partial match logic.

In another embodiment, the packet flow control logic is folded into the filtering logic, and therefore, the packet flow control logic operates in conjunction with the filtering. In this embodiment, the filtering/flow logic operates in three stages: first, the logic takes actions that are independent of the packet profile, that is the actions do not depend on the classification of the packet as in-profile or out-profile; second, the filtering/flow logic picks up the meterid, which is a 6 bit number associated with the packet that is stored in the rules table, and takes any appropriate in-profile actions that are set; and third, the filtering/flow logic takes any appropriate out-profile actions. Beginning with the profile independent actions, upon application of each individual filter mask, which is generally undertaken in ascending numerical order, a determination is made by the filtering/flow logic as to whether there is a matching rule, as shown in FIG. 32. This determination essentially determines whether or not there is a full match, as previously defined, which is shown in FIG. 32 as step 32-1. If it is determined that there is a full match for the particular mask at step 32-1, then the first action bit is checked at step 32-2. If a full match is not determined at step 32-1, then the logic determines whether or not there is a partial match for the mask at step 32-3. If a partial match is found at step 32-3, then the logic continues through the partial match method, which is illustrated in FIG. 33 and will be further discussed below. Returning to step 32-2, if it is determined that bit 1 of the action bits is set, then the class of service is selected from this rule entry at step 32-4. If bit 1 of the action bits is not set, then the logic continues to step 32-5 and checks to see if bit 0 of the action fields is set. If bit 0 is set, then the class of service for this entry is obtained from the rule entry, the packet is modified for priority tagged field, and the regenerate CRC bit is set at step 32-5. If bit 0 is not set, then the logic continues to step 32-6, which generally represents the beginning of the flow control logic, and the end of the profile-independent actions, as action bit 0 and action bit 1 are independent actions from flow control. Put simply, the profile independent actions are taken at steps 32-1 through 32-5, and beginning at step 32-6, the profile dependent actions begin. At step 32-6, the meter id for the particular mask is obtained from the rules table. At step 32-7, the logic determines if the meter id obtained from the rules table is 0. If the meter id is 0, then the packet is automatically judged to be in-profile, and the appropriate in-profile actions are immediately taken at step 32-8. If the meter id is not 0, then the logic indexes into the meter table with the meter id at step 32-9 to determine the profile status of the packet. At step 32-10, upon indexing into the meter table, the logic determines if the packet is in fact in-profile, and if so, then the in-profile actions of step 32-8 are taken. If the packet is not determined to be in-profile, then by default the packet is determined to be out-profile at step 32-11. Therefore, upon the determination that the packet is out-profile, the appropriate out-profile actions are taken at step 32-12.

Figure 34:
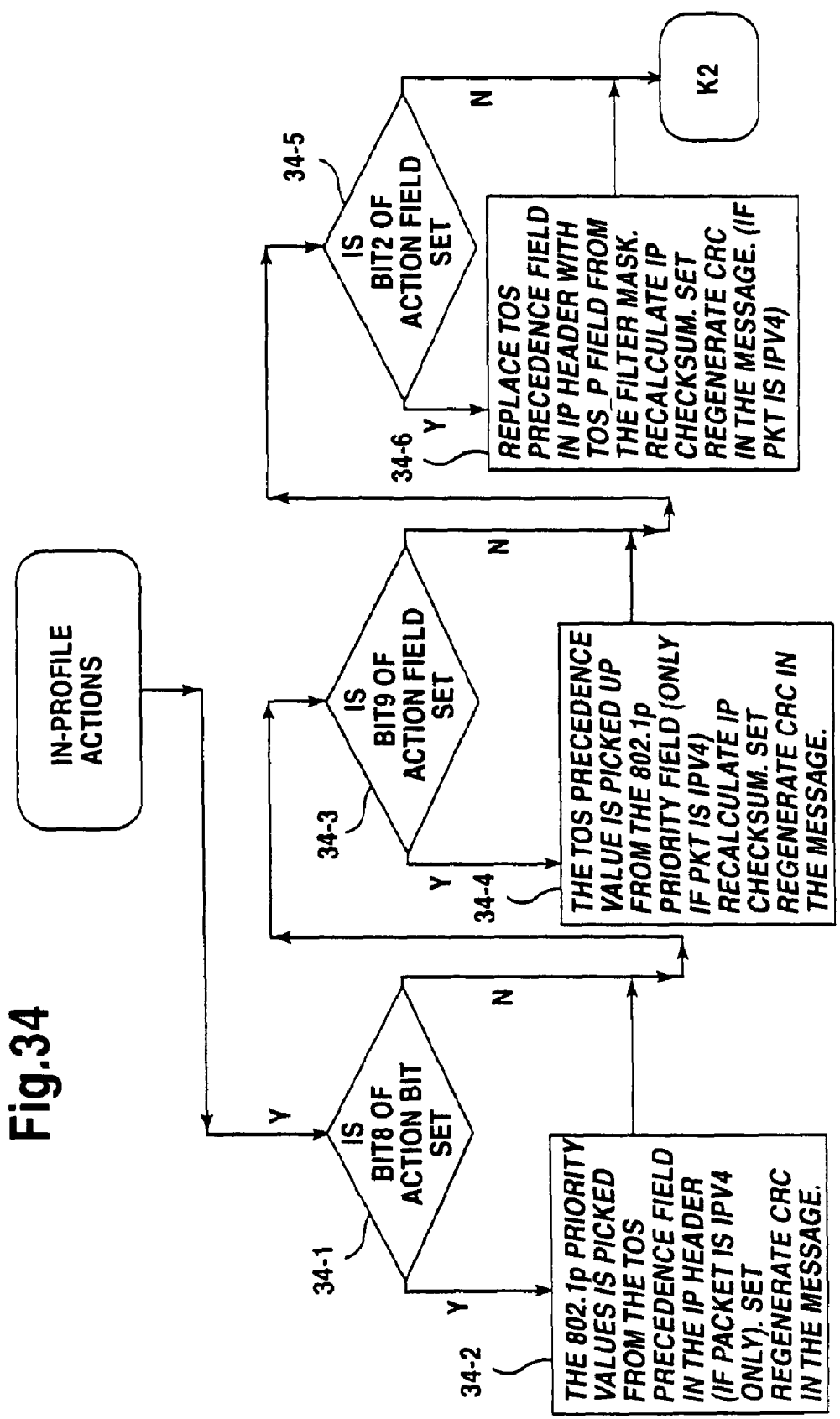
FIG. 34 is a flowchart of the in-profile action logic.

The partial match actions discussed at step 32-3, which are part of the profile independent actions, are further detailed in FIG. 33. If a partial match is not found at step 32-3, then the logic determines if there are any other masks to compare. If there are other masks to compare, then the logic returns to step 32-1 in FIG. 32. If there are no other masks to compare, then the logic continues to check for mirrored port and final FFP actions, as shown in FIG. 34. If, however, a partial match is found at step 32-3, then the logic continues in FIG. 33 at step 33-1. At step 33-1, the logic determines if bit 8 of the no match action bits is set. If bit 8 of the no match action bits is set, then the logic picks up the IEEE 802.1P priority values from the TOS precedence field in the packet header at step 33-2 and continues to step 33-3. If bit 8 of the no match action bits is not set, then the logic continues to directly to step 33-3 without action. At step 33-3, bit 9 of the no match action bits is checked. If bit 9 of the no match action bits is set, then the TOS precedence value is picked up from the IEEE 802.1p priority field, the IP checksum is recalculated, and the regenerate CRC is set in the message. Thereafter, the logic continues to step 33-5. If no match action bit 9 is not set, then the logic simply continues to step 33-5 without taking any action. At step 33-5, the logic checks to see if bit 2 of the no match action bits is set. If bit 2 is set, then the logic replaces the TOS precedence field in the IP header with the TOS_P field from the filter mask, the IP checksum is recalculated, and the regenerate CRC is set in the message. After taking these actions, the logic continues in FIG. 35 at step 35-1. If the No Match action bit is not set, then the logic simply continues to step 35-1 without taking any action.

Figure 35:
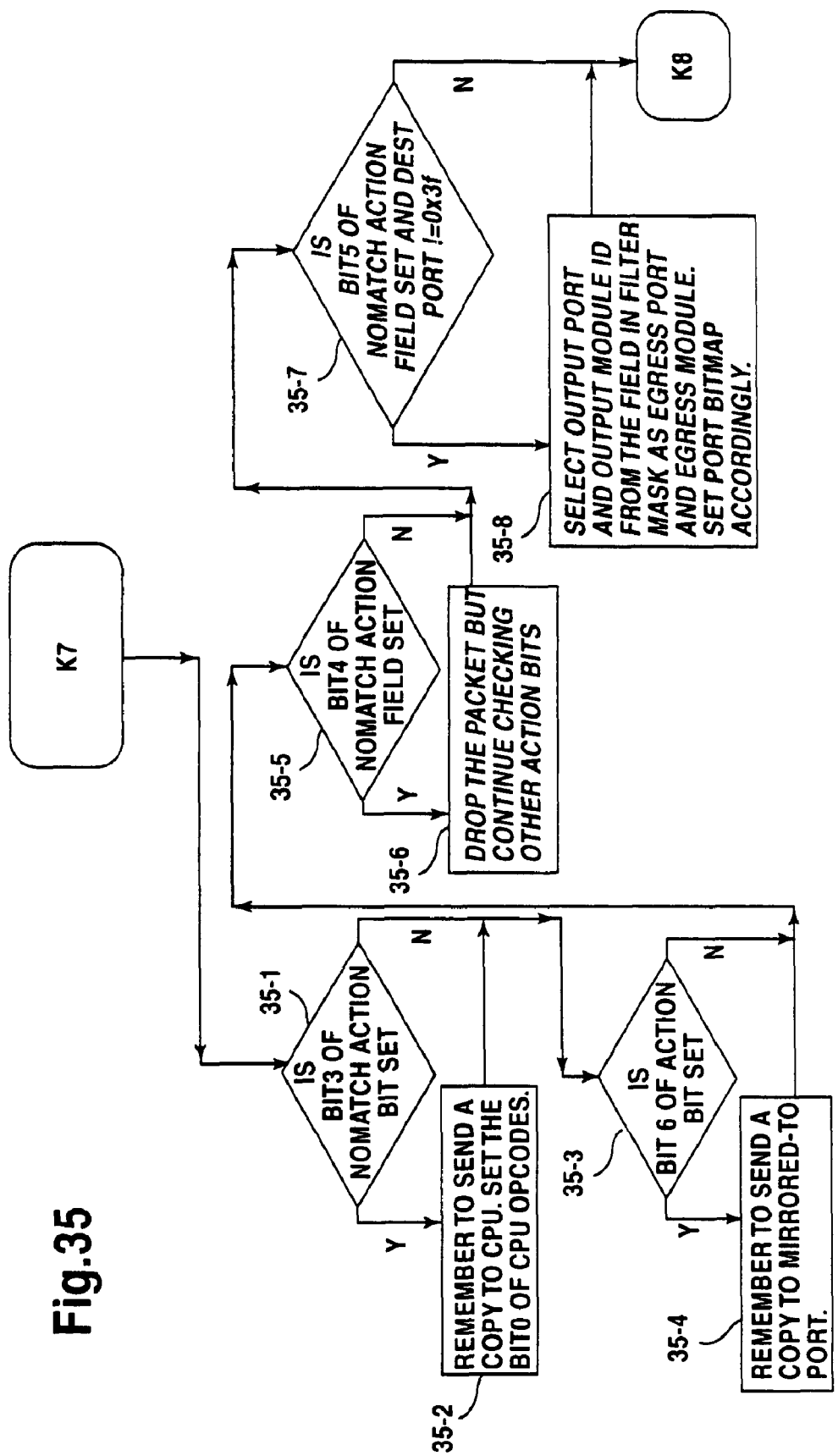
FIG. 35 is a flowchart of the partial match action logic for bits 3-6.
Figure 36:
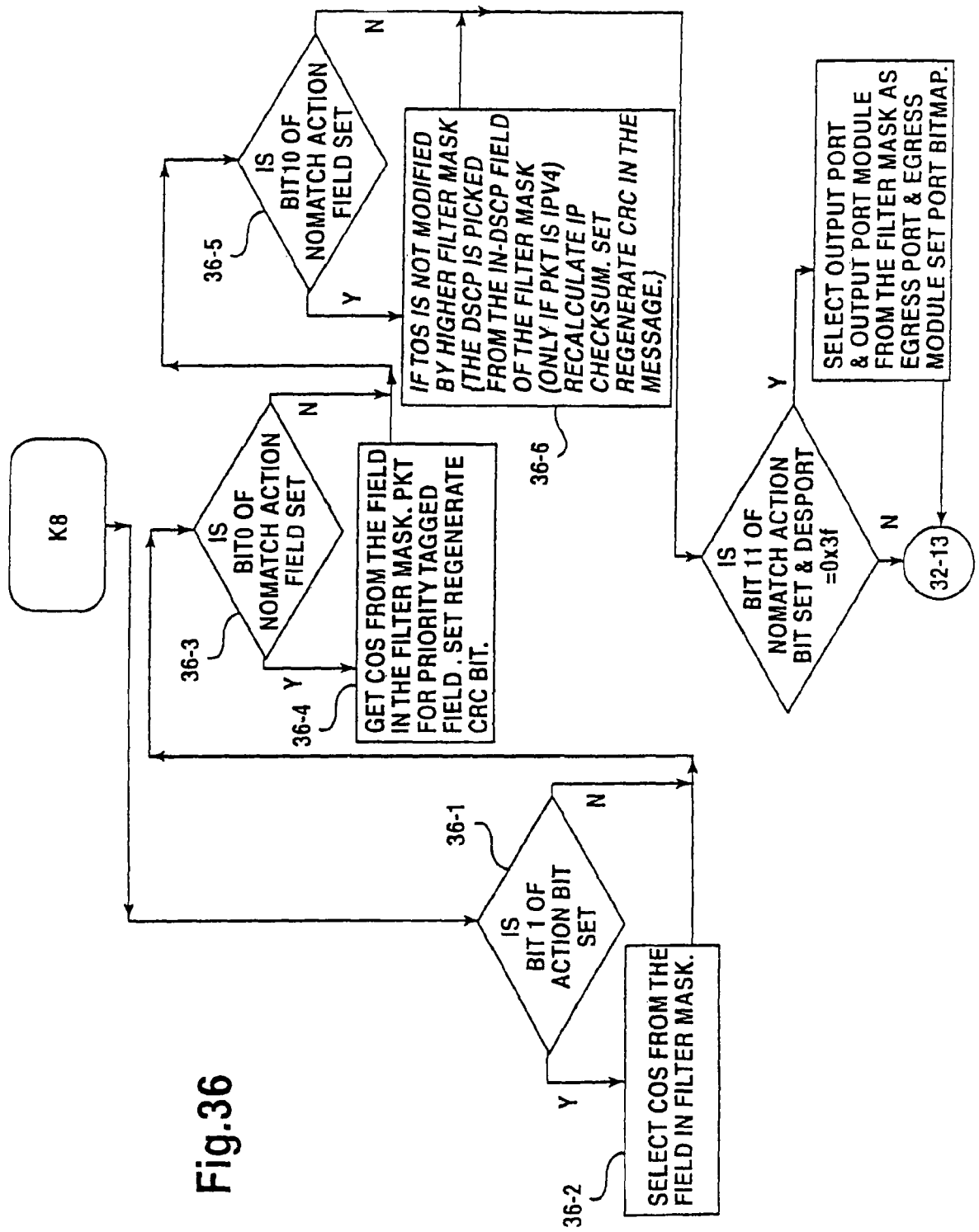
FIG. 36 is a flowchart of the partial match action logic for bits 1, 0, and 10.

FIG. 35 illustrates the continuation of the partial match action logic, which is again part of the profile independent actions, beginning with step 35-1. At step 35-1 the logic checks to see if no match action bit 3 is set. If the bit is set, then a copy of the packet is sent to the CPU and bit 0 of the CPU opcodes is set before proceeding to step 35-3. If No Match action bit 3 is not set, then the logic simply continues to step 35-3 without taking any action. At step 35-3 the logic checks to see if No Match action bit 6 is set. If no match action bit 6 is set, then a copy of the packet is sent to the mirrored port at step 35-4 and the logic continues to step 35-5. If No Match action bit 6 is not set at step 35-3, then the logic simply continues to step 35-5 without taking any action. At step 35-5, the logic checks to see if No Match action bit 4 is set. If No Match action bit 4 is set, then the logic drops the packet at step 35-6 and continues to step 35-7. If No Match action bit 4 is not set at step 35-5, then the logic simply continues to step 35-7 without taking any action. At step 35-7, the logic checks to see if bit 5 of the No Match action bits is set. If No Match action bit 5 is set, then at step 35-8 the outport port and output module id from the field in the filter mask are set as the egress port and the egress module, along with the according set of the port bitmap. Thereafter, the logic continues to step 36-1, as shown in FIG. 36. If No Match action bit 5 is not set, then the logic simply continues to step 36-1 without taking any action associated with No Match action bit 5.

Figure 43:
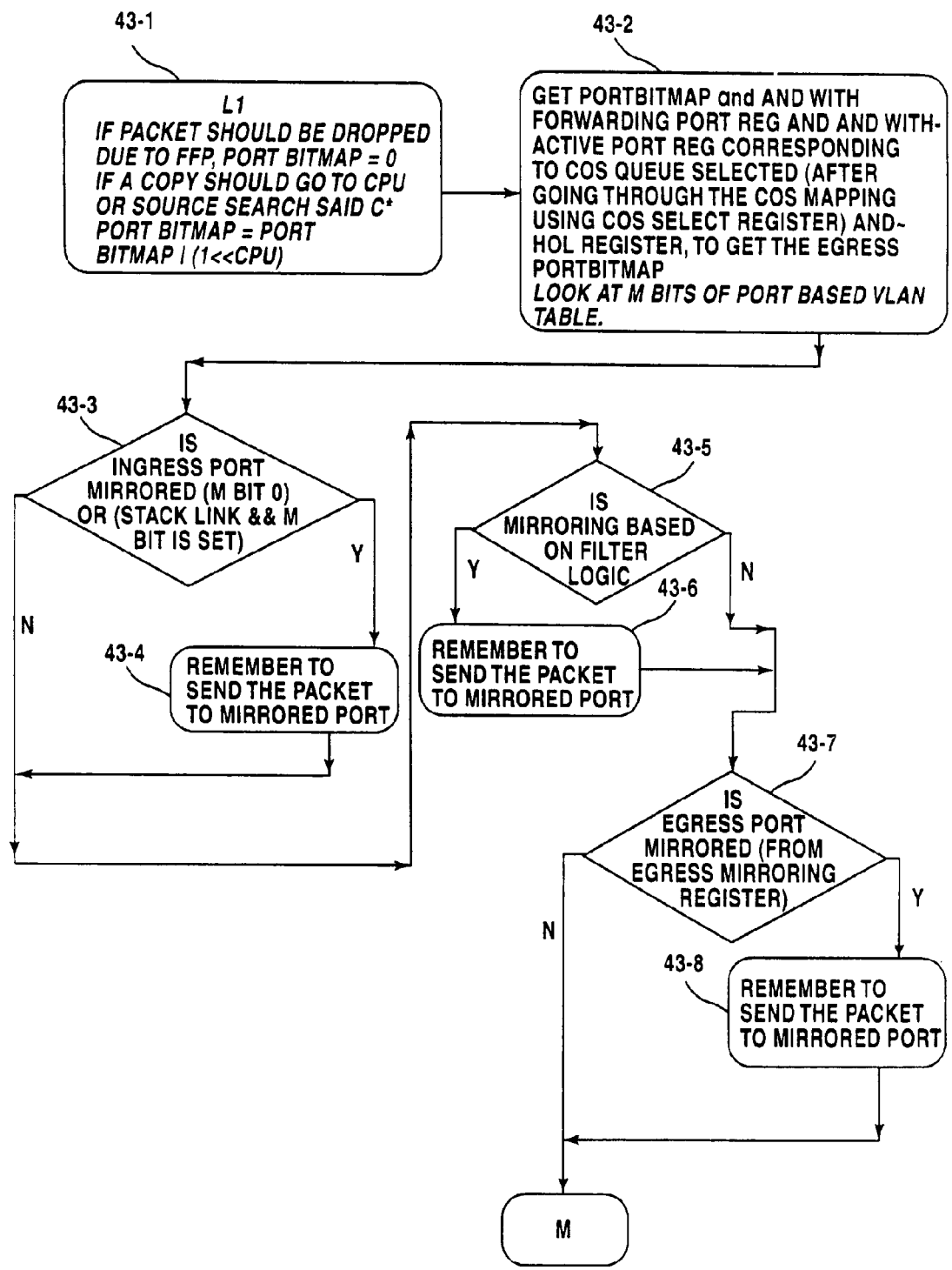
FIG. 43 is a flowchart of the mirrored port/final FFP actions.

FIG. 36 shows the continuation of the partial match logic, which is again part of the profile independent actions, starting with step 36-1. At step 36-1, the logic checks to see if bit 1 of the No Match action bits is set. If No Match action bit 1 is set, then the logic selects the COS from the field in the filter mask at step 36-2 and continues to step 36-3. If bit 1 of the No Match action bits is not set, then the logic simply continues to step 36-3 without taking any action. At step 36-3, the logic checks to see if bit 0 in the No Match action bits is set. If bit 0 is set, then the logic gets the COS from the field in the filter mask, modifies the packet for the priority tagged field, sets the regenerate CRC bit, and then continues to step 36-5. If bit 0 is not set, then the logic simply continues to step 36-5 without taking any action associated with No Match action bit 0. At step 36-5, the logic checks to see if no match action bit 10 is set. If bit 10 is set, and if the TOS has not been modified by a higher filter mask, then at step 36-6 the DSCP is picked from the in-DSCP field of the filter mask, the IP checksum is recalculated, and the regenerate CRC bit is set in the message. After taking these actions, and if bit 10 of the No Match action bits is not found to be set at step 36-5, then the logic continues to step 36-7. At step 36-7, the logic checks to see if bit 11 of the No Match action bits is set. If bit 11 is set, then the logic selects the output port and the output port module from the filter mask as the egress port and the egress module t step 36-8. Further, the port bitmap is accordingly set at step 36-8. If bit 11 is not found to be set at step 35-7, or if the No Match actions for bit 11 are taken, then the logic continues by checking if there are any more masks to compare, and if so, by beginning with step 33-1 for the next mask and repeating each of the above mentioned steps. If there are no more masks to compare, then the logic continues to step 43-1, as shown in FIG. 43.

At step 43-1 the port bitmap is set to 0 if the packet is to be dropped based upon actions to be taken, as determined by the filtering process. At step 43-2 the logic gets the port bitmap and "AND's" this value with forwarding port register and "AND's" this with the active port register corresponding to the COS queue selected after going through the COS mapping using COS select register and "AND'ed" with the HOL register to get the egress port bitmap. Additionally, at step 43-2 the logic looks at the M bits of the port based VLAN table before continuing to step 43-3. At step 43-3 the logic determines if the ingress port is mirrored, which corresponds to M bit 0, or if the stack link and M bits are set. If so, then the packet is sent to the mirrored port at step 43-4 before continuing with the logic at step 43-5. If the bits are not set at step 43-3, then the logic continues directly to step 43-5 without forwarding the packet to the mirrored port. At step 43-5 the logic determines if the mirroring is based upon filtering logic. If not, then the logic continues directly to step 43-7. If so, then the logic again sends the packet to the mirrored port prior to proceeding to step 43-7. At step 43-7 the logic determines if the egress port is mirrored from reviewing the egress mirroring register. If the egress mirroring port register dictates, then the packet is sent to the mirrored port. If not, then the logic continues through the mirroring processes designated by block M, which will not be discussed in detail herein.

Figure 37:
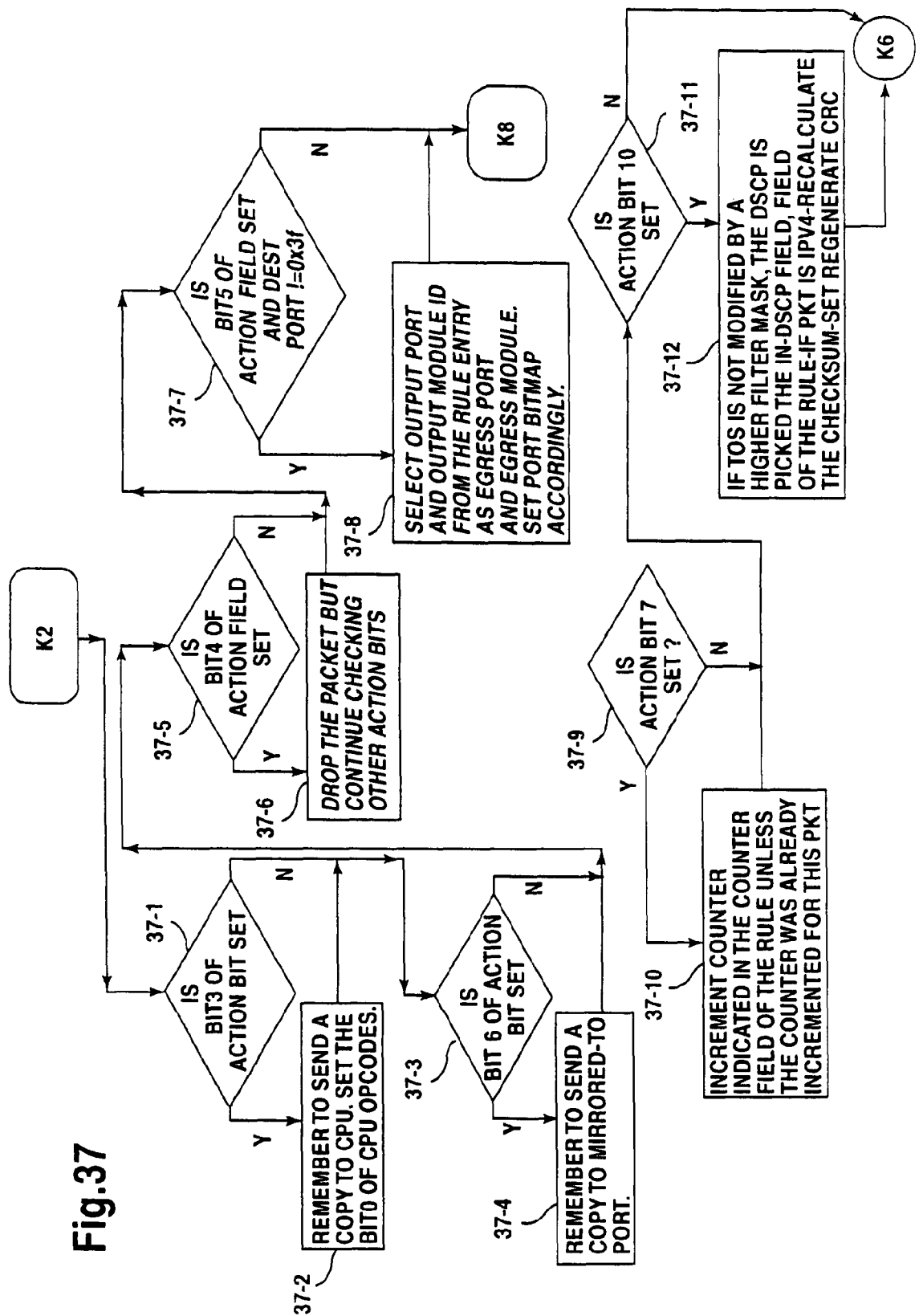
FIG. 37 is a flowchart of the in-profile action logic for bits 2, 8, and 9.

Once all of the profile independent actions are taken, then the logic continues through the profile dependent actions beginning with 32-8 in FIG. 32. At step 32-8, it has already been determined that the packet at issue is classified as in-profile, and as such, step 32-8 constitutes packet dependent actions. The specific in-profile actions noted in step 32-8 are shown in greater detail beginning in FIG. 36. At step 34-1 in FIG. 34, the filtering/flow control logic checks in-profile action bit 8 to see if this bit is set. If this bit is not set, then the logic simply continues to step 34-3 without taking any action on the packet. However, if the bit is set, then the logic takes the in-profile actions associated with this bit. Specifically, if bit 8 is set, then at step 34-2 the logic picks the 802.1p priority value from the TOS precedence field in the IP header and the regenerate CRC bit in the message is set. After taking these actions, the logic continues to step 34-3, where the logic checks to see if in-profile action bit 9 is set. If the bit is not set, then the logic continues to step 34-5 without taking any action on the packet. If bit 9 is set, then at step 34-4 the logic takes the appropriate in-profile actions associated with in-profile action bit 9. Specifically, at step 34-6 the TOS precedence value is picked up from the 802.1p priority field, the IP checksum is recalculated, and regenerate CRC bit is set in the message. Thereafter, the logic continues to step 34-5, where in-profile action bit 2 is checked. If bit 2 is not set, then the logic continues, as shown in FIG. 37 at step 37-1.

Step 37-1 shows the filtering/flow control logic checking to see if in-profile action bit 3 is set. If not, then the logic continues to step 37-3; if so, then the logic sends a copy of the packet to the CPU and sets bit 0 of the CPU Opcodes at step 37-2 before continuing to step 37-3. At step 37-3, the filtering/flow logic checks in-profile action bit 6. If this bit is not set, then the logic continues to step 37-5 without taking action, however, if this bit is set, then a copy of the packet is sent to the mirrored port at step 37-4 before continuing to step 37-5. At step 37-5 the filter/flow control logic checks to see if action bit 4 is set. If bit 4 is set, then the packet is dropped at step 37-6, however, the logic continues to check the remaining action bits. If bit 4 is not set, then the logic continues to step 37-7, where action bit 5 is checked along with the destination port. If action bit 5 is set, and the destination port is set to 0x3f, the default invalid value set by SOC 10, then select output port and output module id from the rule entry as egress port and egress module, and set the port bitmap accordingly. If action bit 5 and the destination port are not set to the desired values, then the logic continues to step 37-9, where action bit 7 is checked. If action bit 7 is set, then the counter indicated in the counter field of the rule unless the counter was already incremented for this packet by a previous action bit or rule at step 37-10. Thereafter, the logic continues to step 37-11, where action bit 10 is checked. If in-profile action bit 10 is set and TOS is not modified by a higher filter mask, then the DSCP is picked from the in-DSCP field of the rules table, the IP checksum is recalculated, and the regenerate CRC is set in the packet at step 37-12. Thereafter the logic continues through the in-profile action bits, as illustrated in FIG. 42.

At step 42-1 the filtering/flow control logic checks in-profile action bit 11 and the destination port address. If action bit 11 is set and the destination port address equals 0x3f, then the outport port and the outport module are selected from the rule entry as the egress port and the egress module, and the port bitmap is updated accordingly, all in step 42-2. Upon completion of the actions associated with action bit 11, or if the action bit is not set, then the filtering/flow control logic continues to step 42-3. At step 42-3 the logic checks the in-profile action bit 12. If the bit is set, the drop precedence bit is set to 1 and the CNG bit in the P-Channel is set. After taking this action, or if action bit 12 is not set initially, then the logic continues to step 42-5. At this step the filtering/flow control logic checks in-profile action bit 13. If this bit is set, then the packet is dropped at step 42-6. After dropping the packet, or if bit 13 is not set initially, then the logic continues to check any masks unchecked by repeating the logic steps for the unchecked masks beginning at step 33-1.

Figure 44:
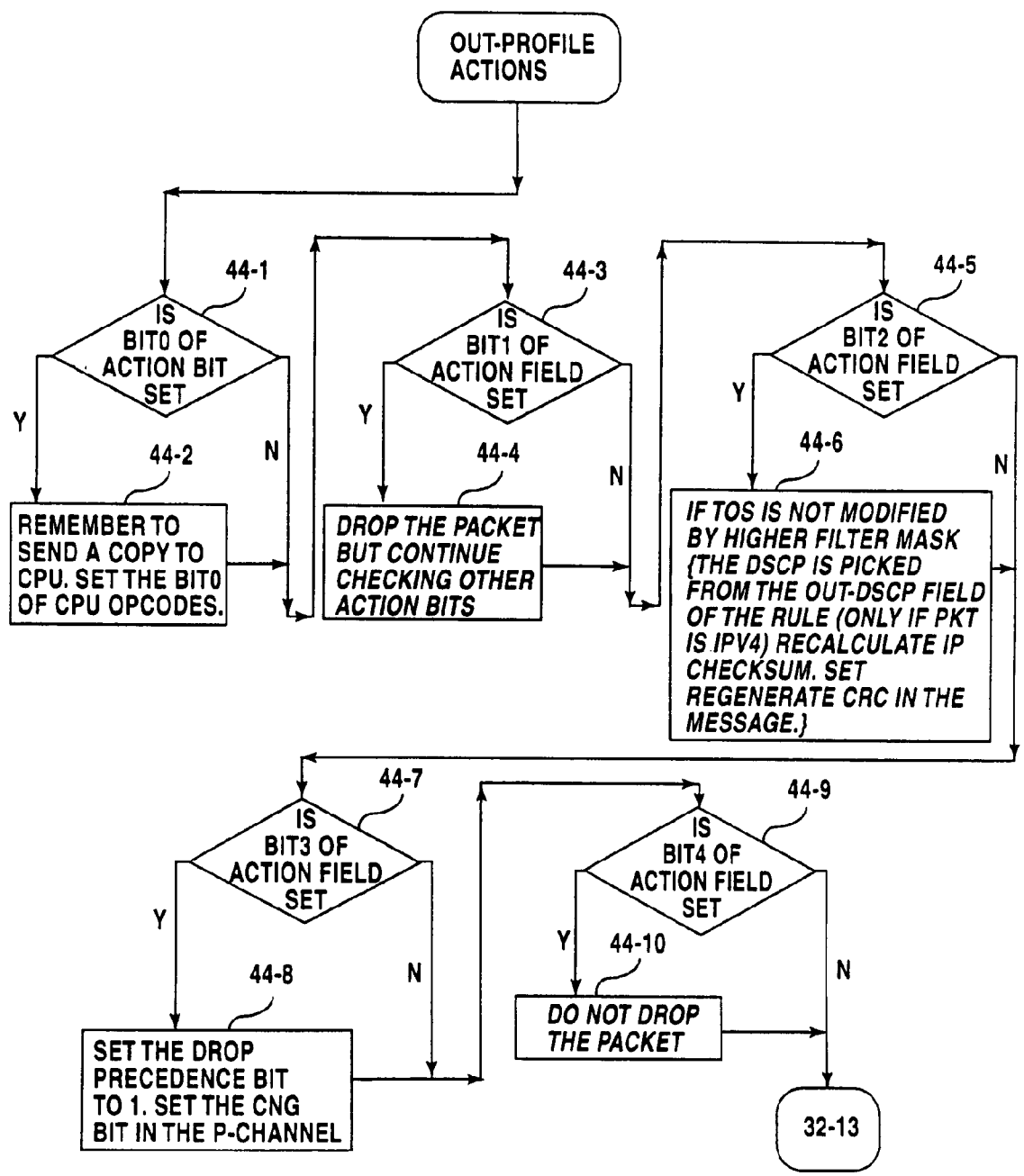
FIG. 44 is a flowchart of the out-profile action logic.

Referring back to FIG. 32 at step 32-12, if the packet is judged to be out-profile, then the out-profile actions are taken in accordance with FIG. 44. The out-profile actions begin at step 44-1 where the filtering/flow control logic checks to see if out-profile action bit 0 is set. If this bit is set, then the packet is sent to ht CPU and bit 0 of the CPU Opcodes is set before the logic continues to step 44-3. If out-profile action bit 0 is not set, then the logic continues to step 44-3 without taking any action on the packet. At step 44-3 the filtering/flow control logic checks to see if bit 1 of the out-profile action bits is set. If this bit is set, then the packet is dropped before the logic proceeds through the remaining action bits. If bit 1 is not set, then the logic simply proceeds to step 44-5 without taking any action. At step 44-5 the logic checks action bit 2, and if this bit is set then at step 44-6 the logic picks up the DSCP from the out-DSCP field of the rule if the TOS is unmodified. The IP checksum is also recalculated at step 44-6, along with setting the CRC regenerate bit. After completing the actions associated with action bit 2, or if bit 2 is not set, then the logic proceeds to step 44-7, where action bit 3 of the action field is checked. If the bit is set, then the drop precedence bit is set and the CNG bit in the P-channel is set at step 44-8. After taking these actions, or if action bit 3 is not set initially, then the logic proceeds to step 44-9, where bit 4 is checked. If bit 4 is set, then the packet is not dropped at step 44-10, despite previous action bits. If bit 4 is not set, then any previously executed action bits that would drop the packet are not modified and the packet is allowed to be dropped. At step 44-11 the out-profile actions for one mask are complete and the logic determines if there are any other masks to compare. If there are more masks, then the logic continues at step 32-1 in FIG. 32 with the next mask. If there are no more masks to review, then the logic continues with step 43-1 in FIG. 43.

Generally speaking, it should also be noted that the block diagram of SOC 10 in FIG. 2 illustrates each GPIC 30 having its own ARL/L3 tables 31, rules table 32, and VLAN tables 33, and also each EPIC 20 also having its own ARL/L3 tables 21, rules table 22, and VLAN tables 23. However, it is also contemplated within the present invention that two separate modules can share a common ARL/L3 table and a common VLAN table. Each module, however, generally has its own rules table 22. For example, therefore, GPIC 30*a* may share ARL/L3 table 21*a* and VLAN table 23*a* with EPIC 20*a*. Similarly, GPIC 30*b* may share ARL table 21*b* and VLAN table 23*b* with EPIC 20*b*. This sharing of tables reduces the number of gates which are required to implement the invention, and makes for simplified lookup and synchronization as will be discussed below.

Table Synchronization and Aging

SOC 10 utilizes a unique method of table synchronization and aging, to ensure that only current and active address information is maintained in the tables. When ARL/L3 tables are updated to include a new source address, a "hit bit" is set within the table of the "owner" or obtaining module to indicate that the address has been accessed. Also, when a new address is learned and placed in the ARL table, an S channel message is placed on S channel 83 as an ARL insert message, instructing all ARL/L3 tables on SOC 10 to learn this new address. The entry in the ARL/L3 tables includes an identification of the port which initially received the packet and learned the address. Therefore, if EPIC 20*a* contains the port which initially received the packet and therefore which initially learned the address, EPIC 20*a* becomes the "owner" of the address. Only EPIC 20*a*, therefore, can delete this address from the table. The ARL insert message is received by all of the modules, and the address is added into all of the ARL/L3 tables on SOC 10. CMIC 40 will also send the address information to CPU 52. When each module receives and learns the address information, an acknowledge or ACK message is sent back to EPIC 20*a*; as the owner further ARL insert messages cannot be sent from EPIC 20*a* until all ACK messages have been received from all of the modules. In a preferred embodiment of the invention, CMIC 40 does not send an ACK message, since CMIC 40 does not include ingress/egress modules thereupon, but only communicates with CPU 52. If multiple SOC 10 switches are provided in a stacked configuration, all ARL/L3 tables would be synchronized due to the fact that CPS channel 80 would be shared throughout the stacked modules.

Figure 18:
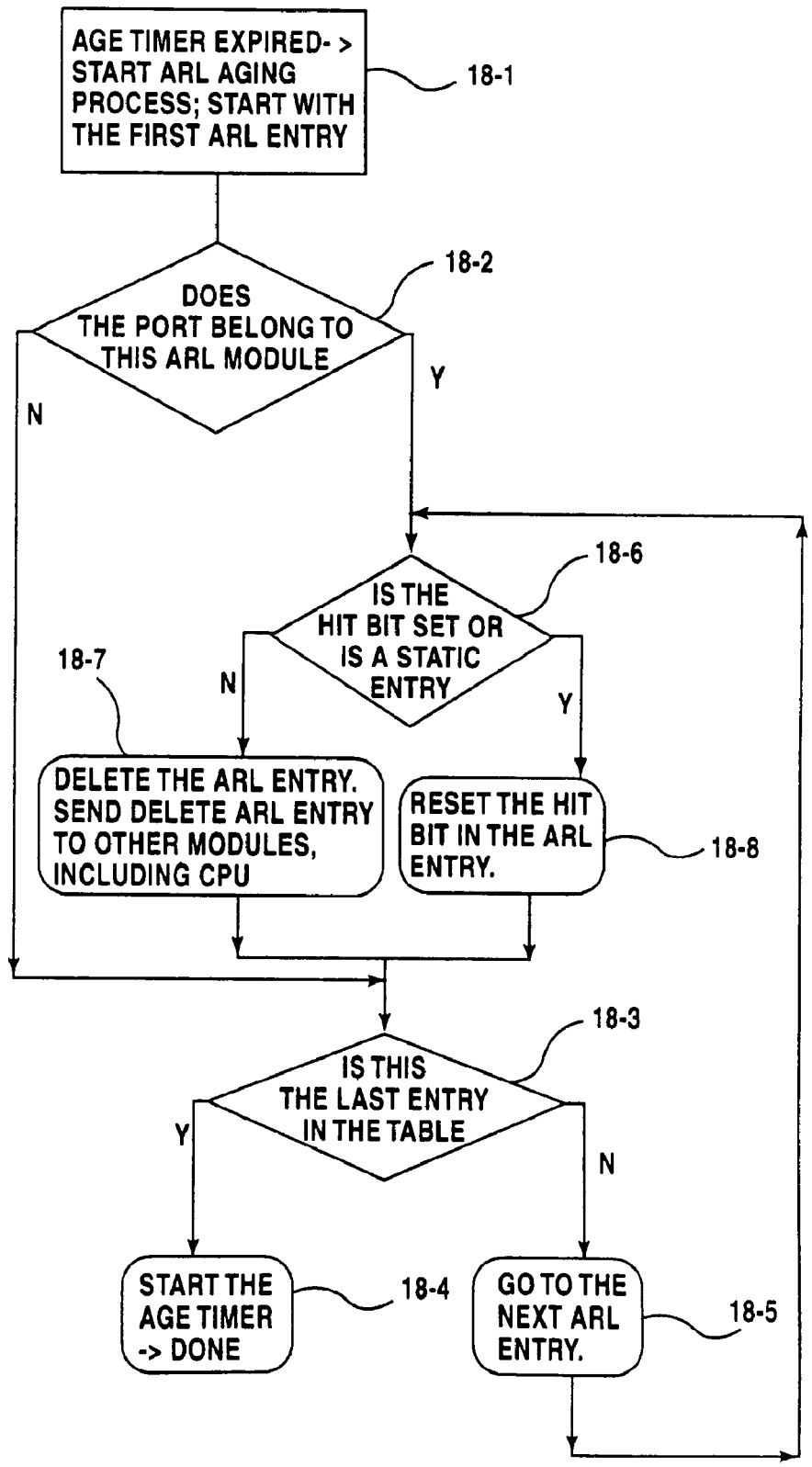
FIG. 18 is a flow chart illustrating the aging process for ARL (L2) and L3 tables.

Referring to FIG. 18, the ARL aging process is discussed. An age timer is provided within each EPIC module 20 and GPIC module 30, at step 18-1, it is determined whether the age timer has expired. If the timer has expired, the aging process begins by examining the first entry in ARL table 21. At step 18-2, it is determined whether or not the port referred to in the ARL entry belongs to the particular module. If the answer is no, the process proceeds to step 18-3, where it is determined whether or not this entry is the last entry in the table. If the answer is yes at step 18-3, the age timer is restarted and the process is completed at step 18-4. If this is not the last entry in the table, then the process is returned to the next ARL entry at step 18-5. If, however, at step 18-2 it is determined that the port does belong to this particular module, then, at step 18-6 it is determined whether or not the hit bit is set, or if this is a static entry. If the hit bit is set, the hit bit is reset at step 18-7, and the method then proceeds to step 18-3. If the hit bit is not set, the ARL entry is deleted at step 18-8, and a delete ARL entry message is sent on the CPS channel to the other modules, including CMIC 40, so that the table can be appropriately synchronized as noted above. This aging process can be performed on the ARL (layer two) entries, as well as layer three entries, in order to ensure that aged packets are appropriately deleted from the tables by the owners of the entries. As noted previously, the aging process is only performed on entries where the port referred to belongs to the particular module which is performing the aging process. To this end, therefore, the hit bit is only set in the owner module. The hit bit is not set for entries in tables of other modules which receive the ARL insert message. The hit bit is therefore always set to zero in the synchronized non-owner tables.

The purpose of the source and destination searches, and the overall lookups, is to identify the port number within SOC 10 to which the packet should be directed to after it is placed either CBP 50 or GBP 60. Of course, a source lookup failure results in learning of the source from the source MAC address information in the packet; a destination lookup failure, however, since no port would be identified, results in the packet being sent to all ports on SOC 10. As long as the destination VLAN ID is the same as the source VLAN ID, the packet will propagate the VLAN and reach the ultimate destination, at which point an acknowledgment packet will be received, thereby enabling the ARL table to learn the destination port for use on subsequent packets. If the VLAN IDs are different, an L3 lookup and learning process will be performed, as discussed previously. It should be noted that each EPIC and each GPIC contains a FIFO queue to store ARL insert messages, since, although each module can only send one message at a time, if each module sends an insert message, a queue must be provided for appropriate handling of the messages.

Port Movement

After the ARL/L3 tables have entries in them, the situation sometimes arises where a particular user or station may change location from one port to another port. In order to prevent transmission errors, therefore, SOC 10 includes capabilities of identifying such movement, and updating the table entries appropriately. For example, if station A, located for example on port 1, seeks to communicate with station B, whose entries indicate that user B is located on port 26. If station B is then moved to a different port, for example, port 15, a destination lookup failure will occur and the packet will be sent to all ports. When the packet is received by station B at port 15, station B will send an acknowledge (ACK) message, which will be received by the ingress of the EPIC/GPIC module containing port 1 thereupon. A source lookup (of the acknowledge message) will yield a match on the source address, but the port information will not match. The EPIC/GPIC which receives the packet from B, therefore, must delete the old entry from the ARL/L3 table, and also send an ARL/L3 delete message onto the S channel so that all tables are synchronized. Then, the new source information, with the correct port, is inserted into the ARL/L3 table, and an ARL/L3 insert message is placed on the S channel, thereby synchronizing the ARL/L3 tables with the new information. The updated ARL insert message cannot be sent until all of the acknowledgment messages are sent regarding the ARL delete message, to ensure proper table synchronization. As stated previously, typical ARL insertion and deletion commands can only be initiated by the owner module. In the case of port movement, however, since port movement may be identified by any module sending a packet to a moved port, the port movement-related deletion and insertion messages can be initiated by any module.

Trunking

Figure 19:
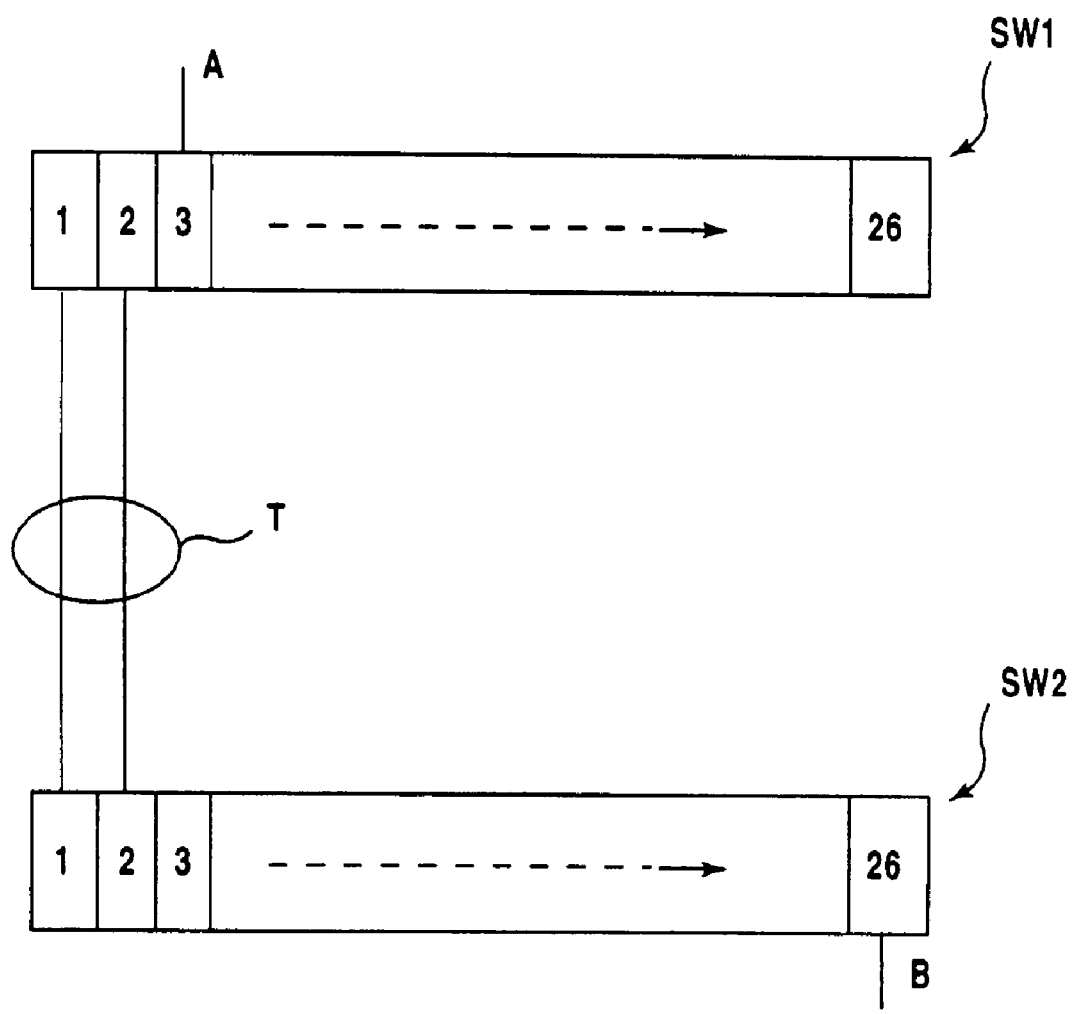
FIG. 19 illustrates communication using a trunk group according to the present invention.

During the configuration process wherein a local area network is configured by an administrator with a plurality of switches, etc., numerous ports can be "trunked" to increase bandwidth. For example, if traffic between a first switch SW1 and a second switch SW2 is anticipated as being high, the LAN can be configured such that a plurality of ports, for example ports 1 and 2, can be connected together. In a 100 megabits per second environment, the trunking of two ports effectively provides an increased bandwidth of 200 megabits per second between the two ports. The two ports 1 and 2, are therefore identified as a trunk group, and CPU 52 is used to properly configure the handling of the trunk group. Once a trunk group is identified, it is treated as a plurality of ports acting as one logical port. FIG. 19 illustrates a configuration wherein SW1, containing a plurality of ports thereon, has a trunk group with ports 1 and 2 of SW2, with the trunk group being two communication lines connecting ports 1 and 2 of each of SW1 and SW2. This forms trunk group T. In this example, station A, connected to port 3 of SW1, is seeking to communicate or send a packet to station B, located on port 26 of switch SW2. The packet must travel, therefore, through trunk group T from port 3 of SW1 to port 26 of SW2. It should be noted that the trunk group could include any of a number of ports between the switches. As traffic flow increases between SW1 and SW2, trunk group T could be reconfigured by the administrator to include more ports, thereby effectively increasing bandwidth. In addition to providing increased bandwidth, trunking provides redundancy in the event of a failure of one of the links between the switches. Once the trunk group is created, a user programs SOC 10 through CPU 52 to recognize the appropriate trunk group or trunk groups, with trunk group identification (TGID) information. A trunk group port bit map is prepared for each TGID; and a trunk group table, provided for each module on SOC 10, is used to implement the trunk group, which can also be called a port bundle. A trunk group bit map table is also provided. These two tables are provided on a per module basis, and, like tables 21, 22, and 23, are implemented in silicon as two-dimensional arrays. In one embodiment of SOC 10, six trunk groups can be supported, with each trunk group having up to eight trunk ports thereupon. For communication, however, in order to prevent out-of-ordering of packets or frames, the same port must be used for packet flow. Identification of which port will be used for communication is based upon any of the following: source MAC address, destination MAC address, source IP address, destination IP address, or combinations of source and destination addresses. If source MAC is used, as an example, if station A on port 3 of SW1 is seeking to send a packet to station B on port 26 of SW2, then the last three bits of the source MAC address of station A, which are in the source address field of the packet, are used to generate a trunk port index. The trunk port index, which is then looked up on the trunk group table by the ingress submodule 14 of the particular port on the switch, in order to determine which port of the trunk group will be used for the communication. In other words, when a packet is sought to be sent from station A to station B, address resolution is conducted as set forth above. If the packet is to be handled through a trunk group, then a T bit will be set in the ARL entry which is matched by the destination address. If the T bit or trunk bit is set, then the destination address is learned from one of the trunk ports. The egress port, therefore, is not learned from the port number obtained in the ARL entry, but is instead learned from the trunk group ID and rules tag (RTAG) which is picked up from the ARL entry, and which can be used to identify the trunk port based upon the trunk port index contained in the trunk group table. The RTAG and TGID which are contained in the ARL entry therefore define which part of the packet is used to generate the trunk port index. For example, if the RTAG value is 1, then the last three bits of the source MAC address are used to identify the trunk port index; using the trunk group table, the trunk port index can then be used to identify the appropriate trunk port for communication. If the RTAG value is 2, then it is the last three bits of the destination MAC address which are used to generate the trunk port index. If the RTAG is 3, then the last three bits of the source MAC address are XORED with the last three bits of the destination MAC address. The result of this operation is used to generate the trunk port index. For IP packets, additional RTAG values are used so that the source IP and destination IP addresses are used for the trunk port index, rather than the MAC addresses.

SOC 10 is configured such that if a trunk port goes down or fails for any reason, notification is sent through CMIC 40 to CPU 52. CPU 52 is then configured to automatically review the trunk group table, and VLAN tables to make sure that the appropriate port bit maps are changed to reflect the fact that a port has gone down and is therefore removed. Similarly, when the trunk port or link is reestablished, the process has to be reversed and a message must be sent to CPU 52 so that the VLAN tables, trunk group tables, etc. can be updated to reflect the presence of the trunk port.

Furthermore, it should be noted that since the trunk group is treated as a single logical link, the trunk group is configured to accept control frames or control packets, also known as BPDUs, only one of the trunk ports. The port based VLAN table, therefore, must be configured to reject incoming BPDUs of non-specified trunk ports. This rejection can be easily set by the setting of a B bit in the VLAN table. IEEE standard 802.1d defines an algorithm known as the spanning tree algorithm, for avoiding data loops in switches where trunk groups exist. Referring to FIG. 19, a logical loop could exist between ports 1 and 2 and switches SW1 and SW2. The spanning algorithm tree defines four separate states, with these states including disabling, blocking, listening, learning, and forwarding. The port based VLAN table is configured to enable CPU 52 to program the ports for a specific ARL state, so that the ARL logic takes the appropriate action on the incoming packets. As noted previously, the B bit in the VLAN table provides the capability to reject BPDUs. The St bit in the ARL table enables the CPU to learn the static entries; as noted in FIG. 18, static entries are not aged by the aging process. The hit bit in the ARL table, as mentioned previously, enables the ARL engine 143 to detect whether or not there was a hit on this entry. In other words, SOC 10 utilizes a unique configuration of ARL tables, VLAN tables, modules, etc. in order to provide an efficient silicon based implementation of the spanning tree states.

In certain situations, such as a destination lookup failure (DLF) where a packet is sent to all ports on a VLAN, or a multicast packet, the trunk group bit map table is configured to pickup appropriate port information so that the packet is not sent back to the members of the same source trunk group. This prevents unnecessary traffic on the LAN, and maintains the efficiency at the trunk group.

IP/IPX

Referring again to FIG. 14, each EPIC 20, GPIC 30, or IPIC 90 can be configured to enable support of both IP and IPX protocol at linespeed. This flexibility is provided without having any negative effect on system performance, and utilizes a table, implemented in silicon, which can be selected for IP protocol, IPX protocol, or a combination of IP protocol and IPX protocol. This capability is provided within logic circuitry 1411, and utilizes an IP longest prefix cache lookup (IP_LPC), and an IPX longest prefix cache lookup (IPX_LPC). During the layer 3 lookup, a number of concurrent searches are performed; an L3 fast lookup, and the IP longest prefix cache lookup, are concurrently performed if the packet is identified by the packet header as an IP packet. If the packet header identifies the packet as an IPX packet, the L3 fast lookup and the IPX longest prefix cache lookup will be concurrently performed. It should be noted that ARL/L3 tables 21/31 of EPICs 20 and GPICs 30 include an IP default router table which is utilized for an IP longest prefix cache lookup when the packet is identified as an IP packet, and also includes an IPX default router table which is utilized when the packet header identifies the packet as an IPX packet. Appropriate hexadecimal codes are used to determine the packet types. If the packet is identified as neither an IP packet nor an IPX packet, the packet is directed to CPU 52 via CPS channel 80 and CMIC 40. It should be noted that if the packet is identified as an IPX packet, it could be any one of four types of IPX packets. The four types, as noted previously, are Ethernet 802.3, Ethernet 802.2, Ethernet SNAP, and Ethernet II.

The concurrent lookup of L3 and either IP or IPX are important to the performance of SOC 10. In one embodiment of SOC 10, the L3 table would include a portion which has IP address information, and another portion which has IPX information, as the default router tables. These default router tables, as noted previously, are searched depending upon whether the packet is an IP packet or an IPX packet. In order to more clearly illustrate the tables, the L3 table format for an L3 table within ARL/L3 tables 21 is as follows:

IP or IPX Address—32 bits long—IP or IPX Address—is a 32 bit IP or IPX Address. The Destination IP or IPX Address in a packet is used as a key in searching this table.

Mac Address—48 bits long—Mac Address is really the next Hop Mac Address. This Mac address is used as the Destination Mac Address in the forwarded IP Packet.

Port Number—6 bits long—Port Number—is the port number the packet has to go out if the Destination IP Address matches this entry's IP Address.

L3 Interface Num—5 bits long—L3 Interface Num—This L3 Interface Number is used to get the Router Mac Address from the L3 Interface Table.

L3 Hit Bit—1 bit long—L3 Hit bit—is used to check if there is hit on this Entry. The hit bit is set when the Source IP Address search matches this entry. The L3 Aging Process ages the entry if this bit is not set.

Frame Type—2 bits long—Frame Type indicates type of IPX Frame (802.2, Ethernet II, SNAP and 802.3) accepted by this IPX Node. Value 00—Ethernet II Frame. Value 01—SNAP Frame. Value 02—802.2 Frame. Value 03—802.3 Frame.

Reserved—4 bits long—Reserved for future use.

The fields of the default IP router table are as follows:

IP Subnet Address—32 bits long—IP Subnet Address—is a 32 bit IP Address of the Subnet.

Mac Address—48 bits long—Mac Address is really the next Hop Mac Address and in this case is the Mac Address of the default Router.

Port Number—6 bits long—Port Number is the port number on which the forwarded packet has to go out.

Module ID—5 bits long—identifies the module in a stack that the packet must go out on after a longest prefix match.

L3 Interface Num—5 bits long—L3 Interface Num is L3 Interface Number.

IP Subnet Bits—5 bits long—IP Subnet Bits is total number of Subnet Bits in the Subnet Mask. These bits are ANDED with Destination IP Address before comparing with Subnet Address.

C Bit—1 bit long—C Bit—If this bit is set then send the packet to CPU also.

The fields of the default IPX router table within ARL/L3 tables 21 are as follows:

IPX Subnet Address—32 bits long—IPX Subnet Address is a 32 bit IPX Address of the Subnet.

Mac Address—48 bits long—Mac Address is really the next Hop Mac Address and in this case is the Mac Address of the default Router.

Port Number—6 bits long—Port Number is the port number on which the forwarded packet has to go out.

Module ID—5 bits long—identifies the module in a stack that the packet must go out on after a longest prefix match.

L3 Interface Num—5 bits long—L3 Interface Num is L3 Interface Number.

IPX Subnet Bits—5 bits long—IPX Subnet Bits is total number of Subnet Bits in the Subnet Mask. These bits are ANDED with Destination IPX Address before comparing with Subnet Address.

C Bit—1 bit long—C Bit—If this bit is set then send the packet to CPU also.

If a match is not found in the L3 table for the destination IP address, longest prefix match in the default IP router fails, then the packet is given to the CPU. Similarly, if a match is not found on the L3 table for a destination IPX address, and the longest prefix match in the default IPX router fails, then the packet is given to the CPU. The lookups are done in parallel, but if the destination IP or IPX address is found in the L3 table, then the results of the default router table lookup are abandoned.

The longest prefix cache lookup, whether it be for IP or IPX, includes repetitive matching attempts of bits of the IP subnet address. The longest prefix match consists of ANDing the destination IP address with the number of IP or IPX subnet bits and comparing the result with the IP subnet address. Once a longest prefix match is found, as long as the TTL is not equal to one, then appropriate IP checksums are recalculated, the destination MAC address is replaced with the next hop MAC address, and the source MAC address is replaced with the router MAC address of the interface. The VLAN ID is obtained from the L3 interface table, and the packet is then sent as either tagged or untagged, as appropriate. If the C bit is set, a copy of the packet is sent to the CPU as may be necessary for learning or other CPU-related functions.

It should be noted, therefore, that if a packet arrives destined to a MAC address associated with a level 3 interface for a selected VLAN, the ingress looks for a match at an IP/IPX destination subnet level. If there is no IP/IPX destination subnet match, the packet is forwarded to CPU 52 for appropriate routing. However, if an IP/IPX match is made, then the MAC address of the next hop and the egress port number is identified and the packet is appropriately forwarded.

In other words, the ingress of the EPIC 20 or GPIC 30 is configured with respect to ARL/L3 tables 21 so that when a packet enters ingress submodule 14, the ingress can identify whether or not the packet is an IP packet or an IPX packet. IP packets are directed to an IP/ARL lookup, and IPX configured packets are directed to an IPX/ARL lookup. If an L3 match is found during the L3 lookup, then the longest prefix match lookups are abandoned.

IP Multicast

SOC 10 is configured to support IP multicast applications, such as multimedia conferencing, realtime video, realtime audio, etc. These applications are heavily dependent upon point-to-multipoint delivery of service. Some IP protocols which had been deployed to support IP multicast include DVMRP (distance vector multicast routing protocol), Protocol-Independent Multicast-Dense Mode, Protocol Independent Multicast-Sparse Mode, Multicast Extensions to SOSPF, etc. In order to implement such configurations, each EPIC, GPIC, and possibly other modules on SOC 10 are provided with an IP multicast table. The ingress logic 14 and egress logic 16 are configured to handle IP multicast packets.

Each multicast table may be, for example, 256 entries deep, and 128 bits wide. The table is sorted, and the search key is the source IP address plus multicast IP address. FIG. 24 illustrates the format for an IP multicast table. The fields for such a table can be as follows:

Source IP Address—32 bits long—Source IP Address is a 32 bit IP Address of the Source Station.

Multicast IP Address—32 bits long—Multicast IP Address—is a 32 bit IP Multicast Address. Note: IP Multicast Address is a Class D Address; the first three MSBs are all 1's.

L3 Port Bitmap—31 bits long—L3 Port Bitmap identifies all the ports on which the packet should go out.

L3 Module Bitmap—32 bits long—L3 Module Bitmap identifies all the Modules on which the packet should go out.

Source Port—6 bits long—Source Port is the port, which is nearest to the Source Station. In other words, the Source Station, identified by the Source IP address; sends multicast traffic through this port.

TTL Threshold—5 bits long—If the incoming Multicast Packet has TTL below the TTL Threshold then the packet is dropped.

Figure 25:
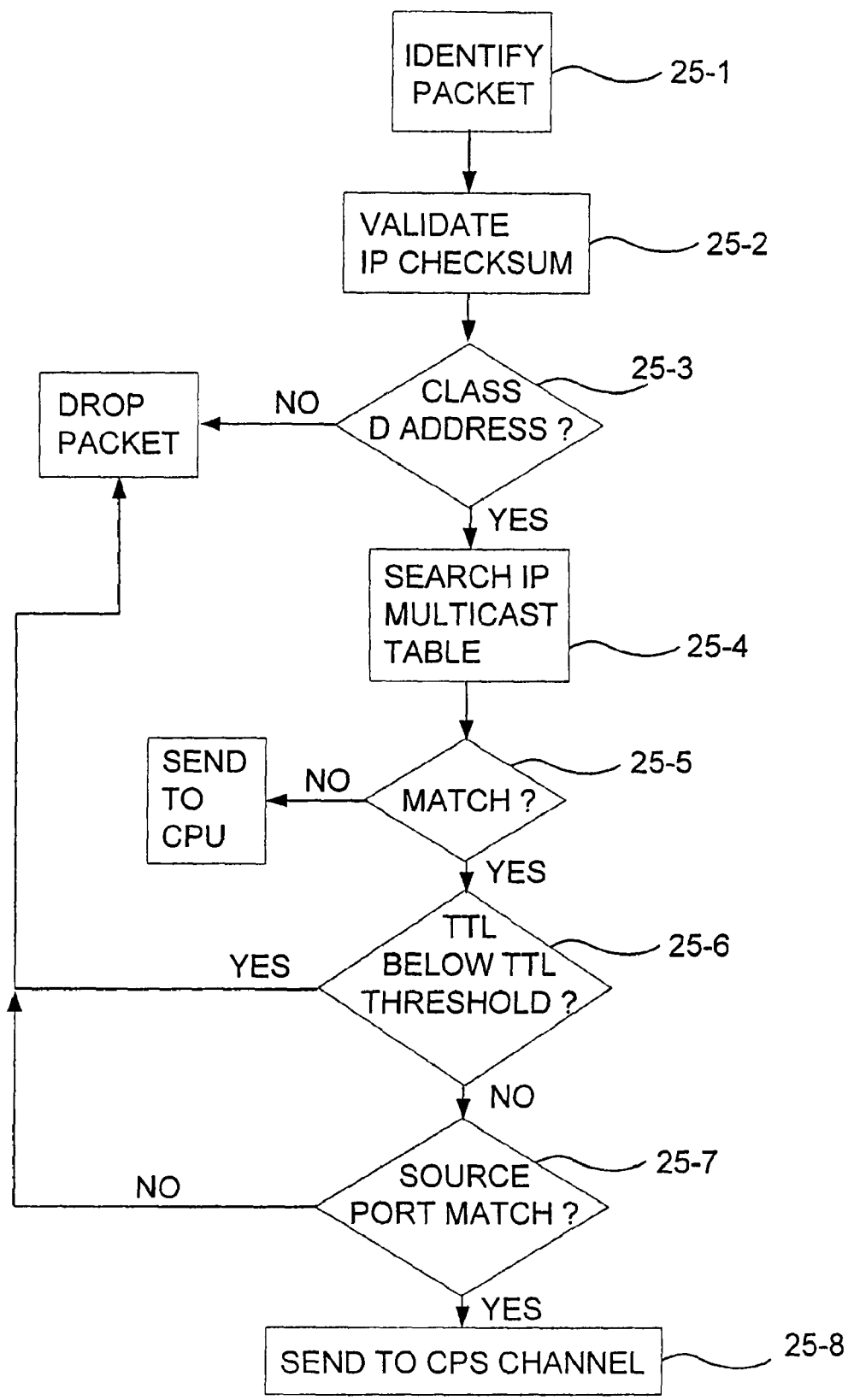
FIG. 25 is a flow chart illustrating handling of an IP multicast packet.

FIG. 25 illustrates a flowchart for how ingress 14 of an SOC 20 would handle an IP multicast packet coming in to a port thereupon. In step 25-1, the packet is examined to determine whether or not it is an IP multicast packet without any option fields. If there are option fields, the packet is sent to CPU 52 for further handling. In step 25-2, the IP checksum is validated. In step 25-3, the destination IP address is examined to see if it is a class D address. A class D address is one where the first three most significant bits are all set to 1. If the destination IP address is not a class D address, then the packet is dropped. If so, the IP multicast table is searched at step 25-4 with the key as the source IP address+the destination IP address. If the entry is not found, then the packet is sent to CPU 52. If a match is found at step 25-5, the TTL (time-to-live) is checked against the TTL threshold value in the IP multicast entry at step 25-6. If the TTL value is less than the threshold value, the packet is dropped. If the TTL value is not below the threshold, then the source port is compared to the source port in the entry at step 25-7. If there is not a match, then the packet is dropped. If there is a match, the packet is appropriately sent over C channel 81 of CPS channel 80 at step 25-8, with appropriate P channel messages locked therewith. The packet is sent with the L2 port bitmap and L2 untagged bitmap obtained as a result of the L2 search, and the L3 port bitmap as a result of the IP multicast search. Additionally, the IP multicast bit is set in the P channel message, indicating that the packet is an IP multicast packet and that the egress, upon receipt of the packet, must modify the IP header appropriately. From CPS channel 80, therefore, the packet is sent to the appropriate buffer pool until it is obtained by the appropriate egress port.

When the appropriate egress port obtains the packet from memory, if the egress port is part of the L3 port bitmap, then the packet must be modified. The TTL value must be decremented, and the IP header checksum is recalculated. The source MAC address in the packet must be changed to be the L3 interface MAC address. If the L3 interface associated with the port is tagged, then the VLAN tag header must be replaced with the VLAN Id configured for the interface.

It should be noted that if there are multiple L3 interfaces associated with a port, then multiple packets need to be sent to that port. The CPU bit in the IP multicast entry can be set in this situation, so that the packet is given to the CPU along with the port bitmap upon which the packet has already been sent. The CPU can then send multiple copies of the packet on the port with the multiple L3 interfaces. This configuration, therefore, minimizes complexity and maximizes speed on SOC 10, but provides the added flexibility of CPU involvement when necessary.

Another important field of the filter mask format is the counter index or the counter field. This five bit field is incremented every time there is a match with the particular filter mask. The counter data is used for a number of different purposes, including finding packet counts for particular types of packets, packet statistics, etc. If a network administrator is seeking, for example, to monitor a particular rate of a particular packet type or a packet frequency, or packets from a particular IP address, the counter can be configured to be so incremented. Thresholds can be set by the network administrator such that predetermined action can be taken after a selected threshold is exceeded. Such action may include changing the priority of the packets, dropping further packets, and other action.

Notable aspects of the rules table format for SOC 10 are fields of action bits which enable priority or precedence to be changed from TOS-to-COS, and vice versa. Referring to the rules table illustrated in FIG. 23, and the filter mask format, bits 8 and 9 of the action bits field enable this conversion. If bit 8 is set, then the 802.1p priority field is picked up from the TOS precedence field in the IP header. If bit 9 is set, then the value of the TOS precedence field is picked up from the 802.1p priority field. This provides the significant advantage of providing valuable information which can be read by both routers and switches. Switches operating at layer 2 will look at the 802.1p priority field, while routers, operating at layer 3, will look at the TOS precedence field. When a packet enters the switch domain from the router domain in a LAN, the precedence can be appropriately moved by SOC 10 from the 802.1p priority field to the TOS precedence field, and vice versa.

HOL Blocking

SOC 10 incorporates some unique data flow characteristics, in order maximize efficiency and switching speed. In network communications, a concept known as head-of-line or HOL blocking occurs when a port is attempting to send a packet to a congested port, and immediately behind that packet is another packet which is intended to be sent to an un-congested port. The congestion at the destination port of the first packet would result in delay of the transfer of the second packet to the un-congested port. Each EPIC 20, GPIC 30, and IPIC 90 within SOC 10 includes a unique HOL blocking mechanism in order to maximize throughput and minimize the negative effects that a single congested port would have on traffic going to un-congested ports. For example, if a port on a GPIC 30, with a data rate of, for example, 1000 megabits per second is attempting to send data to another port 24a on EPIC 20a, port 24a would immediately be congested. Each port on each IPIC 90, GPIC 30, and EPIC 20 is programmed by CPU 52 to have a high watermark and a low watermark per port per class of service (COS), with respect to buffer space within CBP 50. The fact that the head of line blocking mechanism enables per port per COS head of line blocking prevention enables a more efficient data flow than that which is known in the art. When the output queue for a particular port hits the preprogrammed high watermark within the allocated buffer in CBP 50, MMU 70 sends, on S channel 83, a COS queue status notification to the appropriate ingress module of the appropriate GPIC 30 or EPIC 20. When the message is received, the active port register corresponding to the COS indicated in the message is updated. If the port bit for that particular port is set to zero, then the ingress is configured to drop all packets going to that port. Although the dropped packets will have a negative effect on communication to the congested port, the dropping of the packets destined for congested ports enables packets going to un-congested ports to be expeditiously forwarded thereto. When the output queue goes below the preprogrammed low watermark, MMU 70 sends a COS queue status notification message on the sideband channel with the bit set for the port. When the ingress gets this message, the bit corresponding to the port in the active port register for the module is set so that the packet can be sent to the appropriate output queue. By waiting until the output queue goes below the low watermark before re-activating the port, a hysteresis is built into the system to prevent constant activation and deactivation of the port based upon the forwarding of only one packet, or a small number of packets. It should be noted that every module has an active port register. As an example, each COS per port may have four registers for storing the high watermark and the low watermark; these registers can store data in terms of number of cells on the output queue, or in terms of number of packets on the output queue. In the case of a unicast message, the packet is merely dropped; in the case of multicast or broadcast messages, the message is dropped with respect to congested ports, but forwarded to uncongested ports. MMU 70 includes all logic required to implement this mechanism to prevent HOL blocking, with respect to budgeting of cells and packets. MMU 70 includes an HOL blocking marker register to implement the mechanism based upon cells. If the local cell count plus the global cell count for a particular egress port exceeds the HOL blocking marker register value, then MMU 70 sends the HOL status notification message. MMU 70 can also implement an early HOL notification, through the use of a bit in the MMU configuration register which is referred to as a Use Advanced Warning Bit. If this bit is set, the MMU 70 sends the HOL notification message if the local cell count plus the global cell count plus one hundred twenty-one (121) is greater than the value in the HOL blocking marker register. 121 is the number of cells in a jumbo frame.

With respect to the hysteresis discussed above, it should be noted that MMU 70 implements both a spatial and a temporal hysteresis. When the local cell count plus global cell count value goes below the value in the HOL blocking marker register, then a poaching timer value from an MMU configuration register is used to load into a counter. The counter is decremented every 32 clock cycles. When the counter reaches 0, MMU 70 sends the HOL status message with the new port bit map. The bit corresponding to the egress port is reset to 0, to indicate that there is no more HOL blocking on the egress port. In order to carry on HOL blocking prevention based upon packets, a skid mark value is defined in the MMU configuration register. If the number of transaction queue entries plus the skid mark value is greater than the maximum transaction queue size per COS, then MMU 70 sends the COS queue status message on the S channel. Once the ingress port receives this message, the ingress port will stop sending packets for this particular port and COS combination. Depending upon the configuration and the packet length received for the egress port, either the head of line blocking for the cell high watermark or the head of line blocking for the packet high watermark may be reached first. This configuration, therefore, works to prevent either a small series of very large packets or a large series of very small packets from creating HOL blocking problems.

The low watermark discussed previously with respect to CBP admission logic is for the purpose of ensuring that, independent of traffic conditions, each port will have appropriate buffer space allocated in the CBP to prevent port starvation, and ensure that each port will be able to communicate with every other port to the extent that the network can support such communication.

Referring again to MMU 70, CBM 71 is configured to maximize availability of address pointers associated with incoming packets from a free address pool. CBM 71, as noted previously, stores the first cell pointer until incoming packet 112 is received and assembled either in CBP 50, or GBP 60. If the purge flag of the corresponding P channel message is set, CBM 71 purges the incoming data packet 112, and therefore makes the address pointers GPID/CPID associated with the incoming packet to be available. When the purge flag is set, therefore, CBM 71 essentially flushes or purges the packet from processing of SOC 10, thereby preventing subsequent communication with the associated egress manager 76 associated with the purged packet. CBM 71 is also configured to communicate with egress managers 76 to delete aged and congested packets. Aged and congested packets are directed to CBM 71 based upon the associated starting address pointer, and the reclaim unit within CBM 71 frees the pointers associated with the packets to be deleted; this is, essentially, accomplished by modifying the free address pool to reflect this change. The memory budget value is updated by decrementing the current value of the associated memory by the number of data cells which are purged.

To summarize, resolved packets are placed on C channel 81 by ingress submodule 14 as discussed with respect to FIG. 8. CBM 71 interfaces with the CPS channel, and every time there is a cell/packet addressed to an egress port, CBM 71 assigns cell pointers, and manages the linked list. A plurality of concurrent reassembly engines are provided, with one reassembly engine for each egress manager 76, and tracks the frame status. Once a plurality of cells representing a packet is fully written into CBP 50, CBM 71 sends out CPIDs to the respective egress managers, as discussed above. The CPIDs point to the first cell of the packet in the CBP; packet flow is then controlled by egress managers 76 to transaction MACs 140 once the CPID/GPID assignment is completed by CBM 71. The budget register (not shown) of the respective egress manager 76 is appropriately decremented by the number of cells associated with the egress, after the complete packet is written into the CBP 50. EGM 76 writes the appropriate PIDs into its transaction FIFO. Since there are multiple classes of service (COSs), then the egress manager 76 writes the PIDs into the selected transaction FIFO corresponding to the selected COS. As will be discussed below with respect to FIG. 13, each egress manager 76 has its own scheduler interfacing to the transaction pool or transaction FIFO on one side, and the packet pool or packet FIFO on the other side. The transaction FIFO includes all PIDs, and the packet pool or packet FIFO includes only CPIDs. The packet FIFO interfaces to the transaction FIFO, and initiates transmission based upon requests from the transmission MAC. Once transmission is started, data is read from CBP 50 one cell at a time, based upon transaction FIFO requests.

As noted previously, there is one egress manager for each port of every EPIC 20 and GPIC 30, and is associated with egress sub-module 18. It should be noted that IPIC 90 manages egress in a different manner than EPICs 20 and GPICs 30, since IPIC 90 fetches packets from NBP 92.

FIG. 13 illustrates a block diagram of an egress manager 76 communicating with R channel 77. For each data packet 112 received by an ingress submodule 14 of an EPIC 20 of SOC 10, CBM 71 assigns a Pointer Identification (PID); if the packet 112 is admitted to CBP 50, the CBM 71 assigns a CPID, and if the packet 112 is admitted to GBP 60, the CBM 71 assigns a GPID number. At this time, CBM 71 notifies the corresponding egress manager 76 which will handle the packet 112, and passes the PID to the corresponding egress manager 76 through R channel 77. In the case of a unicast packet, only one egress manager 76 would receive the PID. However, if the incoming packet were a multicast or broadcast packet, each egress manager 76 to which the packet is directed will receive the PID. For this reason, a multicast or broadcast packet needs only to be stored once in the appropriate memory, be it either CBP 50 or GBP 60.

Each egress manager 76 includes an R channel interface unit (RCIF) 131, a transaction FIFO 132, a COS manager 133, a scheduler 134, an accelerated packet flush unit (APF) 135, a memory read unit (MRU) 136, a time stamp check unit (TCU) 137, and an untag unit 138. MRU 136 communicates with CBP Memory Controller (CMC) 79, which is connected to CBP 50. Scheduler 134 is connected to a packet FIFO 139. RCIF 131 handles all messages between CBM 71 and egress manager 76. When a packet 112 is received and stored in SOC 10, CBM 71 passes the packet information to RCIF 131 of the associated egress manager 76. The packet information will include an indication of whether or not the packet is stored in CBP 50 or GBP 70, the size of the packet, and the PID. RCIF 131 then passes the received packet information to transaction FIFO 132. Transaction FIFO 132 is a fixed depth FIFO with eight COS priority queues, and is arranged as a matrix with a number of rows and columns. Each column of transaction FIFO 132 represents a class of service (COS), and the total number of rows equals the number of transactions allowed for any one class of service. COS manager 133 works in conjunction with scheduler 134 in order to provide policy based quality of service (QOS), based upon Ethernet standards. As data packets arrive in one or more of the COS priority queues of transaction FIFO 132, scheduler 134 directs a selected packet pointer from one of the priority queues to the packet FIFO 139. The selection of the packet pointer is based upon a queue scheduling algorithm, which is programmed by a user through CPU 52, within COS manager 133. An example of a COS issue is video, which requires greater bandwidth than text documents. A data packet 112 of video information may therefore be passed to packet FIFO 139 ahead of a packet associated with a text document. The COS manager 133 would therefore direct scheduler 134 to select the packet pointer associated with the packet of video data.

The COS manager 133 can also be programmed using a strict priority based scheduling method, or a weighted priority based scheduling method of selecting the next packet pointer in transaction FIFO 132. Utilizing a strict priority based scheduling method, each of the eight COS priority queues are provided with a priority with respect to each other COS queue. Any packets residing in the highest priority COS queue are extracted from transaction FIFO 132 for transmission. On the other hand, utilizing a weighted priority based scheduling scheme, each COS priority queue is provided with a programmable bandwidth. After assigning the queue priority of each COS queue, each COS priority queue is given a minimum and a maximum bandwidth. The minimum and maximum bandwidth values are user programmable. Once the higher priority queues achieve their minimum bandwidth value, COS manager 133 allocates any remaining bandwidth based upon any occurrence of exceeding the maximum bandwidth for any one priority queue. This configuration guarantees that a maximum bandwidth will be achieved by the high priority queues, while the lower priority queues are provided with a lower bandwidth.

The programmable nature of the COS manager enables the scheduling algorithm to be modified based upon a user's specific needs. For example, COS manager 133 can consider a maximum packet delay value which must be met by a transaction FIFO queue. In other words, COS manager 133 can require that a packet 112 is not delayed in transmission by the maximum packet delay value; this ensures that the data flow of high speed data such as audio, video, and other real time data is continuously and smoothly transmitted.

If the requested packet is located in CBP 50, the CPID is passed from transaction FIFO 132 to packet FIFO 139. If the requested packet is located in GBP 60, the scheduler initiates a fetch of the packet from GBP 60 to CBP 50; packet FIFO 139 only utilizes valid CPID information, and does not utilize GPID information. The packet FIFO 139 only communicates with the CBP and not the GBP. When the egress seeks to retrieve a packet, the packet can only be retrieved from the CBP; for this reason, if the requested packet is located in the GBP 50, the scheduler fetches the packet so that the egress can properly retrieve the packet from the CBP.

APF 135 monitors the status of packet FIFO 139. After packet FIFO 139 is full for a specified time period, APF 135 flushes out the packet FIFO. The CBM reclaim unit is provided with the packet pointers stored in packet FIFO 139 by APF 135, and the reclaim unit is instructed by APF 135 to release the packet pointers as part of the free address pool. APF 135 also disables the ingress port 21 associated with the egress manager 76.

While packet FIFO 139 receives the packet pointers from scheduler 134, MRU 136 extracts the packet pointers for dispatch to the proper egress port. After MRU 136 receives the packet pointer, it passes the packet pointer information to CMC 79, which retrieves each data cell from CBP 50. MRU 136 passes the first data cell 112a, incorporating cell header information, to TCU 137 and untag unit 138. TCU 137 determines whether the packet has aged by comparing the time stamps stored within data cell 112a and the current time. If the storage time is greater than a programmable discard time, then packet 112 is discarded as an aged packet. Additionally, if there is a pending request to untag the data cell 112a, untag unit 138 will remove the tag header prior to dispatching the packet. Tag headers are defined in IEEE Standard 802.1q.

Egress manager 76, through MRU 136, interfaces with transmission FIFO 140, which is a transmission FIFO for an appropriate media access controller (MAC); media access controllers are known in the Ethernet art. MRU 136 prefetches the data packet 112 from the appropriate memory, and sends the packet to transmission FIFO 140, flagging the beginning and the ending of the packet. If necessary, transmission FIFO 140 will pad the packet so that the packet is 64 bytes in length.

As shown in FIG. 9, packet 112 is sliced or segmented into a plurality of 64 byte data cells for handling within SOC 10. The segmentation of packets into cells simplifies handling thereof, and improves granularity, as well as making it simpler to adapt SOC 10 to cell-based protocols such as ATM. However, before the cells are transmitted out of SOC 10, they must be reassembled into packet format for proper communication in accordance with the appropriate communication protocol. A cell reassembly engine (not shown) is incorporated within each egress of SOC 10 to reassemble the sliced cells 112a and 112b into an appropriately processed and massaged packet for further communication.

Figure 16:
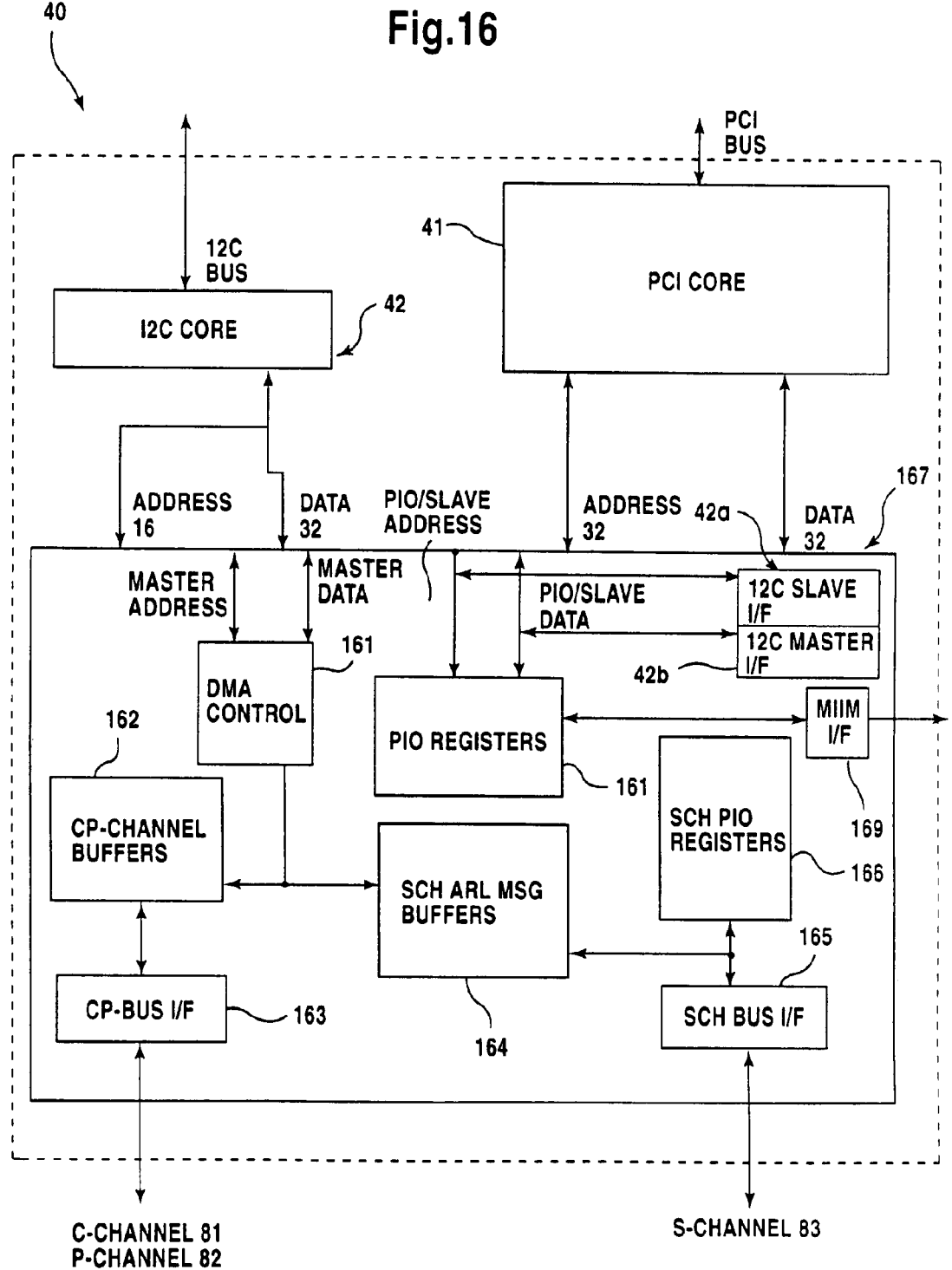
FIG. 16 is a block diagram of the elements of CMIC 40.

FIG. 16 is a block diagram showing some of the elements of CPU interface or CMIC 40. In a preferred embodiment, CMIC 40 provides a 32 bit 66 MHZ PCI interface, as well as an I2C interface between SOC 10 and external CPU 52. PCI communication is controlled by PCI core 41, and I2C communication is performed by I2C core 42, through CMIC bus 167. As shown in the figure, many CMIC 40 elements communicate with each other through CMIC bus 167. The PCI interface is typically used for configuration and programming of SOC 10 elements such as rules tables, filter masks, packet handling, etc., as well as moving data to and from the CPU or other PCI uplink. The PCI interface is suitable for high end systems wherein CPU 52 is a powerful CPU and running a sufficient protocol stack as required to support layer two and layer three switching functions. The I2C interface is suitable for low end systems, where CPU 52 is primarily used for initialization. Low end systems would seldom change the configuration of SOC 10 after the switch is up and running.

CPU 52 is treated by SOC 10 as any other port. Therefore, CMIC 40 must provide necessary port functions much like other port functions defined above. CMIC 40 supports all S channel commands and messages, thereby enabling CPU 52 to access the entire packet memory and register set; this also enables CPU 52 to issue insert and delete entries into ARL/L3 tables, issue initialize CFAP/SFAP commands, read/write memory commands and ACKs, read/write register command and ACKs, etc. Internal to SOC 10, CMIC 40 interfaces to C channel 81, P channel 82, and S channel 83, and is capable of acting as an S channel master as well as S channel slave. To this end, CPU 52 must read or write 32-bit D words. For ARL table insertion and deletion, CMIC 40 supports buffering of four insert/delete messages which can be polled or interrupt driven. ARL messages can also be placed directly into CPU memory through a DMA access using an ARL DMA controller 161. DMA controller 161 can interrupt CPU 52 after transfer of any ARL message, or when all the requested ARL packets have been placed into CPU memory.

Communication between CMIC 40 and C channel 81/P channel 82 is performed through the use of CP-channel buffers 162 for buffering C and P channel messages, and CP bus interface 163. S channel ARL message buffers 164 and S channel bus interface 165 enable communication with S channel 83. As noted previously, PIO (Programmed Input/Output) registers are used, as illustrated by SCH PIO registers 166 and PIO registers 168, to access the S channel, as well as to program other control, status, address, and data registers. PIO registers 168 communicate with CMIC bus 167 through I2C slave interface 42a and I2C master interface 42b. DMA controller 161 enables chaining, in memory, thereby allowing CPU 52 to transfer multiple packets of data without continuous CPU intervention. Each DMA channel can therefore be programmed to perform a read or write DMA operation. Specific descriptor formats may be selected as appropriate to execute a desired DMA function according to application rules. For receiving cells from MMU 70 for transfer to memory, if appropriate, CMIC 40 acts as an egress port, and follows egress protocol as discussed previously. For transferring cells to MMU 70, CMIC 40 acts as an ingress port, and follows ingress protocol as discussed previously. CMIC 40 checks for active ports, COS queue availability and other ingress functions, as well as supporting the HOL blocking mechanism discussed above. CMIC 40 supports single and burst PIO operations; however, burst should be limited to S channel buffers and ARL insert/delete message buffers. Referring once again to I2C slave interface 42a, the CMIC 40 is configured to have an I2C slave address so that an external I2C master can access registers of CMIC 40. CMIC 40 can inversely operate as an I2C master, and therefore, access other I2C slaves. It should be noted that CMIC 40 can also support MIIM through MIIM interface 169. MIIM support is defined by IEEE Standard 802.3u, and will not be further discussed herein. Similarly, other operational aspects of CMIC 40 are outside of the scope of this invention.

A unique and advantageous aspect of SOC 10 is the ability of doing concurrent lookups with respect to layer two (ARL), layer three, and filtering. When an incoming packet comes in to an ingress submodule 14 of either an EPIC 20 or a GPIC 30, as discussed previously, the module is capable of concurrently performing an address lookup to determine if the destination address is within a same VLAN as a source address; if the VLAN IDs are the same, layer 2 or ARL lookup should be sufficient to properly switch the packet in a store and forward configuration. If the VLAN IDs are different, then layer three switching must occur based upon appropriate identification of the destination address, and switching to an appropriate port to get to the VLAN of the destination address. Layer three switching, therefore, must be performed in order to cross VLAN boundaries. Once SOC 10 determines that L3 switching is necessary, SOC 10 identifies the MAC address of a destination router, based upon the L3 lookup. L3 lookup is determined based upon a reading in the beginning portion of the packet of whether or not the L3 bit is set. If the L3 bit is set, then L3 lookup will be necessary in order to identify appropriate routing instructions. If the lookup is unsuccessful, a request is sent to CPU 52 and CPU 52 takes appropriate steps to identify appropriate routing for the packet. Once the CPU has obtained the appropriate routing information, the information is stored in the L3 lookup table, and for the next packet, the lookup will be successful and the packet will be switched in the store and forward configuration.

Interconnectability

Figure 26:
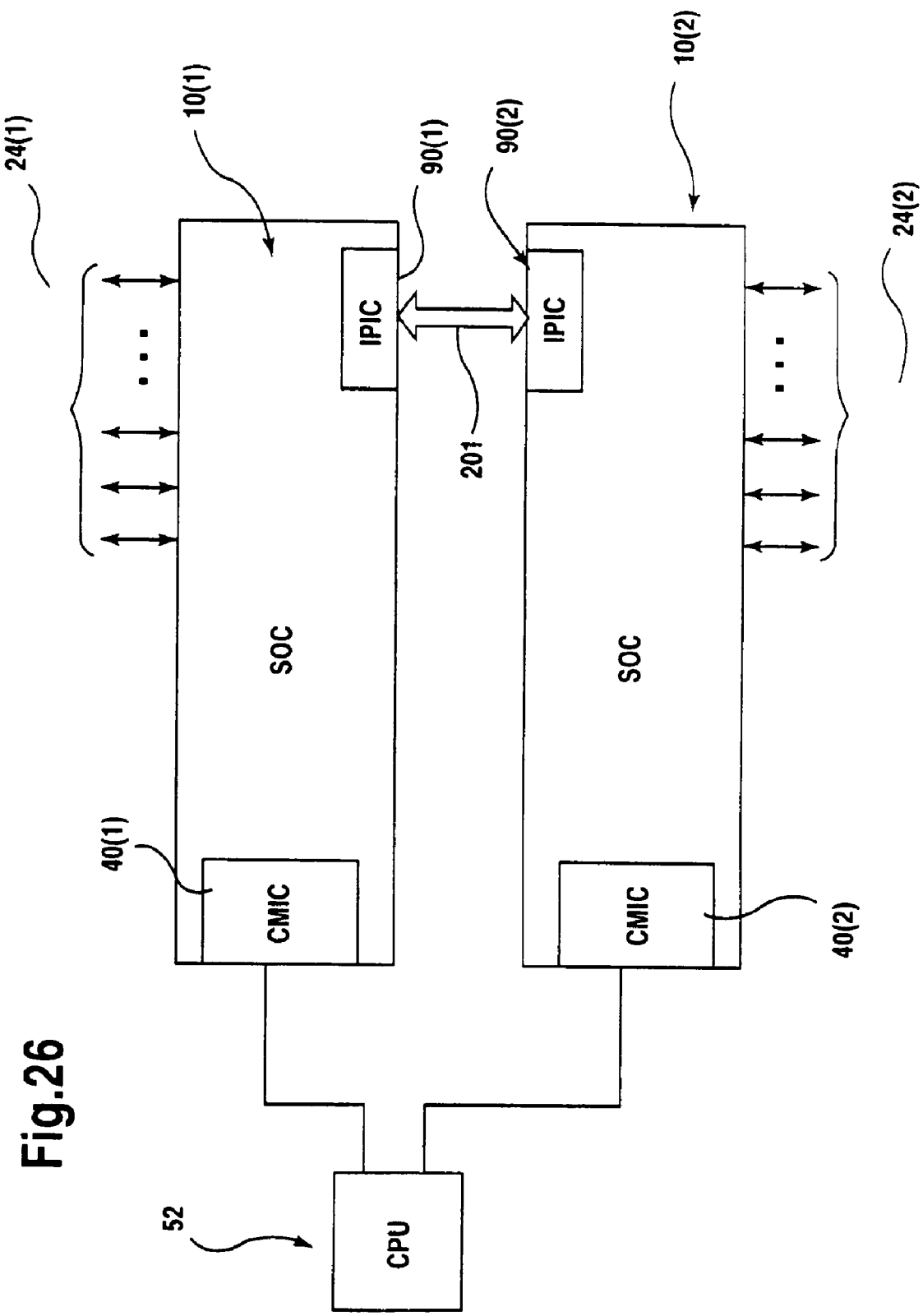
FIG. 26 illustrates an embodiment of stacked SOC switches 10.

IPIC 90 of SOC 10 provides significant functionality with respect to interconnectability. In particular, IPIC 90 enables a significant amount of flexibility and performance regarding stacking of a plurality of SOC 10 chips. Using the high performance interface discussed previously, two SOC 10 chips or switch modules can be connected through their respective IPIC 90 modules. Such a configuration would enable the SOC switch modules to also commonly connect their CMIC 40 modules to a common CPU 52. In such a configuration where each SOC 10 includes three EPIC 20 modules each having eight fast Ethernet ports and two GPIC modules each having one gigabit Ethernet port, the resulting configuration would have 48 fast Ethernet ports (24 ports per SOC 10) and four gigabit Ethernet ports. FIG. 26 illustrates such a configuration, wherein CPU 52 is commonly connected to CMIC 40(1) and CMIC 40(2), of SOC 10(1), and SOC 10(2), respectively. IPIC 90(1) and IPIC 90(2) are interconnected through high performance interface 261. The fast Ethernet and gigabit ports are collectively shown as ports 24(1) and 24(2), respectively.

Figure 27A:
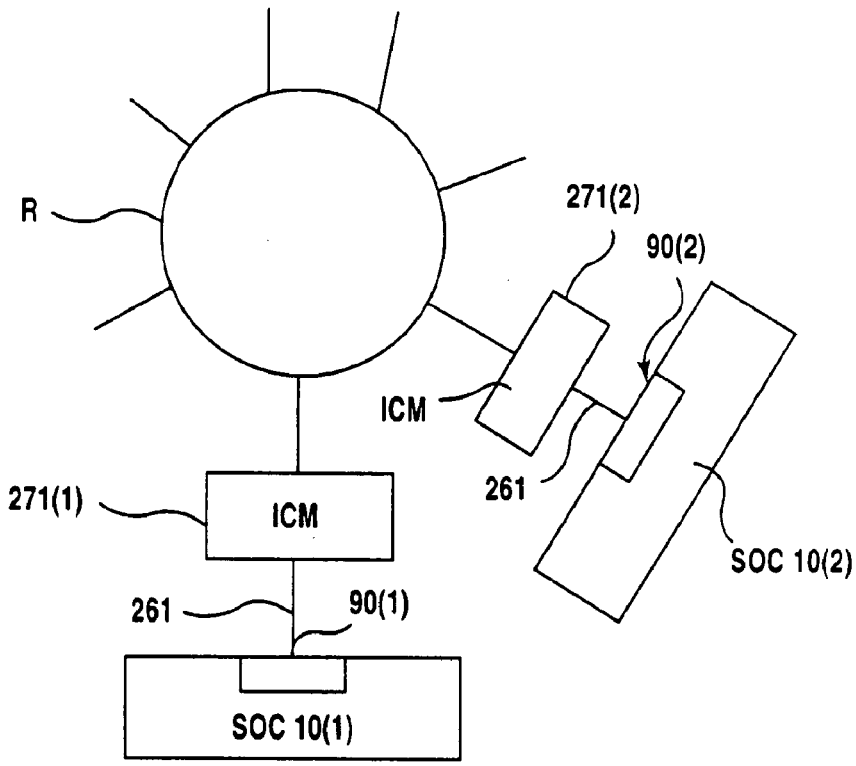
FIGS. 27A and 27B illustrate alternate embodiments of stacked SOC 10 configurations.
Figure 27B:
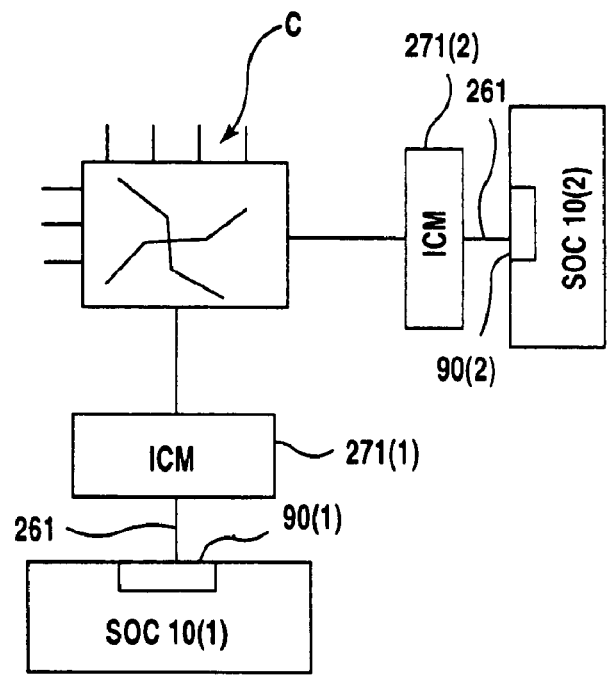

Other stacking configurations include what is referred to as a ring configuration, wherein a plurality of SOC 10 chips are connected to a ring through an ICM (interconnect module) interface. Yet a third stacking connection is a plurality of SOC 10 chips or switches being connected through an ICM to a crossbar switch, in such a way that the crossbar switch interconnects the plurality of SOC 10 switches. These additional two stacking configurations are illustrated in FIGS. 27A and 27B, respectively. FIG. 27A illustrates SOC 10(1) connected to ring R through ICM 271(1), as well as SOC 10(2) being connected to ring R through ICM 271(2). This configuration enables a plurality of SOC 10 switches to be stacked. In one embodiment, as many as 32 SOC 10 switches could be attached to ring R. FIG. 27B illustrates a crossbar configuration, wherein SOC 10(1) and 10(2) are connected to crossbar C through ICM 271(1) and 271(2), respectively. This configuration, like that of FIG. 27A, enables a significant number of SOC switches to be stacked. The crossbar C is a known device which acts as a matrix or grid which is capable of interconnecting a plurality of ports through activation of an appropriate matrix connection.

As illustrated in FIGS. 1 and 2, IPIC 90 of each SOC 10 interfaces on one side to CPS channel 80, and on the other side to the high performance interconnect link 261. Packets coming in to IPIC 90 which are destined for other ports on SOC 10 are handled essentially as packets coming in to any other port on SOC 10. However, due to the existence of the module header for stacked communications, IPIC 90 includes a shallow memory to store the incoming packet. The module header is stripped on the ingress; the module header, as noted previously, is appended to the packet by the source module. IPIC 90 then performs address resolution. Address resolution is different for packets coming into IPIC 90 than for packets coming into EPICs 20 or GPICs 30, and will be discussed below. After address resolution, the destination or egress ports are determined, and the port bitmap is constructed. The packet is then sliced into cells, and the cells are sent to MMU 70 over CPS channel 80. The cell data is sent over C channel 81, and the appropriate messages, including the module header, is sent over P channel 82.

For the case where cells come in to other ports on SOC 10 and are destined for the high performance interface 261, the cells are placed on CPS channel 80 from the appropriate ingress port, where they are then received by IPIC 90. The cells are interleaved back into packets in NBP 92, and are not, therefore, handled by MMU 70. The NBP, as noted previously, is on-chip memory, which is dedicated for use only by the IPIC 90. The NBP can be separately segregated memory, or reserved memory space within CBP 50. The module header information, appended to the packet by the source, is received by IPIC 90 from the P channel. The module header includes the module ID bitmap, COS, mirrored-to port/switch information, trunk group ID, etc. The constructed packet is then sent onto the high performance interface 261. It should be noted that interface 261 is typically being sought to be accessed by two devices. For example, FIG. 26 illustrates a configuration wherein IPIC 90(1) and IPIC 90(2) must arbitrate for access to interface 261. In the configurations of FIGS. 27A and 27B, the appropriate IPIC 90 must arbitrate for access to interface 261 with the appropriate ICM 271. The arbiter is illustrated, for example, in FIG. 28 as arbiter 93.

Figure 28:
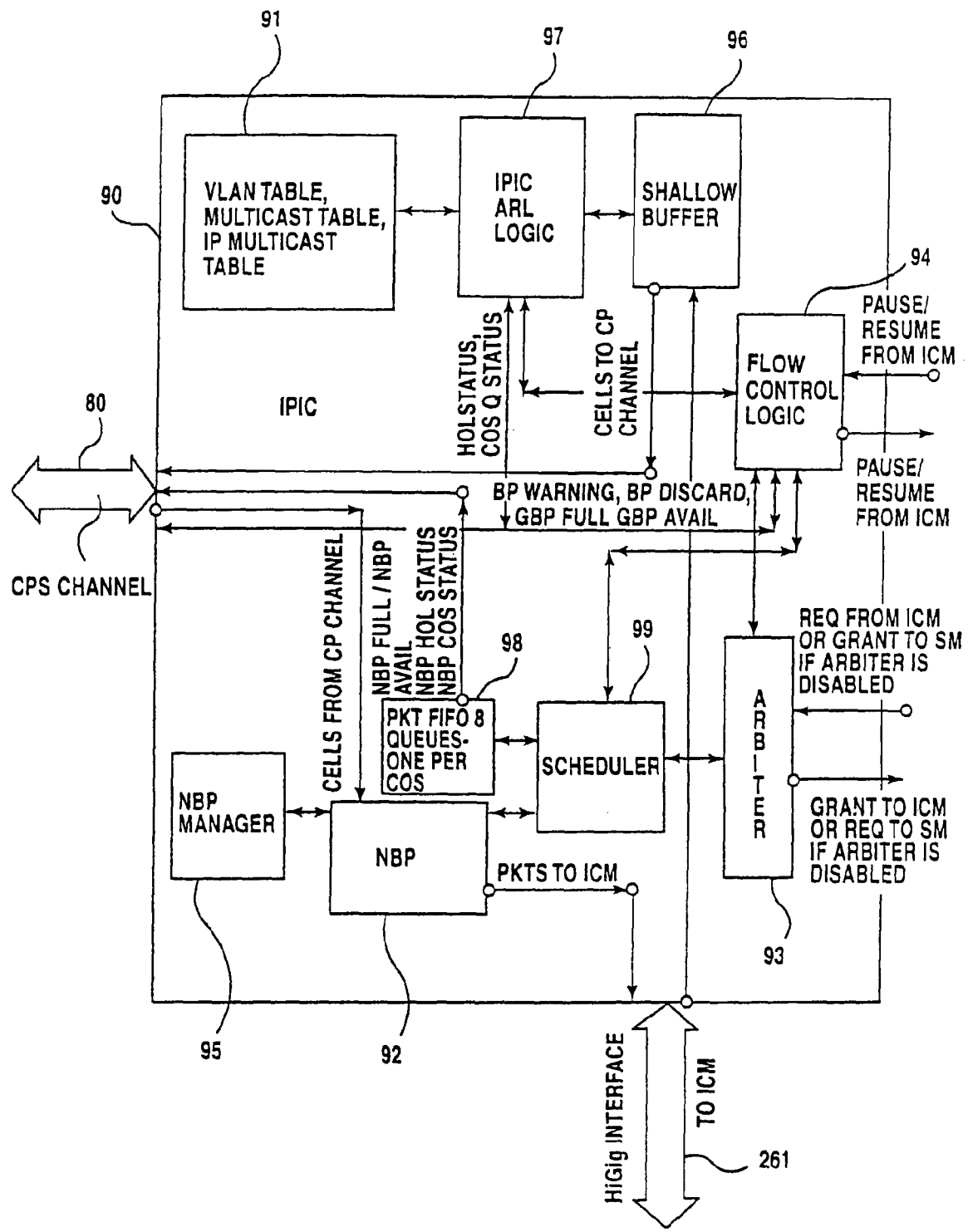
FIG. 28 is a detailed view of the functional modules of IPIC 90.

FIG. 28 is an overview of the functional elements of an IPIC 90. In addition to tables 91, NBP 92, and arbiter 93, IPIC 90 includes flow control logic 94 which is connected to ICM 271 in order to enable IPIC 90 to keep up with traffic coming from the ICM. Using a pause/resume signal, the ICM and flow control logic 94 exchange pause and resume signals to appropriately control the flow. In situations where the ICM memory is full, the ICM asserts the pause/resume signal as a pause, to tell IPIC 90 not to send any more packets to ICM 271. In situations where IPIC 90 is receiving packets from ICM 271, if the IPIC can no longer receive packets, for example, if the CBP 50 and GBP 60 are full, then the IPIC will assert the pause/resume signal as a pause signal to the ICM. As soon as it is appropriate to resume flow in either direction, the signal is de-asserted to resume traffic flow. It should be noted that if the ICM is full, yet packets continue to arrive at IPIC 90 from CPS channel 80, then the HOL blocking prevention mechanism discussed previously will be activated.

Referring again to the function of arbiter 93, arbiter 93 controls the bandwidth on high performance interface 261. Using a configuration register, priority for packet handling can be switched from the IPIC 90 to the ICM 271, and vice versa, after predetermined periods. In situations where there is no ICM and wherein IPIC 90(1) is communicating with IPIC 90(2), then a master CPU which controls functions in a stacked configuration would control arbiter 93 and flow control logic 94. The master CPU would be one CPU 52 of a plurality of CPUs 52 associated with a plurality of SOC switches 10.

It should also be noted that NBP manager 95 controls memory management for NBP 92. NBP manager 95, therefore, performs many functions which are specific to IPIC 90, but which are similar to the function of MMU 70 with respect to SOC 10. Some notable differences exist, however, in that there is no CBP/GBP admission logic, since NBP 92 is treated as one memory buffer pool.

Packets which are arriving at IPIC 90 from high performance interface 261 will always have a module header thereupon. The module header is inserted by the source SOC when the packet is sent, which will be referred to as the source switch. The fields of the module header are as follows:

C Bit—1 bit long—Control Bit—The Control Bit identifies whether this is a Control frame or a data frame. This bit is set to 1 for Control Frame and is set to 0 for data frame.

Opcodes—3 bits long—Opcodes are used to identify the Packet Type. Value 00—identifies that the packet is a unicast Packet and the Egress Port is uniquely identified by Module Id Bitmap (only one bit will be set in this field) and the Egress Port Number. Value 01—identifies that the Packet is a Broadcast or Destination Lookup Failure (DLF) and is destined to Multiple Ports on the same Module or multiple ports on different Modules. The Egress port is not a valid field in this scenario. Value 02—identifies that the Packet is a Multicast Packet and is addressed to multiple ports. Value 03—identifies that the Packet is a IP Multicast Packet and is addressed to Multiple Ports.

TGID—3 bits long—TGID Bits—TGID identifies the Trunk Group Identifier of the Source Port. This field is valid only if T bit is set. T—1 bit long—T Bit—If this bit is set then TGID is a valid field.

MT Module Id Bitmap—5 bits long—MT Module Id is "Mirrored-To" Module Id. This field is used to send the packet to a "mirrored-to" port, which is located on a remote Module. This field is valid only if M bit is set.

M Bit—1 bit long—M Bit—If this bit is set then MT Module Id is a valid field.

Data Len—14 bits long—Data Len—Identifies the data length of the packet.

CoS—3 bits long—CoS Bits—Identifies the CoS Priority for this Frame.

CRM—1 bit long—Cos Re-Map Bit—This bit is used to re-map the CoS based on the Source Module Id+Source Port Number. This feature is useful for the Modules that does not have CoS Mapping Capability.

Module Id Bitmap—32 bits long—Module Id Bitmap—bitmap of all the modules, which are supposed to receive the Packet.

Egress Port—6 bits long—Egress Port—is the Port Number on the remote Module, which is suppose to receive this packet.

New IP checksum—16 bits long—New IP Checksum—This is mainly used for the IP Multicast Switched Traffic.

PFM—2 bits long—Port Filtering Mode Bits—These are the port Filtering Mode for the Source Port.

Source Port—6 bits long—Source Port is the Source Port Number of the Packet.

CRC Bits—2 bits long—CRC bits—These are the same CRC bits from P channel message that are copied in here. Value 0x01—is append CRC bit. If it is set then the egress port should append the CRC to the packet. Value 0x02—is Regenerate CRC bit. If this bit is set then the egress port should regenerate CRC. Value 0x00—no change in CRC. Value 0x03—unused.

Source Mod Id—5 bits long—Source Mod Id—is the Source Module Id of the Packet.

Data—N bit long—Data Bytes—The data bytes may contain the CRC. One has to examine the CRC bits to find out if data contains CRC. If CRC bits is set to append CRC then data does not contain CRC bytes. If CRC bits is set to regenerate CRC then data contains CRC bytes but it's not a valid CRC. If CRC value is 00 then data contains CRC and is a valid CRC.

CRC Of (Module Header+Data)—4 bits long—CRC value including the data and the Module Header.

In order for IPIC 90 to properly perform address resolution, numerous tables must be included within tables 91. These tables include an 802.1q VLAN table, a multicast table, an IP multicast table, a trunk group bitmap table, a priority to COS queue mapping table, and a port to COS mapping table. The ARL logic for IPIC 90 differs from the previously-discussed EPIC/GPIC address resolution logic for numerous reasons. First of all, the packet starts after the 16 bytes of module header, the module header contains information regarding whether the packet is a control frame or a data frame. Control frames are always sent to the CPU after the module header is stripped. The module header contains the trunk group identifier information, the mirrored-to port information, egress port information, etc. Any time the C bit is set in the module header, the packet is sent to the CPU. The T bit and the TGID bits are provided in the module header in order to support trunking across the modules. Mirroring is controlled by the MT module ID bitmap and the M bit. The CRM, or COS-Remap bit, enables re-mapping of the COS based upon the source module ID and the source port number. This remapping can become necessary in situations where switches are supplied from different vendors.

Figure 29:
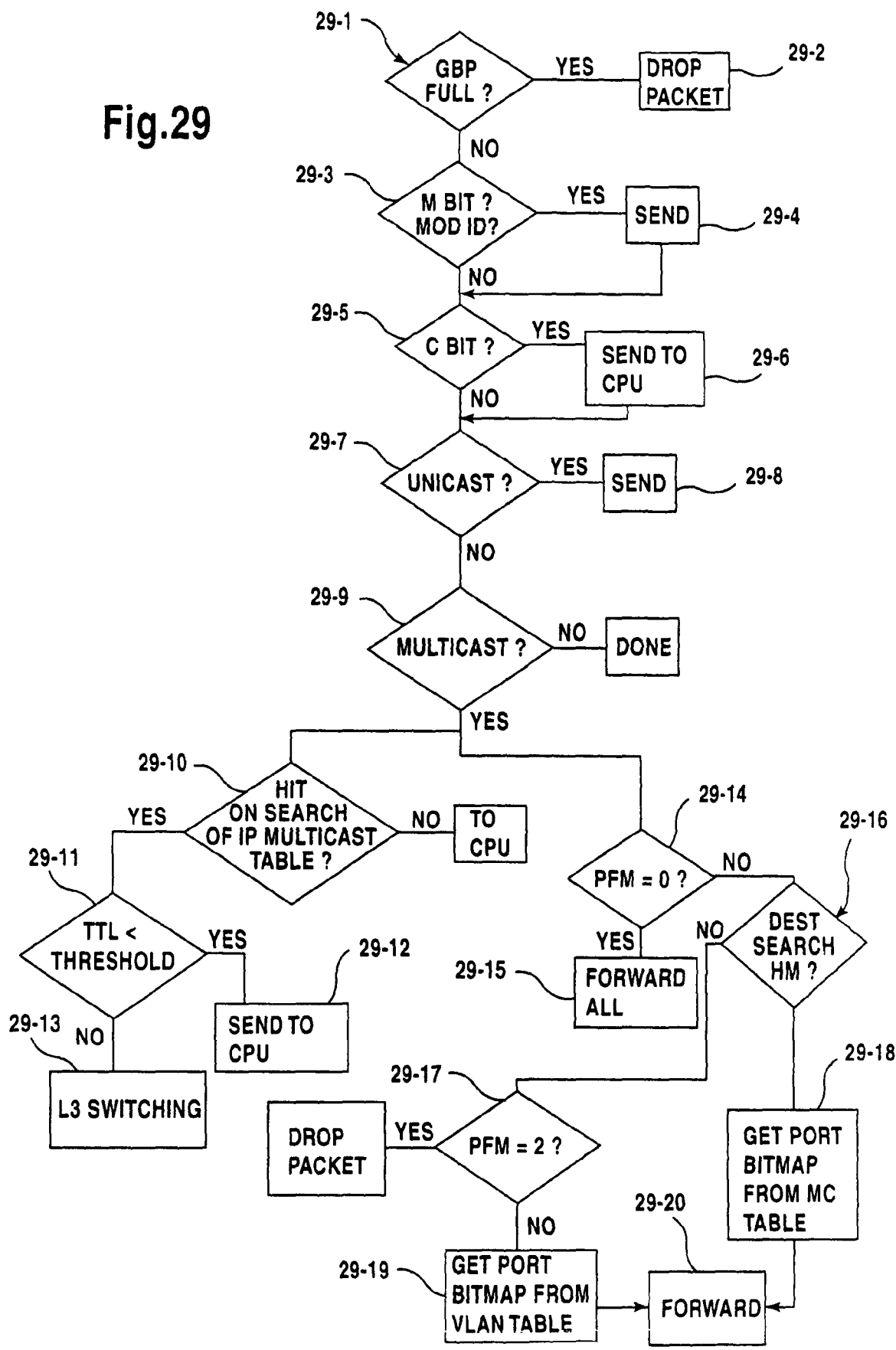
FIG. 29 illustrates packet handling for packets coming in to the high performance interface of IPIC 90.

Referring to FIG. 29, address resolution for a packet coming in to IPIC 90 from high performance interface 271 is as follows:

The packet coming in to IPIC 90 from interface 261 is stored in shallow buffer 96, where the IPIC ARL logic 97 determines whether GBP 60 is full at step 29-1. If so, the packet is dropped at step 29-2. If not, logic 97 determines at step 29-3 if the M bit is set in the module header, and also checks to see if the module ID for the "mirrored-to" module is equal to the present module ID. If so, the mirrored-to port is obtained from the port mirroring register for SOC 10, and a bit is set in the port bitmap which corresponds to the mirrored-to port, and the packet is sent to the mirrored-to port at step 29-4. If the answer is NO regarding the M bit, and after the sending of the packet to the mirrored-to port, ARL logic 97 then checks to see if the C bit is set at step 29-5. If so, the packet is sent to the CPU at step 29-6. The CPU bit in the port bitmap is set so as to ensure the packet is sent to the CPU. If the C bit is not set, or after the packet has been appropriately sent to the CPU, ARL logic 97 then determines whether or not the packet is a unicast packet at step 29-7. If so, the packet is appropriately placed on CPS channel 80 with the bit corresponding to the egress port appropriately set in the port bitmap. If the T bit is set, then the final bitmap is set based upon the trunk group bitmap and the TGID. If the CRM bit is set, then the port-to-COS mapping table is searched to get the appropriate COS queue. Otherwise, the COS is picked up from the module header. This sending step occurs at step 29-8. If it is determined that the packet is not a unicast packet, then at step 29-9, IPIC ARL logic 97 determines whether the packet is a multicast packet. This determination is made, as mentioned previously, by examining the destination address to see if it is a class D address. Class D classification is one wherein the first three MSBs of the multicast IP address are set to one. If it is determined that it is in fact an IP multicast packet, then two separate and concurrent processes are performed. At step 29-10, a search is performed of the IP multicast table, with the source IP address and the destination IP address as the search key. If there is a match or a hit, then the TTL in the IP header is compared to the TTL threshold at step 29-11. If the TTL is below the threshold, the packet is sent to the CPU. If the TTL is not below the TTL threshold, then the L3 port bitmap is obtained, and it is determined whether or not the L3 port bitmap is a member of the active port register corresponding to the COS for the packet. The new IP checksum from the module header is sent on the P-channel, and the packet is sent on the C-channel. This process is illustrated as L3 switching step 29-13. If the search of step 29-10 does not result in a hit, then the packet is sent to the CPU at step 29-12, and bit 8 of the CPU opcodes are set.

The second process which is performed upon determination of whether or not the packet is a multicast packet involves layer 2 switching. SOC 10, therefore, enables hybrid multicast treatment. That is, therefore, the same packet can be switched at layer 2 and layer 3. At step 29-14, after step 29-9 determines that the packet is a multicast packet, therefore, ARL logic 97 examines the PFM (port filtering mode) bits of the module header. If the PFM is set to zero, then the packet is forwarded to all ports. The port bitmap is obtained from the port VLAN table, appropriate exclusion of the IPIC port is made, the trunk port is appropriately identified, the COS is picked up, and the packet is appropriately forwarded at step 29-15. If the PFM is not set to zero, then the multicast table is searched at step 29-16 using the destination key, which is formed of the destination address and the VLAN ID. If there is no hit, then logic 97 once again examines the PFM at step 29-17 for the ingress port. If the PFM is set to 2, the packet is dropped. If the PFM is not set to 2, the port bitmap is obtained from the VLAN table at step 29-19, and the packet is forwarded at step 29-20. If the destination search of step 29-16 is a hit, the port bitmap is obtained from the multicast table at step 29-18, and the packet is forwarded at step 29-20. In step 29-20, appropriate port registers are set based upon T bit, COS, mirroring, etc., and the packet is forwarded to the appropriate destinations. This configuration, as mentioned previously, enables unique hybrid multicast handling, such that a multicast packet can be appropriately switched at layer 2 and/or layer 3.

Referring once again to FIG. 28, access to NBP 92 is controlled by NBP manager 95. Once again, packets coming in to IPIC 90 on high performance interface 261 are first stored in shallow buffer 96, which can be, for example, 3 cells deep. The module header, which is 16 bytes long, and a predetermined number of packeted cells (such as 14 bytes), come in, and the address resolution discussed above is performed by ARL logic 97. The VLAN table, multicast table, and IP multicast tables which form tables 91 are used for the various lookups. No ARL tables are provided because the module header provides information regarding unicast, multicast, etc., through the remote port number. The remote port number is the module ID plus the destination port number. Since the destination port number is available, an ARL table as utilized in EPICs 20 and GPICs 30 is unnecessary. The PFM bits of the module header are defined according to the 802.1p standard, and enable address resolution for multicast as discussed above. Therefore, packets coming in on interface 261 are placed in the shallow buffer for address resolution. After address resolution, the packet is placed on CPS channel 80, where it is sent to MMU 70 for appropriate memory arbitration and storage prior to being picked up by the appropriate egress. Packets coming in destined for IPIC 90 from EPICs 20 and GPICs 30 are sent directly on CPS channel 80 into NBP 92. Through the use of NBP manager 95, IPIC 90 sends appropriate S channel messages regarding the operation of NBP 92, and IPIC 90 in general. Such S channel messages may include NBP full, GBP full, HOL notification, COS notification, etc. NBP manager 95, therefore, manages the FAP (free address pointer pool) for the NBP, handles cell transfer for the NBP, assigns cell pointers to the incoming cells, assembles cells into packets, writing of packet pointers into packet fifo 98, and monitors the activities of scheduler 99. Scheduler 99 works in conjunction with NBP 92, packet fifo 98, and arbiter 93 in order to schedule the next packet for transmission on high performance interface 261. Scheduler 99 evaluates COS queues in packet fifo 98, and if packets exist in the packet fifo, then the packet is picked up for transmission on high performance interface 261. Transmission is controlled by the status of the grant signal with respect to the ICM, as controlled by arbiter 93. As shown in FIG. 28, scheduler 93 must appropriately handle eight COS queues in packet fifo 98. Appropriate COS management determines which will be the next packet picked up from the priority queues. COS management is performed by a COS manager (not shown) which is a part of scheduler 99. Scheduler 99, therefore, can be programmed to enable different types of queue scheduling algorithms, as necessary. Two examples of scheduling algorithms which can be used are 1) strict priority based scheduling, and 2) weighted priority based scheduling. Both of these algorithms and associated registers can be programmed as appropriate.

When scheduler 99 picks up a packet for transmission, the packet pointer is obtained from packet fifo 98, and the first cell of the packet is pointed to by the packet pointer. The cell header contains all of the required information, and the module header is a valid field therein. The data to be transmitted is available from the 16th byte, and the module header field is not considered a valid field. Appropriate linking of the cells is ensured to make sure that complete packets are reassembled and sent on high performance interface 261.

IPIC Flow Control

Although flow control logic 94 is configured to use pause frames as a flow control mechanism for IPIC 90, as discussed above, flow control logic 94 is also configured to use alternative flow control mechanisms to control traffic between respective SOC 10's on high-speed interface 261. In particular, flow control logic 94 is configured to execute a flow control logic that is essentially a modified version of the Ten Bit Interface (TBI) protocol discussed in the IEEE 802.3z flow control specification. This modified flow control logic/methodology is designed to be an easily implemented fault tolerant form of interface flow control.

The basis for the modified flow control logic is a pair of messages, such as ordered sets as defined in the TBI specification in the form of a packet request (REQ) code group and a packet acknowledge (ACK) code group. The REQ ordered set generally signals/indicates that another packet can be sent across interface 261. The ACK ordered set indicates that the recipient of a REQ ordered set has received the request and is acknowledging such. Although the actual transmission of the requested packet may not be undertaken immediately, the ACK signal serves as an acknowledgment that the request for a packet has been received and will be processed according to the controlling logic.

More particularly, the REQ ordered set includes two code groups therein. The first code group in a REQ may be a control code group. The content of the control code group is generally determined by the programming of a register corresponding to the particular REQ ordered set. In the present invention, for example, the corresponding register may be an "r_pkt_req_code" register, and the default value, which is generally established upon reset of the particular chip, may be, for example, /K28.2/, which is a register value of 5CE in hexadecimal. The second code group of a REQ may be, for example, an octet of data having three fields, wherein bits 0-5 of the octet represent an identification field (ID), bit 6 represents an even parity bit for the ID field, and bit 7 represents an even parity bit for the first code group of the REQ ordered set. Therefore, for example, if there is an odd number of logical 1's in the first code group of the REQ ordered set, then bit 7 would be set to a logical 1. As a result of bit 7 and its representation, the concatenation of the first REQ code group and the parity bit will result in an even number of logical 1's in the concatenation, which, as discussed herein, provides an additional layer of security against data corruption during transmission through a parity check.

The ACK ordered set also includes two code groups. The first code group of the ACK ordered set is determined by the programming of a register corresponding to the ACK ordered set. In the present invention, for example, the register used to determine the first code group, which is generally a control code, may be an "r_pkt_req_ack_code" register. Therefore, for example, the value for this register, which is generally established upon reset of the chip, would be /K28.3/, which corresponds to an octet value of 7C in hexadecimal. The second code group of the ACK ordered set is similar to the second code group for the REQ ordered set, as the second code group for the ACK ordered set includes bits 0-5 representing an ID, bit 6 representing an even parity bit for the ID, and bit 7 representing an even parity bit for the first code group of the ACK ordered set.

Therefore, in operation, when a first switch (Switch A) is receiving packets from a second switch (Switch B) which is stacked and/or linked to Switch A through respective IPIC's 90, the above noted ordered sets are used in place of pause frames to more accurately control the flow of data between Switch A and Switch B. More particularly, since Switch A cannot generally receive a continuous string of data from a high speed interconnect, as queues and buffers on the ingress of Switch A are generally limited in size, the ordered sets are used to implement an accurate and fault tolerant flow control methodology, wherein Switch A sends a REQ to Switch B when Switch A is ready to receive a portion of data across the high speed interface. Upon receipt of the REQ by Switch B, an ACK is generally returned to Switch A, indicating that the request for a portion of data to be sent across the high speed link was successfully received. It should be noted that Switches A and B could each be comparable to SOC 10 discussed above, or alternatively, one or more of Switches A and B may be of other switch architectures. Further, the present invention is not limited to implementation with regard to only a two switch implementation, as it is contemplated that the flow control of the present invention is applicable to switch stack/linking arrangements of various quantities. The REQ and ACK signals indicate that a "portion" of data is to be transmitted. Although, the present invention utilizes a packet of data as a "portion,", various sizes and lengths of data are contemplated within the scope of the present method. After sending the ACK, and possibly even simultaneously with the ACK, Switch B sends the requested portion of data across the high speed link to Switch A. Both the REQ and ACK messages may be sent at essentially any time during the transmission of a packet of data between switches, and also may be sent when switches are in an idle state. In particular, the messages may occur within the data being transmitted from one switch to another forming a packet. Further, although not limited to such, the flow control messages generally occur on packet boundaries. However, it is not desirable for the messages to be sent within an SPD or an EPD, known in the art as start packet delimiter and end packet delimiter. Further, it is preferred that the first code group of both the REQ and ACK messages occur as an even code group, as although these ordered sets may also occur during an idle sequence, it is beneficial to the methodology not to disturb the even/odd phase of the idle sequence /I2/, which is typically a /K28.5/ D16.2/sequence. As noted above, both the REQ and ACK messages contain an ID field. This field is used to identify and correlate specific REQ's with corresponding ACK's. Through implementation of a correlation scheme, the present method, although error tolerant, generates accurate flow control across a high speed link, and therefore, reduces queue and/or buffer management requirements at the receiving end. The REQ and ACK ordered sets utilize both the ID and parity bits noted above in order to generate an error free form of handshaking across the high speed interconnection between switches, thereby providing an error tolerant flow control methodology.

However, aside from the generalities of the normal operation of the present invention, data transmission has an inherent possibility of corruption during the transmission stage. Corruption during transmission often results in the receive logic not recognizing the REQ, and therefore, no corresponding ACK is ever returned. Through the use of a watchdog timer, the original transmitting switch, which would be Switch B in the example noted above, resends the REQ to Switch A after a predetermined period of time expires after the sending of a REQ. Therefore, when no corresponding ACK is received for a predetermined waiting time, the original transmitting switch resends the REQ seeking an ACK. This process will generally continue until the original transmitter receives an ACK corresponding to the ID of the REQ, which operates to ensure that no REQ will be lost indefinitely. The watchdog timer noted above may be, for example, based upon a value programmed into a timer register. Using this configuration, the register would measure the return time in ticks, and the default retransmit time could be programmed by the user and initialized upon reset of the chip, for example.

Additionally, is it possible, although unlikely, that a series of code groups may be corrupted to the point where the corrupted code group is received and interpreted as a valid ordered set. In view of the ID and parity fields in combination, this event is extremely unlikely, as there would generally have to be a "double corruption" of both the control portion and the ID portion generating a wholly new data string that happens to correspond to a previously generated valid string. However, the present flow control methodology is configured to address the double corruption situation through testing of the validity of every request and acknowledge signal transmitted, wherein validity is generally defined as the condition where both parity parameters are satisfied and the format of the control group conforms to the standard utilized. Assuming that a REQ was corrupted to the point that a receiving station interpreted the REQ as valid, but with a different ID, then the receiving station would transmit an ACK and the requested packet back to the transmitting station. The returned ACK will not be valid to the original transmitting station, because the ID will be the same as the ID as the corrupted REQ, which is not the same as the ID of the original uncorrupted REQ. Since the original valid REQ that was corrupted during transmission to generate the invalid REQ is unacknowledged, the watchdog timer noted above will time-out and resend the original valid REQ. Thus, two packets will be sent in response to the two REQs; the corrupted REQ and the re-transmitted uncorrupted REQ. As such, a receive FIFO at the receiving station may overrun as a result of receiving the unrequested packet. Therefore, the flow control logic of the present invention is configured to monitor the receive FIFO's, or other relevant FIFO's that may overrun as a result of a double corruption, in order to determine if the respective FIFO's are full. If the FIFO is full, indicating that at least one double corruption has occurred, then the logic may take corrective action, which may include, for example, dropping a packet from the FIFO in order to relieve the full state.

Figure 48:
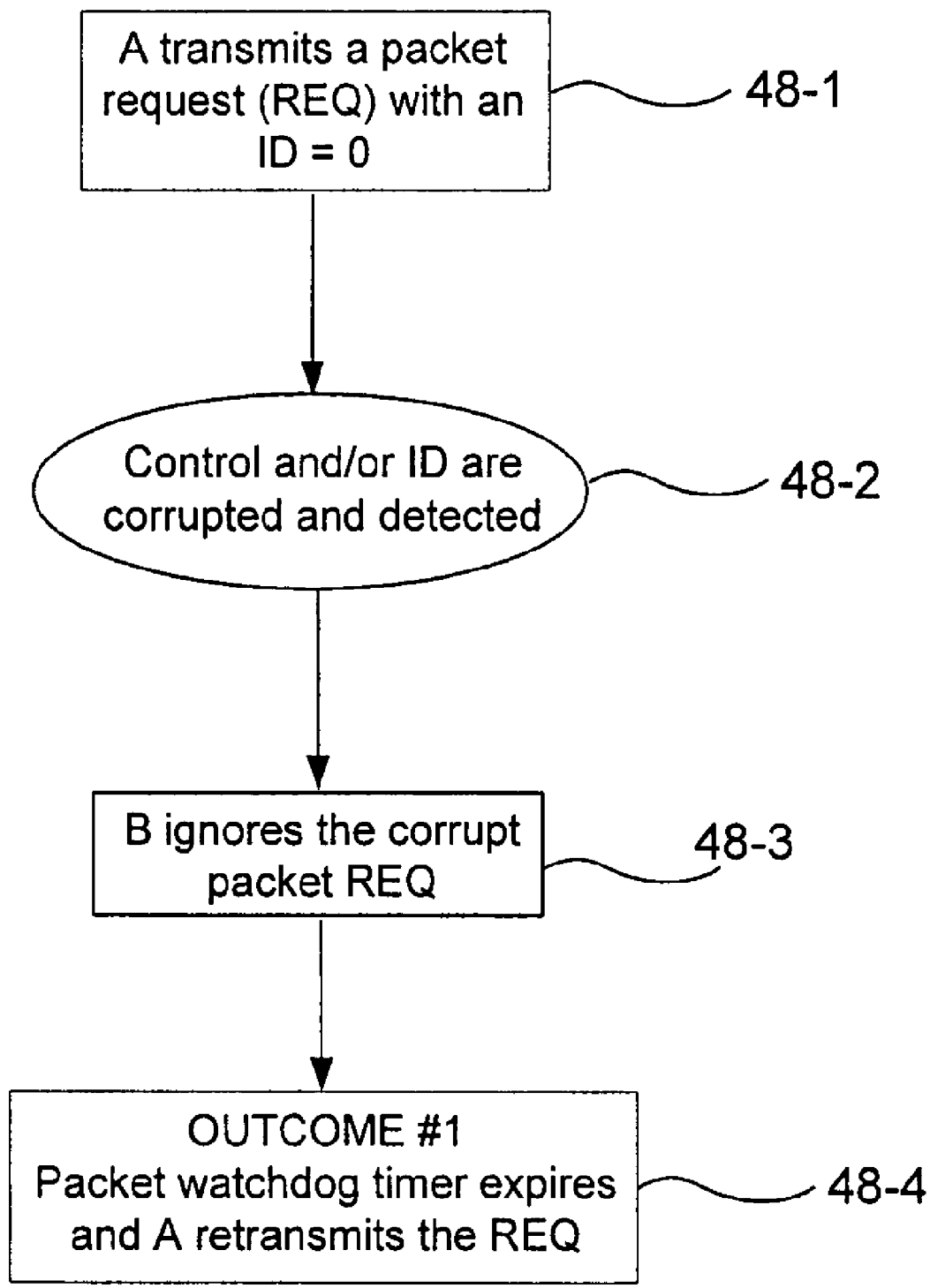
FIG. 48 is a flowchart of a first possible outcome for the high speed interface flow control logic.

In order to detail the methodology of the flow control logic of the present invention, FIG. 48 is presented as an illustration of a first possible outcome for the flow control logic. In this situation, it is assumed at step 48-1 that a transmitter A, which may be a first network switch, for example, transmits a packet REQ having an ID equal to zero to a receiving component B, which, for example, may be a second network switch. In this first possible outcome the transmission of the REQ message results in the control code group and/or the ID bits being corrupted at step 48-2, and further, the corruption is detected by the flow control logic of receiving station B. In this situation, station B ignores the corrupted packet REQ at step 48-3 and continues to step 48-4, which represents the first possible outcome for the first situation. Station B ignores the REQ as a result of the detection of the corruption of the ID on control code group. The latter type of corruption generally renders the REQ unrecognizable as a REQ type formatted message by the receiving station. As such, no ACK signal is returned to the station transmitting the REQ, and therefore, a watchdog timer will expire after a predetermined period of time at step 48-4. When the timer expires, the process of resending the REQ is initiated through returning to step 48-1.

In another situation of the present flow control methodology, which is shown in FIG. 49, station A again transmits a packet REQ to station B at step 49-1, wherein the transmitted REQ has an ID=0. In this situation the control code group of the REQ is corrupted during transmission, and this corruption is not detected by the flow control logic of the receiving station at step 49-2. However, station B nonetheless again ignores the REQ at step 49-3, as the corruption of the control message renders the REQ message unrecognizable by the receiving station. Additionally, if the REQ is received within a packet at step 49-3, then station B will simply assume that the corrupted REQ is a part of the packet due to the unrecognition. Step 49-3 also leads to outcome number 1 shown in FIG. 48, which is shown as step 49-3 in FIG. 49, where the timer expires and the REQ transmission process is reinitiated.

Figure 49:
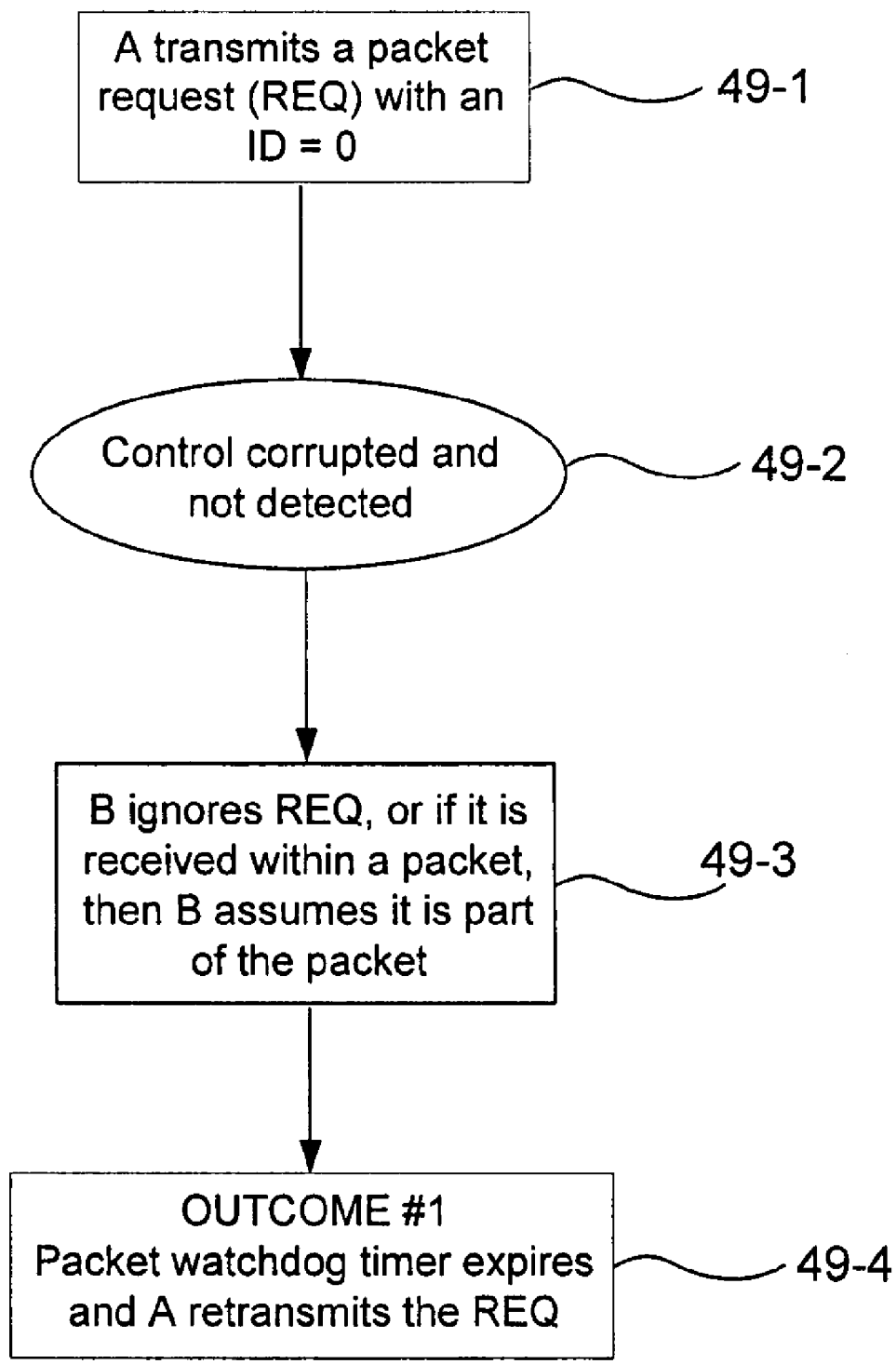
FIG. 49 is a flowchart of a second possible outcome for the high speed interface control logic.

Upon review of the first two flow control situations illustrated in FIGS. 48 and 49, it is apparent that corruption of the control code group of the REQ results in the REQ message being unrecognized by the receiving station. Therefore, as shown in outcome #1, the timer simply expires and the process of sending a REQ is reinitiated. Similarly, if the ID is corrupted and detected by the flow control logic of the receiving station, then the process of generating a REQ is also simply reinitiated to correct the corruption.

Figure 50:
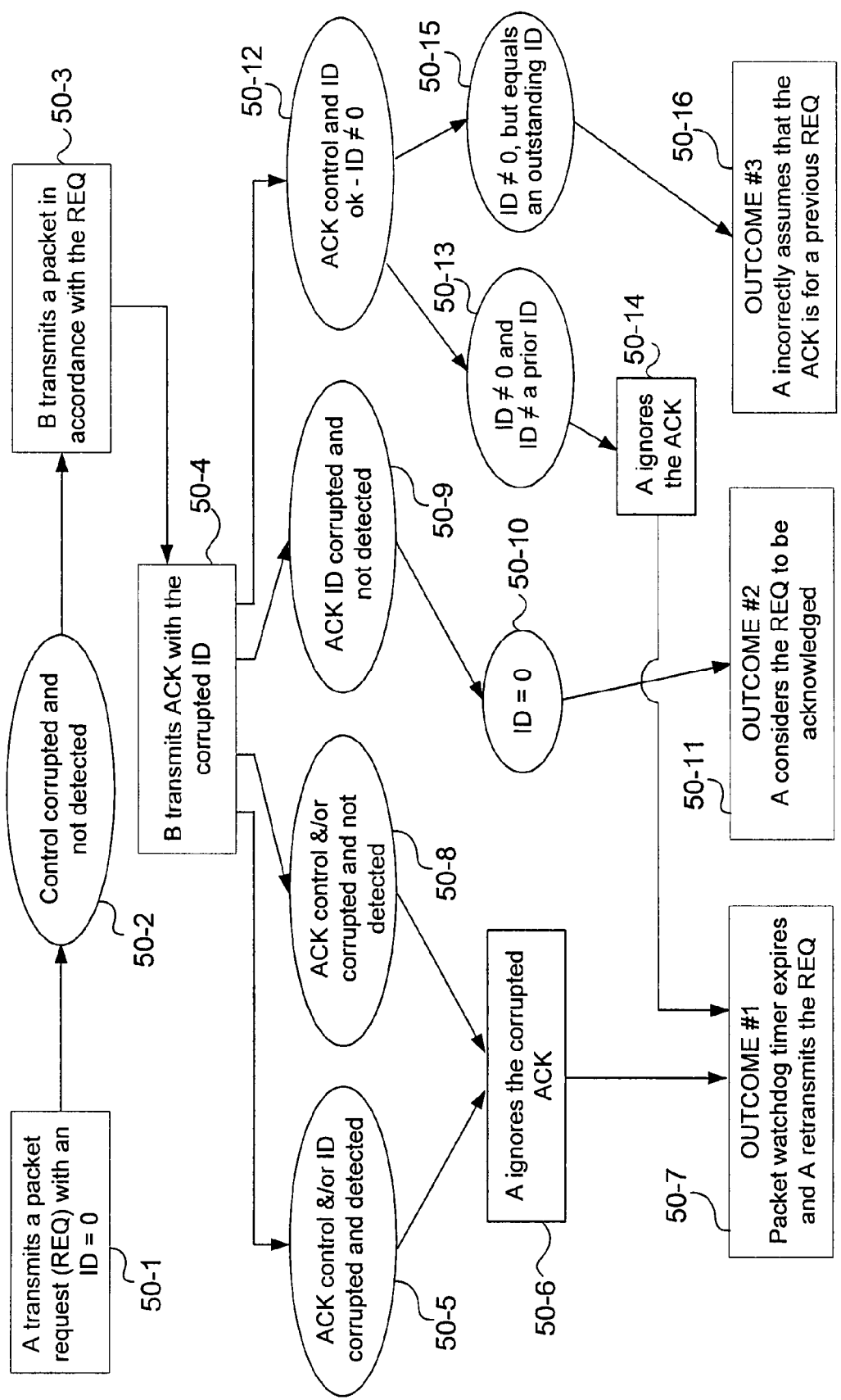
FIG. 50 is a flowchart of a third possible outcome for the high speed interface control logic.

The third possible situation faced by the flow control logic of the present invention is when ID is corrupted during transmission and is not detected by the flow control logic of the receiving station. The present invention's flow control method addresses this situation, as shown in FIG. 50. Step 50-1 again illustrates station A transmitting a packet REQ to station B, wherein the ID associated with the REQ equals zero. The corruption of the ID during transmission, as well as the lack of detection of such by the receiving station, is shown in step 50-2. In this situation, station B transmits a packet from station B to station A in response to the packet REQ at step 50-3. The ACK message associated with the transmission of the requested packet is shown as step 50-4, however, it should be noted that the transmission of the ACK signal may occur before, during, or after the transmission of the requested packet. Upon transmission of the ACK, four possible situations arise. First, the ACK having corrupted data therein may be detected by the receiving station at step 50-5. Thereafter, assuming a detection of the corruption, station A ignores the corrupted ACK at step 50-6 and proceeds to outcome number 1 at step 50-7, wherein the aforementioned timer will expire and restart the REQ generation and transmission process. Second, the corruption of the ACK control group may be undetected, as shown in step 50-8, which again results in station A ignoring the ACK at step 50-6 and the timer expiring at step 50-7. However, if the ACK ID becomes corrupted during transmission and is not detected by the receiving flow control logic, as noted at step 50-9, then the outcome is substantially changed. In particular, if the corrupted ID happens to be corrupted to value initially set for the REQ (zero, as noted in step 50-1) as shown in step 50-10, then the flow control logic proceeds to outcome number 2 at step 50-11. At outcome number 2 station A considers the REQ to be properly acknowledged, as the ACK has a valid control code group and an ID equal to zero, as initially transmitted from A to B at step 50-1. Thus, this situation essentially illustrates the unlikely scenario where an ID is corrupted, and the resulting corruption results in a valid ID that is recognized by the receiving station. The fourth and final scenario of FIG. 50 begins with step 50-12, where the receiving station of the ACK determines that both the control group of the ACK and the ID of the ACK are ok. When this determination is made, in view of the data corruption indicated at step 50-4, two possible situations are generated. First, if the ID≠0, but nevertheless is equal to a valid and currently outstanding ID, as shown at step 50-15, then the flow control logic proceeds to outcome number 3, which is shown as step 50-16. At outcome number 3 station A incorrectly assumes that the ACK corresponds to a previous REQ that is still outstanding with regard to receiving a corresponding ACK. As such, the previous REQ that was apparently never acknowledged must also have been corrupted, which is likely the reason for the lack of a corresponding ACK. In view of this situation, station B will not send out the requested packet for the REQ with the ID=0. However, because an ACK with an ID=0 has not been generated by station B, the watchdog timer for the REQ with ID=0 will eventually cause a new REQ with ID=0 to be transmitted by station A. Thus, eventually a packet will be transmitted by station B in response to the REQ with ID=0. Alternatively, if the ID for the ACK is determined not to equal zero and non-zero value is determined not to be a valid prior ID at step 50-13, then the logic continues to step 50-14, where station A ignores the ACK and returns to outcome number 1 at step 50-7.

Figure 51:
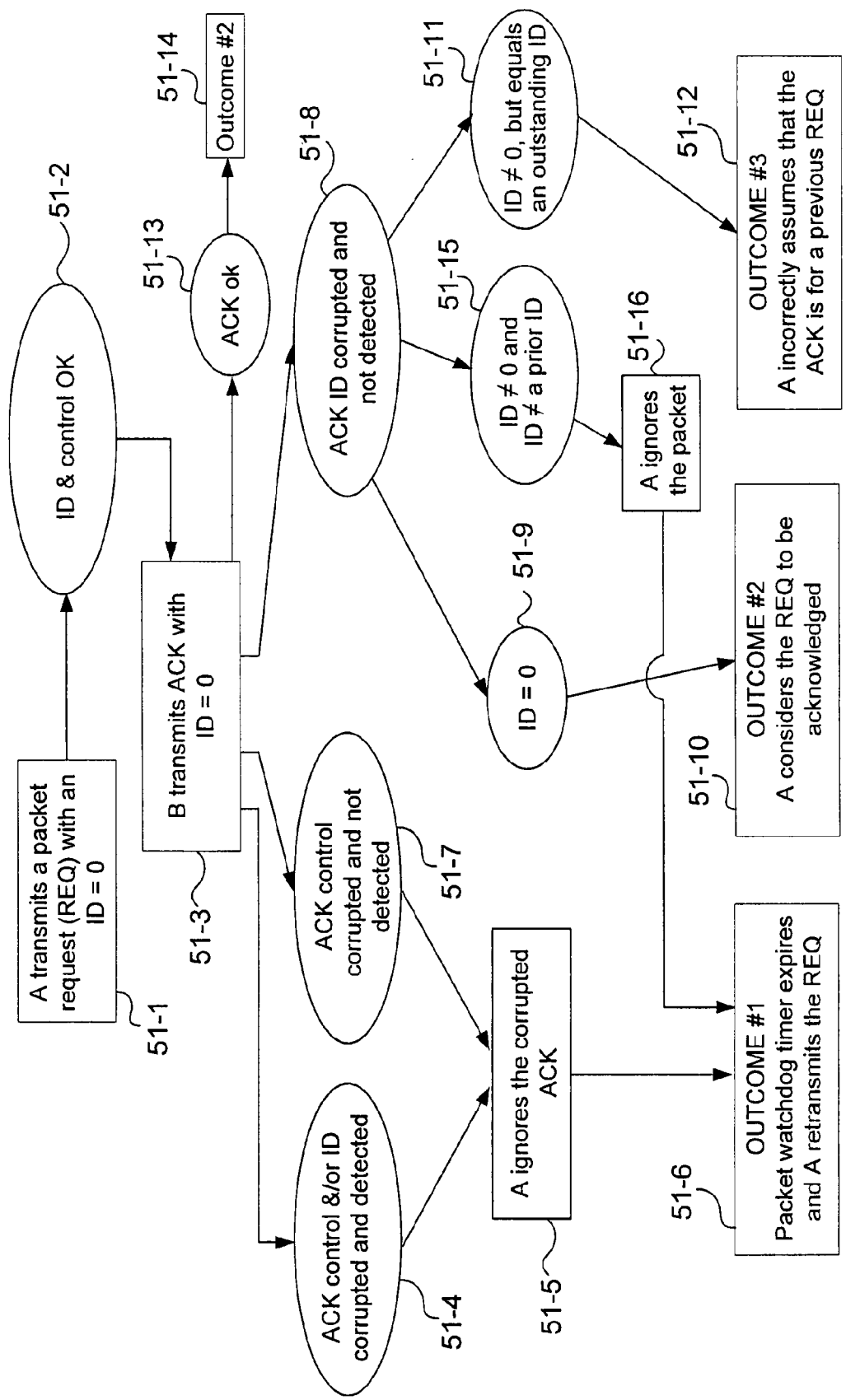
FIG. 51 is a flowchart of a fourth possible outcome for the high speed interface control logic.

The fourth and final situation that must be addressed by the flow control methodology of the present invention is shown in FIG. 51. In this situation, which again begins with station A transmitting a REQ to station B at step 51-1, the ID and control group information is determined to be valid/ok by station B at step 51-2. Thereafter, at step 51-3 station B transmits an ACK with a corresponding ID equaling zero back to station A. At this point there are again four possible outcomes. First, the ACK control group and/or the ID may become corrupted and be detected by the receiving station, as shown in step 51-4. If this situation occurs, then the receiving station, station A in the present exemplary description, ignores the corrupted ACK at step 51-5 and continues to outcome number one at step 51-6. As noted above, outcome number one represents the situation where the watchdog timer expires, and therefore, the process of transmitting a REQ is reinitialized. The second possibility is that the ACK control group may be corrupted during transmission and not be detected by the receiving station, as shown in step 51-7. In this situation the flow control logic of the present invention continues through step 51-5 to reach outcome number one at step 51-6, as discussed above. However, it should be noted that if the corrupted control group is transmitted during a packet and not within idle time, then the packet itself will be corrupted, which will ultimately be detected by the packet size comparator and/or the CRC. The third possible situation is when the ACK ID becomes corrupted during transmission and is not detected by the receiving station, as shown in step 51-8. In this situation there are three possible outcomes. First, the ID may equal zero, as shown in step 51-9, in which case the flow control logic proceeds to outcome number 2 at step 51-10. At outcome number 2, station A considers the REQ to be acknowledged, as the ID was originally equal to zero and was subsequently received as such, despite the corruption. Second, the ID may be determined not to be equal to zero, and further, the ID may be determined to be equal to some outstanding REQ ID, as shown in step 51-11. In this situation the flow control logic continues to step 51-12, which represents outcome number 3. In outcome number 3, station A incorrectly assumes that the ACK received is for a previous REQ that must have also been corrupted during transmission, as no corresponding ACK has been received. The final situation that may occur from step 51-8 is when the ID is determined not to equal zero and not to equal that of a prior outstanding ID, as shown in step 51-15. In this situation the flow control logic of the present invention continues to step 51-16, where station A ignores the ACK and proceeds to outcome number 1 at step 51-6.

Upon review of the compilation of method steps shown in FIGS. 48-51, it is apparent that the flow control methodology of the present invention provides an efficient, easily managed, and fault tolerant method for controlling flow between stations on a high speed interconnect. The fault tolerance results from the ability of the flow control method of the present invention both detect data corruption errors, as well as address the negative affects that result from an undetected data corruption. Corruption errors are detected through a multistage process that involves matching identification parameters, as well as maintaining parity parameters for every REQ and ACK message transmitted. If either the parity of the identification parameters are determined to be corrupted, the flow control method of the present invention is configured to address the situation. Therefore, for example, if only the identification number corresponding to a REQ is corrupted, then both the identification number check as well as the parity comparison will indicate an error. However, if for example both the identification number and a parity bit were corrupted in transmission such that the resulting bit string complied with the parity parameters and evidenced a valid identification, then the method of the present invention is also configured to address this situation, despite the corruption being undetectable through identification and parity checks.

These situations, which are discussed with respect to FIGS. 48-51, each result in one of three outcomes. Outcome number one represents a re-transmission state, wherein the watchdog timer determines that an ACK has not been received within a predetermined period of time, and therefore, resends the REQ. The second outcome represents normal operation mode outcome wherein the REQ is properly acknowledged. However, one flow control path discussed above leads to outcome number 2 despite a data corruption. This is the unlikely result of a double corruption, wherein the original REQ ID is corrupted followed by a corruption of the ACK that essentially operates to "undo" the previous corruption, as discussed with respect to step 51-8, 9, and 10. The third outcome is by far the most unlikely outcome, as this outcome requires a 2+ bit error that does not result in a detection, as the corruption happens to match a previously transmitted REQ that has not yet been acknowledged with a valid ACK. The three outcome situations provided by the present invention address each situation that may generally be encountered by high speed interface control logic operating to transmit data between two stations. In particular, the flow control logic of the present invention provides a solution to all generally occurring flow control characteristics that would be encountered if the two stations represent a pair of network switches that are interconnected through a high speed interconnect, either in a stacking configuration or other known configuration.

The only case that can permanently affect the performance of the HiGig link is the following rather convoluted scenario. A transmits a REQ, with ID=0 for the sake of this example. This REQ is corrupted and thus ignored by B. One of the pairs of code-groups on A's receive channel happens to be corrupted in such a way that A interprets the two code-groups to make up a valid ACK with ID=0. As a result, A considers its original REQ to be acknowledged and stops sending additional REQs. This means that B will never transmit a packet in response to the REQ with ID=0 and effectively A's receive FIFOs have been reduced in depth by one packet permanently (or until the switch is reset).

If this type of error occurred frequently, the receive FIFOs would eventually be reduced and performance would suffer. However, the probability of this type of error is extremely small.

The following analysis illustrates that the likelihood of this type of event is tiny. There are numerous simplifications made, but it illustrates the concept.

In order to produce this type of error the following errors must all occur. Assume that the probability of a single bit error in any transmitted byte is p, and the probability of a 2 bit error is q. For the purposes of this analysis, it is assumed that the probability of a 3+ bit error in a given code group is negligible.

1) A valid REQ must be corrupted (causing B to ignore the REQ) the probability of this occurring is p.

2) Some code group must be corrupted to form a valid ACK ordered set's first code group. There are 268 valid codes. Of these, 5 of the codes can be modified by a single bit error to produce a /K28.2/ (we will use the default ACK codes in this calculation). Each code has 9 bits that could be modified, but only one of the 9 will produce the correct /K28.2/code. Thus, the probability of getting the /K28.2/code from a single-bit error is 5p/(268x9) (assuming a uniform distribution of unmodified codes).

11 codes can result in a /K28.2/with a two-bit error. With a two-bit error, there are 9!/(2!(9−2)!)=36 possible modifications. Only one of these modifications will yield the /K28.2/ code. Thus, the probability of the code group being modified due to a 2 bit error is 11q/(268x36).

In both of these cases, the parity bit of the second code group must happen to be correct so that a parity error is not generated. With random codes, there is a 50% chance of this happening.

The ID field must match that of a valid ID from the original corrupted REQ. Since the ID field is 6 bits in length, there is a 1/64 chance of the IDs matching.

Finally, the parity bit for the ID field must also contain the correct parity. There is a 50% chance of this happening.

Considering all the factors, the probability of this error occurring is (p)((5p/2412)+(11q/9648))(0.5)(0.015625) (0.5). This simplifies to approximately $p^2/123000$.

Assuming, for the sake of argument that $p=10^{-9}$ (a very high error rate), the resulting probability is $80 \times 10^{-27}$. At a rate of 312.5M code-groups/sec, this yields an extremely small likelihood of this particular outcome (once every 120,000 years). For most applications, this is an acceptable risk.

Further, the above-discussed configuration and method steps of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, method steps, and/or logical operations etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon the above discussed embodiments, it would be apparent to those of skilled in the art that certain modifications, variations, and alternative constructions and/or processes/steps would be apparent, while remaining within the spirit and scope of the invention. Therefore, in order to determine the metes and bounds of the invention, reference should be made to the following claims.

The invention claimed is:

1. A method for controlling data flow across a link, the method comprising:
generating a packet request message, wherein the generation includes a generating a non-playload bit string corresponding to a pre-programmed packet request register;
transmitting the packet request message from a first station to a second station;
receiving a request acknowledge message from the second station;
determining if the the request acknowledge message is valid;
wherein the packet request message and the request acknowledge message each include a control bit string, an identification bit string, and at least one parity bit, and
wherein the control bit string identifies whether a frame is a control frame or a data frame and the identification bit string correlates the packet request message with a corresponding request acknowledge message.

2. The method of claim 1, wherein the generated packet request message includes a request control code group and a request data code group.

3. The method of claim 2, wherein generating the packet request message having a request data code group further comprises generating a request data code group bit string having at least one request parity bit and at least one request identification bit.

4. The method of claim 3, wherein generating the packet request message having at least one request parity bit further comprises generating a first request parity bit corresponding to a parity of the request control code group bit string and a second request parity bit corresponding to a parity of the request data code group.

5. The method of claim 1, wherein the request acknowledge message includes an acknowledge control code group and an acknowledge data code group.

6. The method of claim 1, further comprising:
determining if at least one request parity bit for the packet request message is valid; and
determining if a request control code group message is valid.

7. The method of claim 1, further comprising:
comparing an acknowledge identification parameter associated with the request acknowledge message to a stored list of valid acknowledge identification parameters;
determining if an acknowledge control code group associated with the request acknowledge message is valid; and
determining if at least one acknowledge parity parameter is satisfied.

8. The method of claim 7, wherein determining if at least one acknowledge parity parameter is satisfied includes determining if a first acknowledge parity bit associated with the acknowledge identification parameter is satisfied and determining if a second acknowledge parity bit associated with the acknowledge control code group is satisfied.

9. The method of claim 1, further comprising:
determining if a predetermined period of time has expired after transmission of the packet request message; and
resending the packet request message if the predetermined period of time has expired.

10. The method of claim 1, wherein transmitting a packet request message comprises transmitting a packet request ordered set.

11. The method of claim 1, wherein receiving a request acknowledge message comprises receiving a request acknowledge ordered set.

12. A method controlling data transmitted across a high speed link, the method comprising:
generating a packet request message, the generating including generating a request non-payload bit string corresponding to a pre-programmed packet request register;
transmitting the packet request message from a first station to a second station, the packet request message having a first identification number, a first control code group, and a first parity parameter associated therewith;
storing the first identification number associated with the packet request message;
receiving a request acknowledge message from the second station, the request acknowledge message having a second identification number, a second control group, and a second parity parameter associated therewith;
determining if the second control group is valid;
determining if the second identification number matches the first identification number;
determining if the second parity parameter is valid;
wherein the first control group and the second control group are configured to identify whether a frame is a control frame or a data frame, and wherein the first identification number and the second identification number are configured to correlate the packet request message with a corresponding request acknowledge message.

13. The method of claim 12, the method further comprising:
determining if a predetermined period of time has expired after the transmission of the packet request message; and
resending the packet request message if the predetermined period of time has expired.

14. The method of claim 12, wherein transmitting a packet request message further comprises generating the packet request message, wherein the generated packet request message includes a first control group bit string, a first identification number bit string, a first parity bit corresponding to the first control group bit string, and a second parity bit corresponding to the identification number bit string.

15. the method of claim 12, wherein the request acknowledge message includes a second control group bit string, a second identification number bit string, a third parity bit corresponding to the second control group bit string, and a fourth parity bit corresponding to the second identification number bit string.

16. The method of claim 12, further comprising;
comparing the first identification number to the second identification number; and determining if the first identification number is identical to the second identification number.

17. The method of claim 12, wherein the second parity parameter further comprises an acknowledge identification parity bit and an acknowledge control code group parity bit.

18. the method of claim 17, wherein determining if the second parity parameter is valid included determining if the acknowledge identification parity bit is valid and determining if the acknowledge control code group parity bit is valid.

19. The method of claim 18, wherein determining if the acknowledge identification parity bit is valid includes determining if the acknowledge identification parity bit represents the parity of the second identification number.

20. the method of claim 18, wherein determining if the acknowledge control code group parity bit is valid includes determining if the acknowledge control code group parity bit requests the parity of the second control code group.

21. the method of claim 12, wherein transmitting a packet request message comprises transmitting a packet request ordered set.

22. The method of claim 12, wherein receiving a request acknowledge message comprises receiving a request acknowledge ordered set.

23. An apparatus for controlling data flow across a link, the apparatus comprising;
   a transmitting unit configured to transmit a packet request message from a first station to a second station, the packet request message including a first identification number, a first control code group, and a first parity parameter associated therewith;
   a storage unit configured to store the first identification number associated with the packet request message;
   a receiving unit configured to receive a request acknowledge message from the second station, the request acknowledge message having a second identification number, a second control group, and a second parity parameter associated therewith; and
   at least one flow logic unit configured to determine if the second control group is valid, if the second identification number matches the first identification number, and if the second parity parameter is valid;
   wherein the transmitting unit is further configured to generate the packet request message, the packet request message comprising a request non-payload bit string corresponding to a pre-programmed packet request register,
   wherein the first control group and the second control group are configured to identify whether a frame is a control frame or a data frame, and wherein the first identification number and the second identification number are configured to correlate the packet request message with a corresponding request acknowledge message.

24. the apparatus of claim 23, wherein the at least one flow logic unit further comprises:
   a first flow control logic module, the first flow control logic module being positioned within a first network switch; and
   a second flow control logic module, the second flow control logic module being positioned within a second network switch.

25. The apparatus of claim 23, wherein the packet request message comprises a packet request ordered set.

26. The apparatus of claim 23, wherein the request acknowledge message comprises a request acknowledge ordered set.

* * * * *

UNITED STATES PATENT AND TRADEMARK OFFICE
CERTIFICATE OF CORRECTION

| | | |
|---|---|---|
| PATENT NO. | : 8,081,570 B2 | Page 1 of 1 |
| APPLICATION NO. | : 12/470454 | |
| DATED | : December 20, 2011 | |
| INVENTOR(S) | : Michael J. Bowes | |

It is certified that error appears in the above-identified patent and that said Letters Patent is hereby corrected as shown below:

In column 71, line 13, in claim 1, after "includes" delete "a".

In column 71, line 13, in claim 1, delete "non-playload" and insert -- non-payload --, therefor.

In column 71, line 20, in claim 1, after "the" delete "the".

In column 71, line 67, in claim 9, after "after" insert -- the --.

In column 72, line 9, in claim 12, after "method" insert -- for --.

In column 72, line 50, in claim 15, delete "the method" and insert -- The method --, therefor.

In column 72, line 56, in claim 16, delete "comprising;" and insert -- comprising: --, therefor.

In column 72, line 64, in claim 18, delete "the method" and insert -- The method --, therefor.

In column 72, line 65, in claim 18, delete "included" and insert -- includes --, therefor.

In column 73, line 5, in claim 20, delete "the method" and insert -- The method --, therefor.

In column 73, line 8, in claim 20, delete "requests" and insert -- represents --, therefor.

In column 73, line 9, in claim 21, delete "the method" and insert -- The method --, therefor.

In column 73, line 16, in claim 23, delete "comprising;" and insert -- comprising: --, therefor.

In column 74, line 15, in claim 24, delete "the method" and insert -- The method --, therefor.

Signed and Sealed this
Thirteenth Day of March, 2012

David J. Kappos
*Director of the United States Patent and Trademark Office*